US011019623B2

(12) United States Patent
Lee et al.

(10) Patent No.: US 11,019,623 B2
(45) Date of Patent: May 25, 2021

(54) METHOD OF ACCESS AND LINK ADAPTATION FOR COVERAGE ENHANCED WIRELESS TRANSMISSIONS

(71) Applicant: InterDigital Patent Holdings, Inc., Wilmington, DE (US)

(72) Inventors: Moon-il Lee, Helville, NY (US); Janet A. Stern-Berkowitz, Little Neck, NY (US); J. Patrick Tooher, Montreal (CA); Nobuyuki Tamaki, Melville, NY (US); Pouriya Sadeghi, San Diego, CA (US); Marian Rudolf, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/132,306

(22) Filed: Sep. 14, 2018

(65) Prior Publication Data
US 2019/0037569 A1 Jan. 31, 2019

Related U.S. Application Data

(63) Continuation of application No. 15/115,156, filed as application No. PCT/US2015/013371 on Jan. 28, 2015, now abandoned.
(Continued)

(51) Int. Cl.
H04W 72/04 (2009.01)
H04W 74/08 (2009.01)
(Continued)

(52) U.S. Cl.
CPC ......... H04W 72/0453 (2013.01); H04W 4/70 (2018.02); H04W 52/30 (2013.01);
(Continued)

(58) Field of Classification Search
None
See application file for complete search history.

(56) References Cited

U.S. PATENT DOCUMENTS 8,494,572 B2 * 7/2013 Chen .................... H04W 52/16
455/522
2007/0115872 A1 5/2007 Kim
(Continued)

FOREIGN PATENT DOCUMENTS

CN 1647439 A 7/2005
CN 101114869 A 1/2008
(Continued)

OTHER PUBLICATIONS

Alcatel-Lucent, "Coverage Enhancement Techniques for PBCH". 3GPP TSG-RAN WG1 Meeting #74bis, R1-134207, Oct. 7-11, 2013, 5 pages.
(Continued)

Primary Examiner — Saba Tsegaye
(74) Attorney, Agent, or Firm — Invention Mine LLC

(57) ABSTRACT

Coverage enhancement of channels in a wireless communication system such as Long Term Evolution (LTE) and LTE-Advanced (LTE-A). One example method performed at a wireless transmit and receive unit (WTRU) includes determining a repetition number for an uplink signal and deriving an uplink transmission power for the uplink signal, where the uplink transmission power is based on the repetition number. The method further includes transmitting the uplink signal with repetitions, using the determined repetition number and the derived uplink transmission power.

20 Claims, 11 Drawing Sheets

Related U.S. Application Data

(60) Provisional application No. 61/933,300, filed on Jan. 29, 2014, provisional application No. 61/955,655, filed on Mar. 19, 2014, provisional application No. 62/075,630, filed on Nov. 5, 2014.

(51) Int. Cl.
*H04W 52/50* (2009.01)
*H04W 4/70* (2018.01)
*H04W 52/48* (2009.01)
*H04W 52/14* (2009.01)
*H04W 52/36* (2009.01)
*H04W 52/30* (2009.01)

(52) U.S. Cl.
CPC ............ *H04W 52/48* (2013.01); *H04W 52/50* (2013.01); *H04W 72/042* (2013.01); *H04W 72/0493* (2013.01); *H04W 74/0833* (2013.01); *H04W 52/146* (2013.01); *H04W 52/36* (2013.01)

(56) References Cited

U.S. PATENT DOCUMENTS

| | | | |
|---|---|---|---|
| 2008/0194259 A1 | 8/2008 | Vujcic | |
| 2009/0221293 A1 | 9/2009 | Petrovic | |
| 2010/0099429 A1* | 4/2010 | Ishii | H04W 72/1268 455/452.1 |
| 2010/0197297 A1* | 8/2010 | Hong | H04W 24/08 455/424 |
| 2010/0260156 A1 | 10/2010 | Lee | |
| 2011/0305211 A1 | 12/2011 | Lunttila | |
| 2012/0327894 A1 | 12/2012 | Axmon | |
| 2013/0035084 A1 | 2/2013 | Song | |
| 2013/0083753 A1 | 4/2013 | Lee | |
| 2013/0084910 A1 | 4/2013 | Suzuki | |
| 2013/0301524 A1 | 11/2013 | Xu | |
| 2014/0071952 A1 | 3/2014 | Kim | |
| 2015/0016312 A1* | 1/2015 | Li | H04W 74/0833 370/280 |
| 2015/0181533 A1* | 6/2015 | Chen | H04W 52/146 455/522 |
| 2016/0192376 A1* | 6/2016 | Lee | H04W 48/20 370/252 |
| 2016/0338116 A1 | 11/2016 | Bergström | |
| 2018/0014278 A1 | 1/2018 | Papasakellariou | |

FOREIGN PATENT DOCUMENTS

| | | |
|---|---|---|
| CN | 101483903 A | 7/2009 |
| CN | 103428813 A | 12/2013 |
| JP | 2010506445 A | 2/2010 |
| JP | 2010518724 | 5/2010 |
| WO | 03085878 A1 | 10/2003 |
| WO | 2008040447 A1 | 4/2008 |
| WO | 2009092303 A1 | 7/2009 |
| WO | 2010008859 | 1/2010 |
| WO | 2013022774 | 2/2013 |
| WO | 2015041487 A1 | 3/2015 |
| WO | 2015095560 A1 | 6/2015 |

OTHER PUBLICATIONS

Mediatek Inc., "Discussion on PRACH and RACH Procedure in Coverage Enhancement Mode". 3GPP TSG-RAN WG1 #75, R1-135424, Nov. 11-15, 2013, 6 pages.

Alcatel-Lucent, "Coverage enhancement techniques for PBCH". Alcatel-Lucent Shanghai Bell, 3GPP TSG-RAN WG1#74b R1-134207, Oct. 7-11, 2013, 5 pages. At: http://www.3gpp.org/ftp/tsg_ran/WG1_RL1/TSGR1_74b/Docs/R1-134207.zip.

Notification of Transmittal of the International Preliminary Report on Patentability for PCT/US2015/013371 dated Mar. 17, 2016, pp. 6.

Mediatek Inc: "Discussion on PRACH and RACH procedure in coverage enhancement mode", 3GPP Draft; R1-135424 Mode F, (3GPP); F-06921 SOP, vol. RAN WG1, No. San Francisco, USA; Nov. 13, 2013 (Nov. 13, 2013), XP050735102, Retrieved from the Internet: URL:http://www.3gpp.org/ftp/Meetings -3GPP- SYNC/RAN/RANI/Docs/.

Intel Corporation: "Coverage enhancement of PRACH for low cost MTC", 3GPP Draft; R1-135104 Intel MTC PRACH, 3rd Generation Partnership Project (3GPP); F-06921, vol. RAN WG1, Nov. 13, 2013 (Nov. 13, 2013), XP050734806, Retrieved from the Internet: URL:http://www.3gpp.org/ftp/Meetings -3GPP - SYNC/RAN/RANI/Docs/.

Notification of Transmittal of the International Search Report and the Written Opinion of the International Searching Authority, or the Declaration for PCT/US2015/013371 dated Apr. 8, 2015.

Alcatel-Lucent et al., "Enhanced coverage mode impact on system information", 3GPP TSG-RAN WG RAN3#84, R2-134331, Agenda item: 7.9.2, San Francisco, USA, Nov. 7-11, 2013.

ZTE, "SIB Coverage Improvement", 3GPP TSG RAN WG1 Meeting #75, R1-135358, Agenda item: 6.2.2.2.1, San Francisco, USA, Nov. 11-15, 2013.

3GPP, "Technical Specification Group Radio Access Network; Evolved Universal Terrestrial Radio Access (E-UTRA); Radio Resource Control (RRC)", Protocol specification, Release 11, 3GPP TS 36.331 V11.6.0 (Dec. 2013).

Sierra Wireless, "MIB and SIB Acquisition Time Guidance Discussion", Agenda item: 6.2.2.2.1 PBCH—Low cost & enhanced coverage MTC UE for LTE, R1-135252, 3GPP TSG RAN WG1 #75, San Francisco, CA, Nov. 11-15, 2013.

NSN et al., "SIB Coverage Enhancement", 3GPP TSG RANI#75, R1-135572, Agenda Item: 6.2.2.2.1, San Francisco, USA, Nov. 11-15, 2013.

3GPP; "Physical Channels and Modulation". Technical Specification Group Radio Access Network; Evolved Universal Terrestrial Radio Access (E-UTRA); (Release 10), TS 36.211, V10.5.0, Jun. 2012.

3GPP, "Multiplexing and channel coding". Technical Specification Group Radio Access Network; Evolved Universal Terrestrial Radio Access (E-UTRA); (Release 10), TS 36.212 V10.5.0, Jun. 2012.

3GPP, "Physical Layer Procedures". Technical Specification Group Radio Access Network; Evolved Universal Terrestrial Radio Access (E-UTRA); (Release 10) TS 36.213, V10.5.0, Jun. 2012.

Third Generation Partnership Project, "Technical Specification Group Radio Access Network; Study on Provision of Low-Cost MTC UEs based on LTE". 3GPP TR 36.888, V2.1.0, Release 12, May 2013, 58 pages.

\* cited by examiner

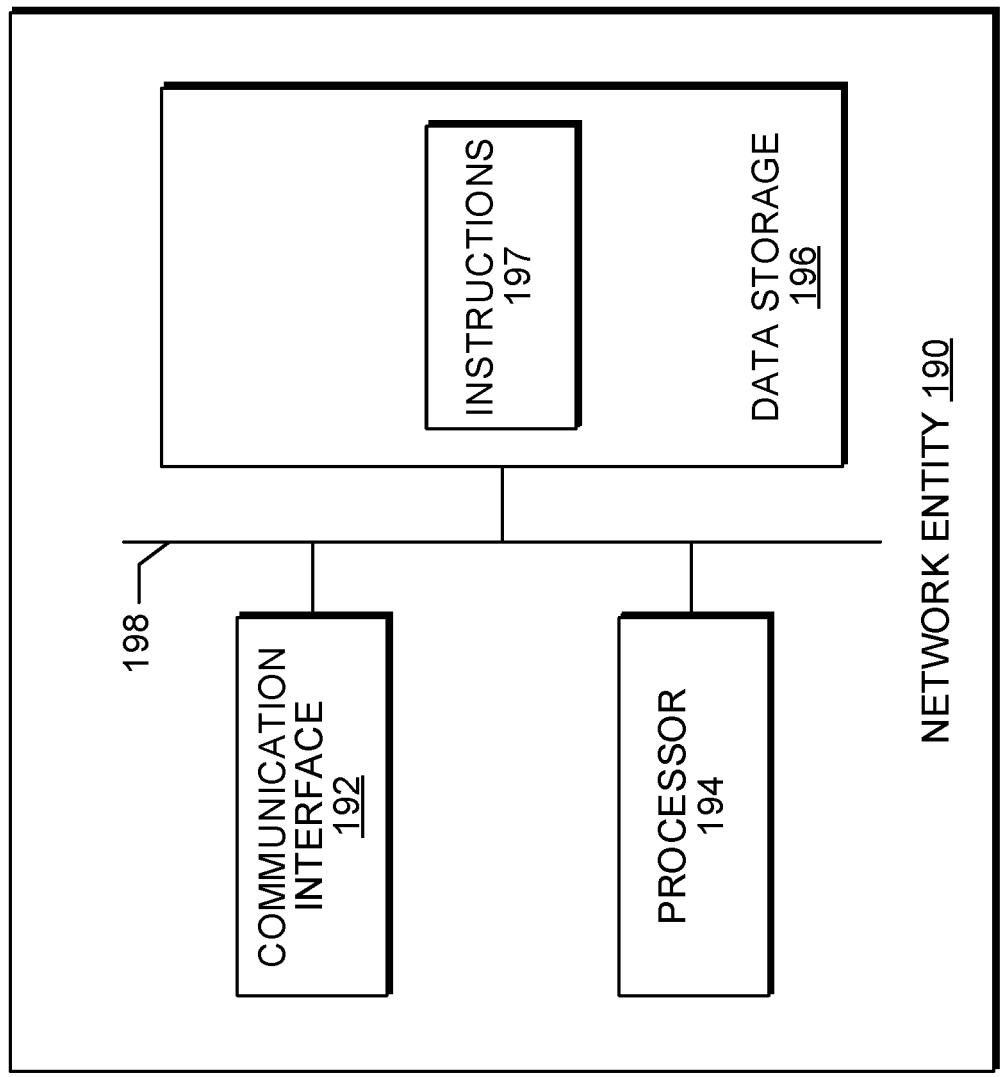

METHOD OF ACCESS AND LINK ADAPTATION FOR COVERAGE ENHANCED WIRELESS TRANSMISSIONS

CROSS-REFERENCE TO RELATED APPLICATIONS

The present application is a continuation of U.S. patent application Ser. No. 15/115,156, filed on Jul. 28, 2016, which is a 35 U.S.C. 371 of International Application No. PCT/US2015/013371, entitled METHOD OF ACCESS AND LINK ADAPTATION FOR COVERAGE ENHANCED WIRELESS TRANSMISSIONS, filed on Jan. 28, 2015, which claims benefit under 35 U.S.C. § 119(e) from, U.S. Provisional Patent Application Ser. No. 61/933,300, filed Jan. 29, 2014, U.S. Provisional Patent Application Ser. No. 61/955,655, filed Mar. 19, 2014, and U.S. Provisional Patent Application Ser. No. 62/075,630, filed Nov. 5, 2014, the contents of which are incorporated herein by reference in their entirety.

BACKGROUND

In the 3rd Generation Partnership (3GPP) Long Term Evolution (LTE) Advanced, coverage enhancement techniques have been studied to support Wireless Transmit/Receive Units (WTRUs) which may be located in a coverage limited area. Such a WTRU may be delay-tolerant, have reduced capabilities, or operate with limited service when located in a coverage limited area. An example is a low-cost or low-complexity machine type communication (LC-MTC) WTRU such as a smart meter or sensor which may be located in the basement of a house where very high penetration loss is expected.

SUMMARY

Described herein are systems and methods related to coverage enhancement for channels in a wireless communication system such as LTE/LTE-A. Coverage enhancement may include repetition of the channel in the time and/or frequency domain, power boosting of the channel, and reference signal improvement for better channel estimation accuracy. In representative embodiments described herein, link adaptation for communication with a Wireless Transmit/Receive Unit (WTRU) is based on coverage enhancement levels or channel repetition levels. Link adaptation techniques are described herein for uplink and downlink channels including data, control, access, and broadcast channels.

In an example embodiment, a WTRU may determine the number of repetitions for an uplink channel, derive the transmission power for the uplink channel based on the determined number of repetitions, and transmit the uplink channel with the determined number of repetitions at the derived transmission power level. The WTRU may determine the number of repetitions from at least one of a determined coverage enhancement (CE) level, a downlink measurement, a random access procedure, and an indication from the network.

Further described herein are systems and methods for prolonging UE battery life in coverage enhancement (CE) mode. In particular, channel-dependent CE level configuration can be used to optimize the number of repetitions. Moreover, (E)PDCCH monitoring in CE mode can be minimized using window-based transmission.

BRIEF DESCRIPTION OF THE DRAWINGS

A more detailed understanding may be had from the following description, presented by way of example in conjunction with the accompanying drawings. Figures in such drawings, like the detailed description, are examples. As such, the Figures and the detailed description are not to be considered limiting, and other equally effective examples are possible and likely. Furthermore, like reference numerals in the Figures indicate like elements.

FIG. 1F is a system diagram illustrating an example network entity that may be used within the communications system illustrated in FIG. 1A.

DETAILED DESCRIPTION

A detailed description of illustrative embodiments will now be provided with reference to the various figures. However, while the present invention may be described in connection with representative embodiments, it is not limited thereto and it is to be understood that other embodiments may be used or modifications and additions may be made to the described embodiments for performing the same function of the present invention without deviating therefrom. Although the representative embodiments are generally shown hereafter using wireless network architectures, any number of different network architectures may be used including networks with wired components and/or wireless components, for example.

Figure 1A:
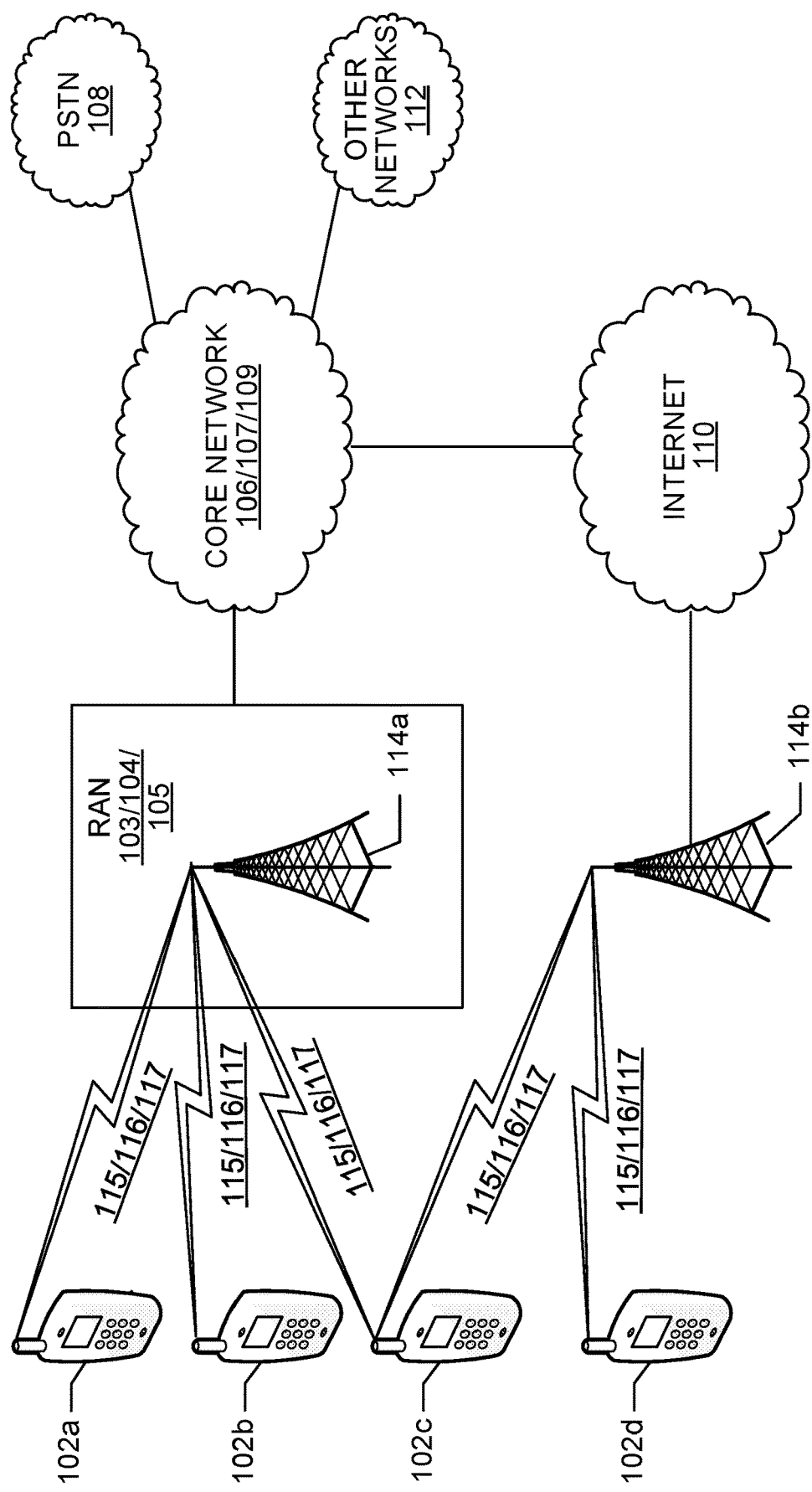
FIG. 1A is a system diagram of an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel-access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, and/or 102d (which generally or collectively may be referred to as WTRU 102), a RAN 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like. The WTRU 102a, 102b, 102c and/or 102d may be referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the other networks 112. By way of example, the base stations 114a, 114b may be a base transceiver station (BTS), a Node-B, an eNodeB, a Home Node B, a Home eNodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into sectors, e.g., cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, and the like). The air interface 115/116/117 may be established using any suitable radio access technology (RAT).

More specifically, as noted above, the communications system 100 may be a multiple access system and may employ one or more channel-access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNodeB, or access point, as examples, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, and the like) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. As examples, the core network 106/107/109 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM, UMTS, CDMA 2000, WiMAX, or WiFi radio technology.

The core network 106/107/109 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology. Some or all of the WTRUs 102a, 102b, 102c, 102d in the communication system 100 may communicate with other devices using Bluetooth technology.

Figure 1B:
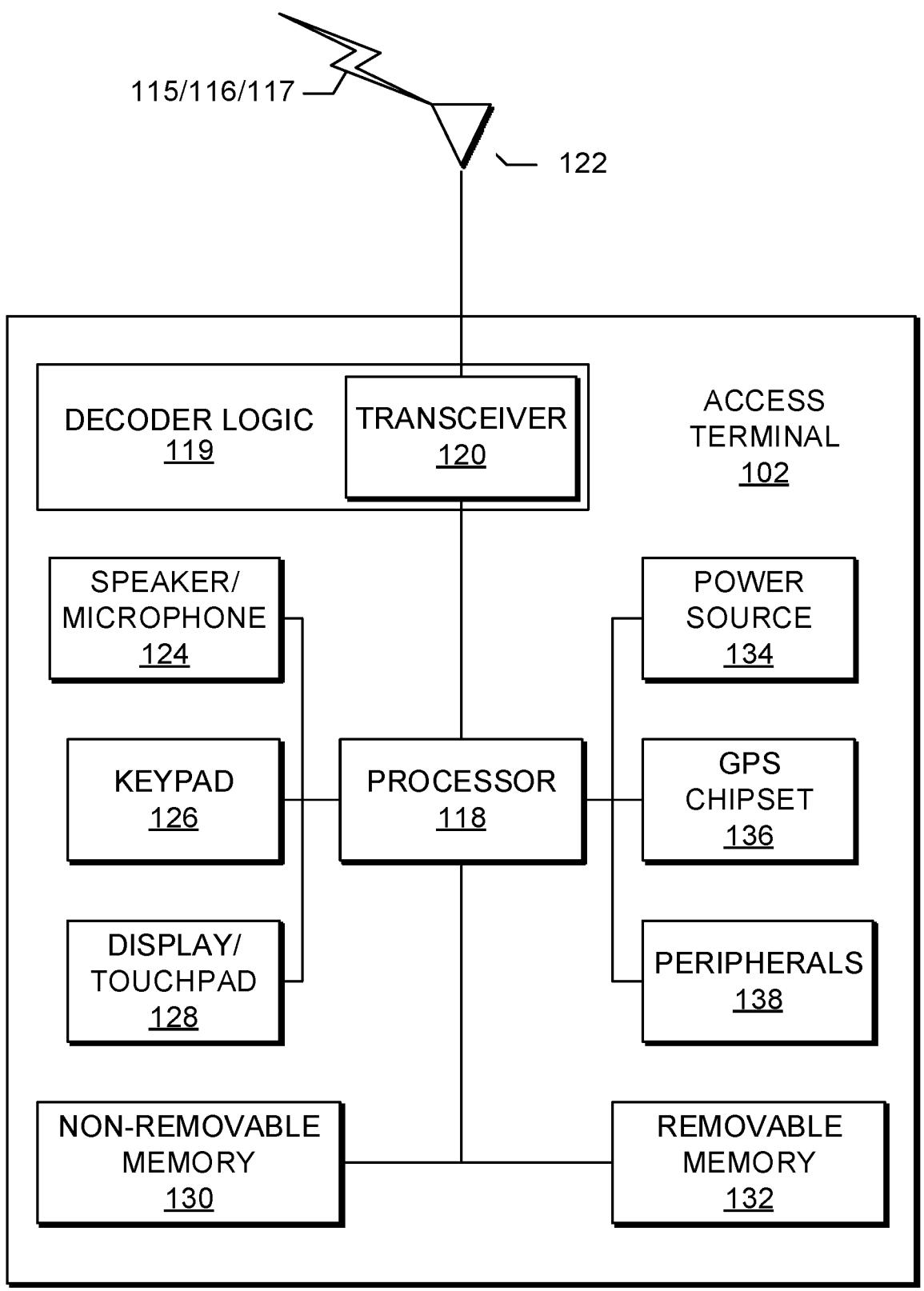
FIG. 1B is a system diagram of an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. The transceiver 120 may be implemented as a component of decoder logic 119. For example, the transceiver 120 and decoder logic 119 may be implemented on a single LTE or LTE-A chip. The decoder logic may include a processor operative to perform instructions which may be stored in a non-transitory computer-readable medium. As an alternative, or in addition, the decoder logic may be implemented using custom and/or programmable digital logic circuitry.

It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to and/or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, as examples. In yet another embodiment, the transmit/receive element 122 may be configured to transmit and/or receive both RF and light signals. It will be appreciated that the transmit/receive element 122 may be configured to transmit and/or receive any combination of wireless signals. It is contemplated that the terms signal and channel may be used interchangeably.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and/or receiving wireless signals over the air interface 115/116/117.

The transceiver 120 may be configured to modulate signals that are to be transmitted by the transmit/receive element 122 and/or to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, as examples.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. As examples, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
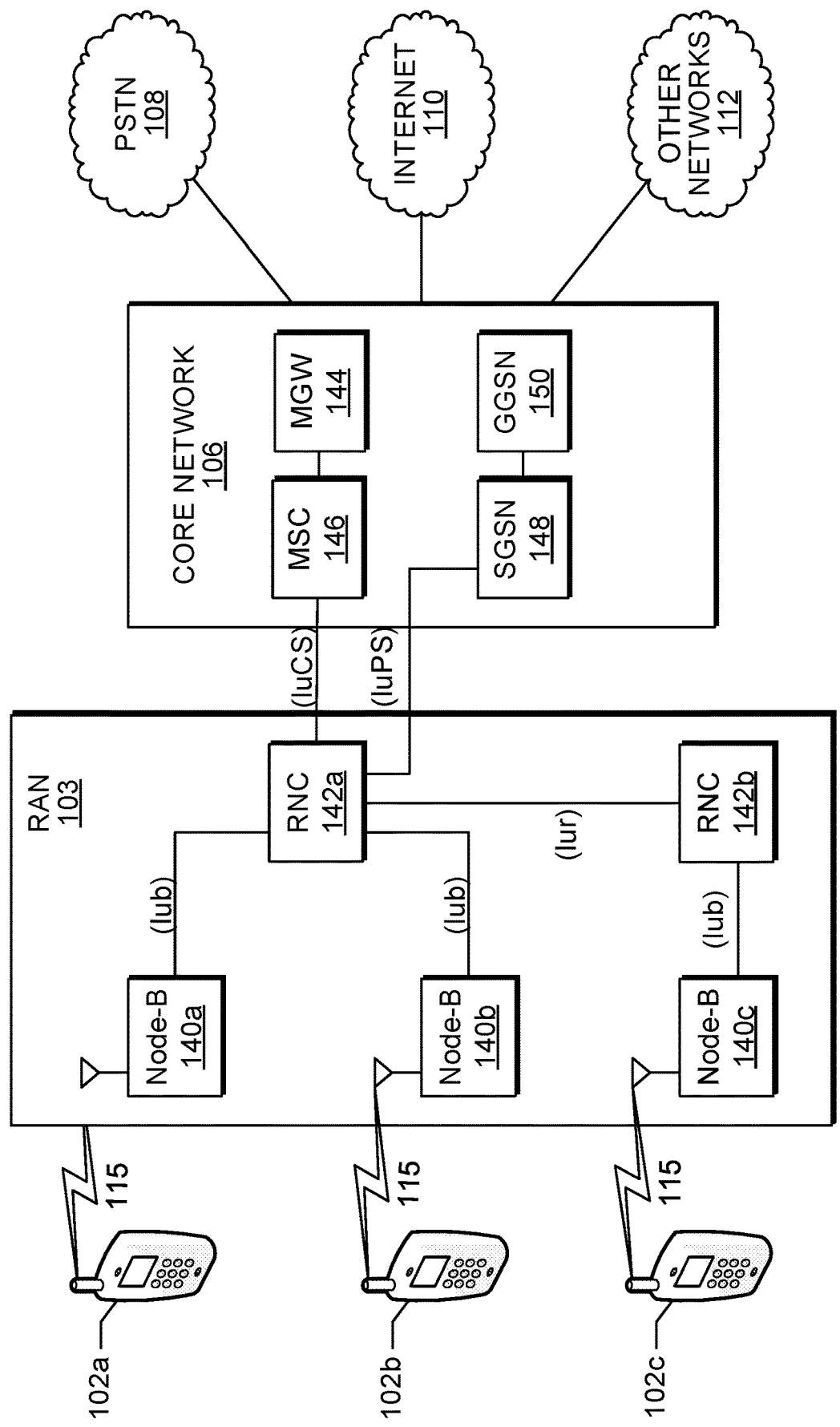
FIG. 1C is a system diagram of an example radio access network (RAN) and an example core network that may be used within the communications system illustrated in FIG. 1A.

FIG. 1C is a system diagram illustrating the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer-loop power control, load control, admission control, packet scheduling, handover control, macro diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional landline communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between the WTRUs 102a, 102b, 102c and IP-enabled devices.

As noted above, the core network 106 may also be connected to the other networks 112, which may include other wired and/or wireless networks that are owned and/or operated by other service providers.

Figure 1D:
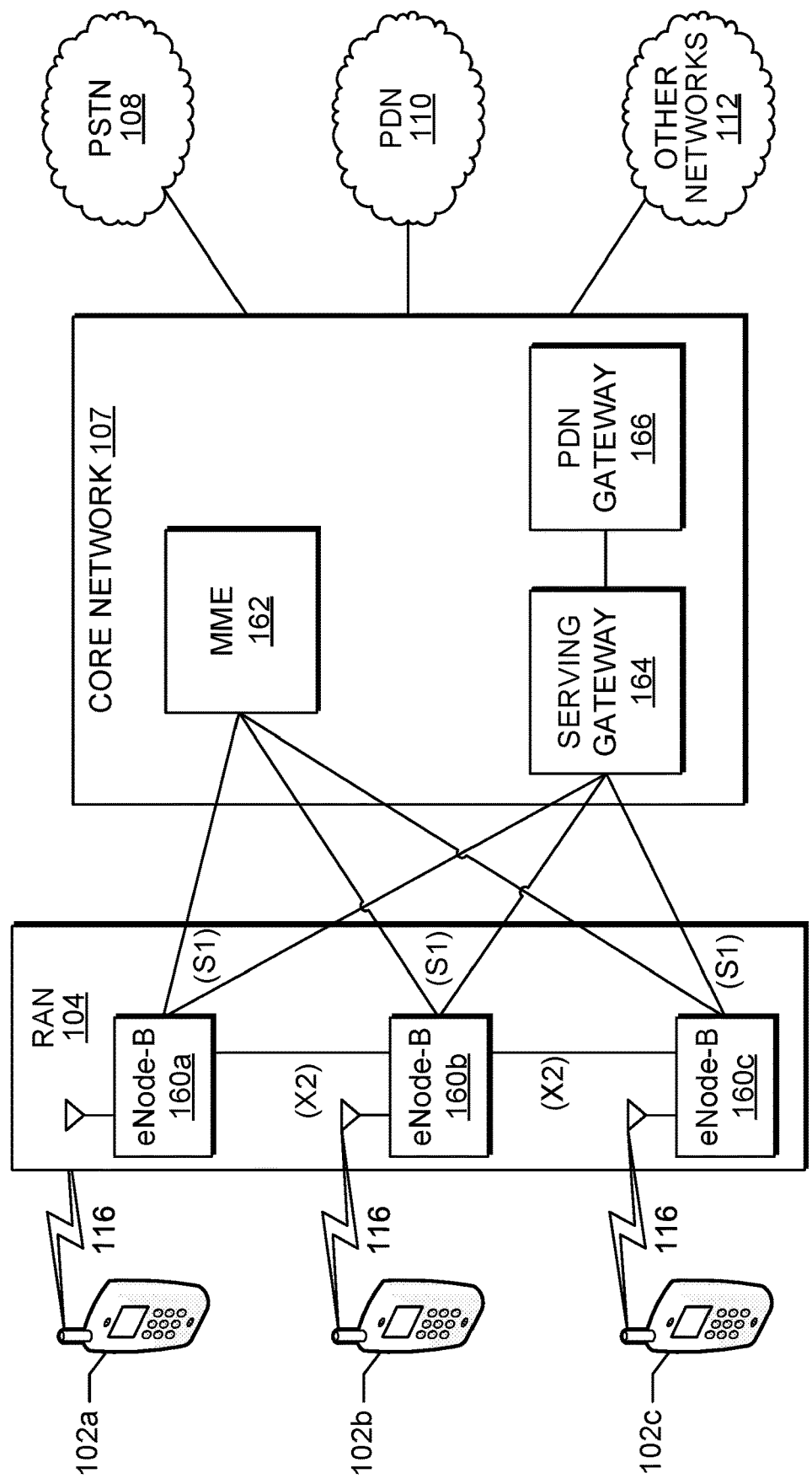
FIG. 1D is a system diagram of another example RAN and another example core network that may be used within the communications system illustrated in FIG. 1A.

FIG. 1D is a system diagram illustrating the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNodeBs 160a, 160b, 160c, though it will be appreciated that the RAN 104 may include any number of eNodeBs while remaining consistent with an embodiment. The eNodeBs 160a, 160b, 160c may each include one or more transceivers for communicating with the WTRUs 102a, 102b, 102c over the air interface 116. In one embodiment, the eNodeBs 160a, 160b, 160c may implement MIMO technology. Thus, the eNodeB 160a, for example, may use multiple antennas to transmit wireless signals to, and receive wireless signals from, the WTRU 102a.

Each of the eNodeBs 160a, 160b, 160c may be associated with a particular cell (not shown) and may be configured to handle radio-resource-management decisions, handover decisions, scheduling of users in the uplink and/or downlink, and the like. As shown in FIG. 1D, the eNodeBs 160a, 160b, 160c may communicate with one another over an X2 interface.

The core network 107 shown in FIG. 1D may include a mobility management entity (MME) 162, a serving gateway (SGW) 164, and a packet data network (PDN) gateway (PGW) 166. While each of the foregoing elements are depicted as part of the core network 107, it will be appreciated that any of these elements may be owned and/or operated by an entity other than the core network operator.

The MME 162 may be connected to each of the eNodeBs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM and/or WCDMA.

The serving gateway 164 may be connected to each of the eNodeBs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNodeB handovers, triggering paging when downlink data is available for the WTRUs 102a, 102b, 102c, managing and storing contexts of the WTRUs 102a, 102b, 102c, and the like.

The serving gateway 164 may be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional landline communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the other networks 112, which may include other wired and/or wireless networks that are owned and/or operated by other service providers.

Figure 1E:
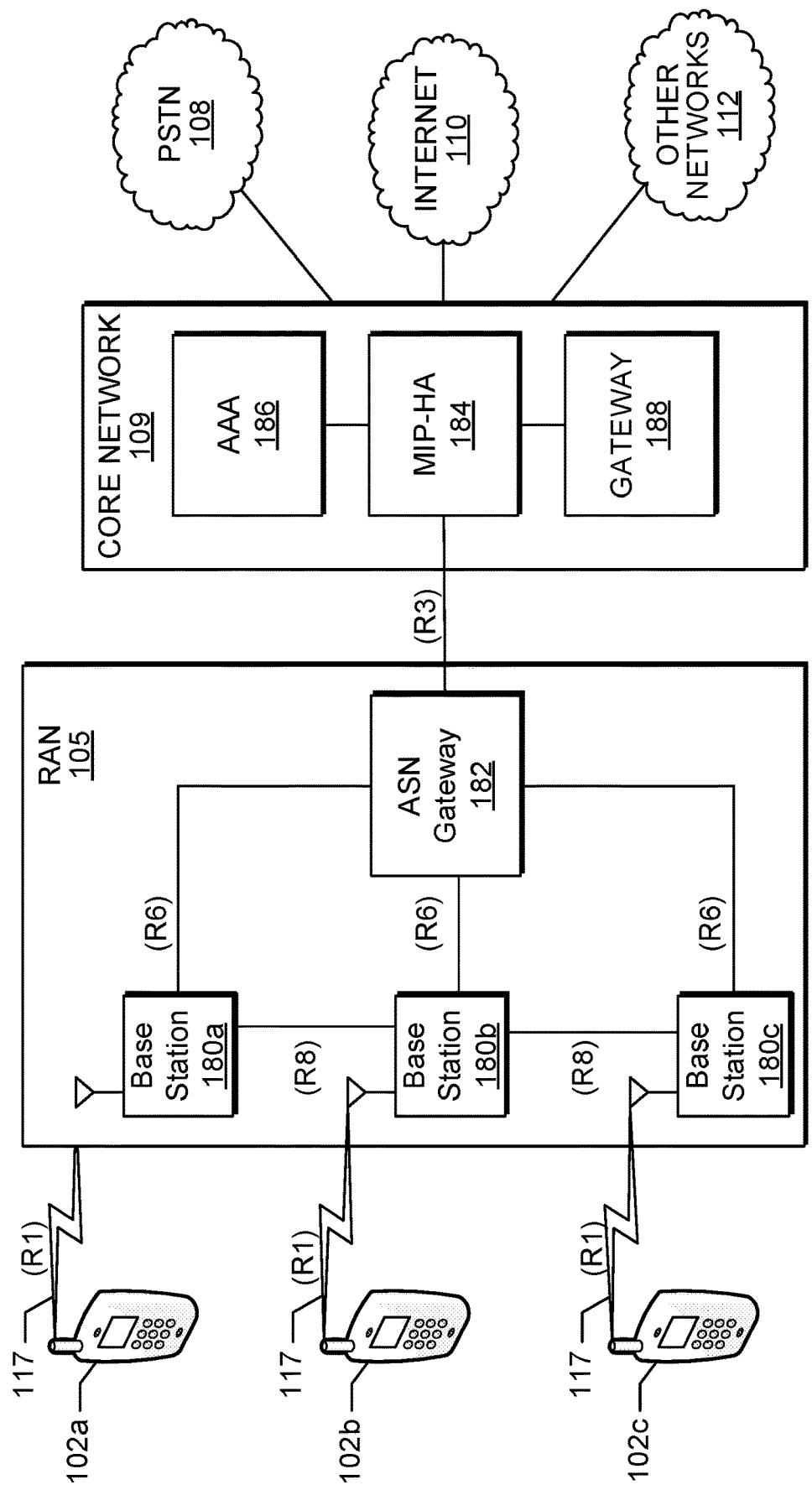
FIG. 1E is a system diagram of another example RAN and another example core network that may be used within the communications system illustrated in FIG. 1A.

FIG. 1E is a system diagram illustrating the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. The base station 180a, for example, may use multiple antennas to transmit wireless signals to, and/or receive wireless signals from, the WTRU 102a. The base stations 180a, 180b, 180c may also provide mobility-management functions, such as handoff triggering, tunnel establishment, radio-resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point (not shown), which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may be defined as an R3 reference point that includes protocols for facilitating data transfer and mobility-management capabilities, as examples. The core network 109 may include a mobile-IP home agent (MIP-HA) 184, an authentication, authorization, accounting (AAA) server 186, and a gateway 188. While each of the foregoing elements are depicted as part of the core network 109, it will be appreciated that any of these elements may be owned and/or operated by an entity other than the core network operator.

The MIP-HA 184 may be responsible for IP-address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional landline communications devices. The gateway 188 may provide the WTRUs 102a, 102b, 102c with access to the other networks 112, which may include other wired and/or wireless networks that are owned and/or operated by other service providers.

Although not shown in FIG. 1E, it will be appreciated that the RAN 105 may be connected to other ASNs, other RANs (e.g., RANs 103 and/or 104) and/or the core network 109 may be connected to other core networks (e.g., core network 106 and/or 107). The communication link between the RAN 105 and the other ASNs may be defined as an R4 reference point (not shown), which may include protocols for coordinating the mobility of the WTRUs 102a, 102b, 102c between the RAN 105 and the other ASNs. The communication link between the core network 109 and the other core networks may be defined as an R5 reference point (not shown), which may include protocols for facilitating interworking between home core networks and visited core networks.

FIG. 1F is a system diagram illustrating an example network entity 190 that may be used within the communications system 100 of FIG. 1A. As depicted in FIG. 1F, network entity 190 may include a communication interface 192, a processor 194, and/or non-transitory data storage 196, which may be communicatively linked by a bus, network, or other communication path 198.

Communication interface 192 may include one or more wired communication interfaces and/or one or more wireless communication interfaces. With respect to wired communication, communication interface 192 may include one or more interfaces such as Ethernet interfaces, as an example. With respect to wireless communication, communication interface 192 may include components such as one or more antennae, one or more transceivers and/or chipsets which may be designed and/or configured for one or more types of wireless (e.g., LTE) communication, and/or any other components which may be deemed suitable by those of skill in the relevant art. With respect to wireless communication, communication interface 192 may be equipped at a scale and/or with a configuration which may be appropriate for acting on the network side of wireless communications (e.g., LTE and/or LTE-A communications, WiFi communications, and the like). For example, communication interface 192 may include multiple transceivers and/or other equipment and/or circuitry for serving multiple WTRUs or other access terminals in a coverage area.

Processor 194 may include one or more processors of any type which may be deemed suitable by those of skill in the relevant art, including as examples a general-purpose microprocessor and/or a dedicated DSP.

Data storage 196 may take the form of a (e.g., any) non-transitory computer-readable medium or combination of such media, including as examples flash memory, read-only memory (ROM), and random-access memory (RAM). Any one or more types of non-transitory data storage which may be deemed suitable by those of skill in the relevant art may be used. As depicted in FIG. 1F, data storage 196 may contain program instructions 197 which may be executable by processor 194, for example for carrying out various combinations of the various network-entity functions described herein.

In some embodiments, the network-entity functions described herein may be carried out by a network entity which may have a structure similar to that of network entity 190 of FIG. 1F. In some embodiments, one or more of such functions may be carried out by a set of multiple network entities in combination, where one or more (e.g., each) network entity may have a structure similar to that of network entity 190 of FIG. 1F. In various embodiments, network entity 190 may be or include one or more of (one or more entities in) RAN 103, (one or more entities in) RAN 104, (one or more entities in) RAN 105, (one or more entities in) core network 106, (one or more entities in) core network 107, (one or more entities in) core network 109, base station 114*a*, base station 114*b*, Node-B 140*a*, Node-B 140*b*, Node-B 140*c*, RNC 142*a*, RNC 142*b*, MGW 144, MSC 146, SGSN 148, GGSN 150, eNodeB 160*a*, eNodeB 160*b*, eNodeB 160*c*, MME 162, serving gateway 164, PDN gateway 166, base station 180*a*, base station 180*b*, base station 180*c*, ASN gateway 182, MIP-HA 184, AAA 186, and gateway 188. Other network entities and/or combinations of network entities may be used in various embodiments for carrying out the network-entity functions described herein, as the foregoing list is provided by way of example and not by way of limitation.

Wireless communication systems compliant with the Third Generation Partnership Project (3GPP) Long Term Evolution (LTE) may support up to 100 Mbps in the downlink (DL) and up to 50 Mbps in the uplink (UL) for a 2×2 configuration. The LTE DL scheme may be based on an Orthogonal Frequency Division Multiple Access (OFDMA) air interface. A radio frame may include ten 1 ms subframes. A subframe may include two 0.5 ms timeslots. There may be either six or seven Orthogonal Frequency Division Multiplexing (OFDM) symbols per timeslot. Seven symbols per timeslot may be used with normal cyclic prefix (CP) length, and six symbols per timeslot may be used with extended CP length. The subcarrier spacing for a particular specification may be 15 kHz. A reduced subcarrier spacing mode, for example, using 7.5 kHz may also be possible. A frame may be or refer to a radio frame.

A resource element (RE) may be associated with a subcarrier during an OFDM symbol interval. A resource block (RB) may include twelve consecutive subcarriers during a 0.5 ms timeslot. With seven symbols per timeslot, a RB may include 12×7=84 REs.

For dynamic scheduling, a subframe may include two consecutive timeslots, which may be referred to as a RB pair. Certain subcarriers on some OFDM symbols may be allocated to carry pilot or reference signals in the time-frequency grid. A number of subcarriers at the edges of the transmission bandwidth may not be transmitted in order to comply with spectral mask criteria.

Uplink channels that may be provided and/or used may include one or more of Physical UL Shared Channel (PUSCH), Physical UL Control Channel (PUCCH), and/or Physical Random Access Channel (PRACH). Control information, which may be referred to as UL Control Information (UCI), may be transmitted by a WTRU, for example in a subframe, on the PUSCH or the PUCCH, or part may be transmitted on the PUCCH and part on the PUSCH. UCI may include one or more of hybrid automatic repeat request (HARQ) ACK/NACK, scheduling request (SR), and/or Channel State Information (CSI) which may include one or more of Channel Quality Indicator (CQI), Precoding Matrix Indicator (PMI), and Rank Indicator (RI). Resources that may be allocated for PUCCH transmission may be located at or near the edges of the UL band.

Downlink channels that may be provided and/or used may include Physical Downlink Shared Channel (PDSCH) and/or downlink control channels, which may include one or more of Physical Control Format Indicator Channel (PCFICH), Physical Hybrid-ARQ Indicator Channel (PHICH), Physical Downlink Control Channel (PDCCH), and/or Enhanced PDCCH (EPDCCH).

One or more symbols, e.g., the first 1 to 3 OFDM symbol(s) in each subframe in the DL, may be occupied by one or more of PCFICH, PHICH, and PDCCH according to the overhead of the control channels, and the symbols occupied may be referred to as the DL control region. The PCFICH may be transmitted, for example, in the first OFDM symbol (e.g., symbol 0) in each subframe and/or may indicate the number of OFDM symbols used for the DL control region in the subframe. A WTRU may detect a Control Format Indicator (CFI) from a PCFICH, and the DL control region may be defined in the subframe according to the CFI value. The PCFICH may be skipped if a subframe may be defined as a non-PDSCH supportable subframe. DL symbols that are not part of a DL control region may be referred to as the data or PDSCH region. Enhanced PDCCH (EPDCCH) may be provided and/or used in the PDSCH region. The location of an EPDCCH in that region may be signaled, for example, via higher layer signaling such as Radio Resource Control (RRC) signaling, to a WTRU that may (or may be expected to) monitor, receive, or otherwise use that EPDCCH. The PDCCH and/or EPDCCH may provide control information, resource allocations (e.g., grants) for UL and/or DL transmission, and the like, for example in a DL Control Information (DCI) format.

DL signals and/or channels may be provided or transmitted by an eNodeB (eNB) and/or may be received and/or used by a WTRU. UL signals and/or channels may be provided or transmitted by a WTRU and/or may be received and/or used by an eNB.

Signals and/or channels may be associated with a cell that may correspond to a certain carrier frequency and/or geographic area. A carrier frequency may be a center frequency of a cell (e.g., the center frequency of a cell's supported bandwidth). An eNB may have one or more cells associated with it. An eNB may be or refer to a cell.

In some embodiments, the terms eNB and cell may be used interchangeably. In some embodiments, the terms cell and serving cell may be used interchangeably.

Synchronization signals, which may include a Primary Synchronization Signal (PSS) and/or a Secondary Synchronization Signal (SSS), may be provided or transmitted, for example, by an eNB or cell. A WTRU may use such signals, for example, to acquire time and/or frequency synchronization with an eNB or cell. The PSS and/or SSS may be present in subframes 0 and/or 5 and/or may be present in every radio frame. Transmission may be on 62 subcarriers at the center of a cell's bandwidth, and five subcarriers on each side of the 62 central subcarriers may be reserved or unused. For FDD, PSS transmission may be in the last OFDM symbol and SSS in the second to last (e.g., next to last) OFDM symbol of timeslot 0 (e.g., the first timeslot of subframe 0) and timeslot 10 (e.g., the first timeslot of subframe 5) of each radio frame. For TDD, PSS transmission may be in the third OFDM symbol in subframes 1 and 6 and SSS may be transmitted in the last OFDM symbol in timeslot 1 (e.g., the second timeslot of subframe 0) and timeslot 11 (e.g., the second timeslot of subframe 5) of each radio frame. The synchronization signals may convey information regarding the physical cell identity (cell ID) of the cell.

A Physical Broadcast Channel (PBCH), which may be transmitted by an eNB or cell, may carry cell information, such as a Master Information Block (MIB). The PBCH may be provided or transmitted in a certain subframe such as subframe 0 of each radio frame and may be repeated over, for example, four consecutive radio frames (e.g., 40 ms time period). The PBCH may be transmitted in the first four OFDM symbols of the second timeslot of subframe 0 and may be transmitted on the 72 center subcarriers. The MIB may provide information such as the DL bandwidth of the cell, PHICH information, and at least part of the System Frame Number (SFN), for example, the most significant 8 bits of a 10-bit SFN.

Downlink reference signals may include a Cell-specific Reference Signal (CRS), a Channel-State-Information Reference Signal (CSI-RS), and/or a DeModulation Reference Signal (DM-RS), and/or a Positioning Reference Signal (PRS). DL reference signals may be received and/or used by a WTRU. CRS may be used by a WTRU for channel estimation for coherent demodulation of a (e.g., any) downlink physical channel. Certain DL channels may include at least one of PMCH, EPDCCH, and PDSCH when configured with a certain transmission mode (TM), such as TM7, TM8, TM9, or TM10. A WTRU may use the CRS for channel state information measurements for the reporting of CQI, PMI, and/or RI, for example, if the WTRU is configured with a transmission mode using CRS for PDSCH demodulation. A WTRU may use the CRS for cell-selection and/or mobility-related measurements. The CRS may be received in certain subframes (e.g., any subframe), and multiple antenna ports (e.g., up to four antenna ports) may be supported. A WTRU may use DM-RS for demodulation of certain channels, which may include at least one of EPDCCH and PDSCH configured with TM7, TM8, TM9, or TM10. DM-RS may be used for the demodulation of a channel (e.g., EPDCCH or PDSCH) and may be transmitted in the resource blocks assigned to the channel (e.g., EPDCCH or PDSCH). A WTRU may use CSI-RS, which may be transmitted with a duty cycle, for channel state information measurements, for example, if the WTRU may be configured with a transmission mode, which may use DM-RS for PDSCH demodulation. The CSI-RS may also be used for cell-selection and mobility-related measurements, for example, if a WTRU may be configured with a transmission mode (e.g., TM10). A WTRU may use the PRS for position related measurements.

A WTRU may transmit uplink reference signals, including, for example, a sounding reference signal (SRS) and/or and DM-RS. The SRS may be transmitted in the last SC-FDMA symbol in a set of uplink subframes which may be configured for WTRU-specific SRS subframes, which may be a subset of cell-specific SRS subframes. The SRS may be transmitted by a WTRU periodically in the WTRU-specific SRS subframes within a configured and/or pre-defined frequency bandwidth. A WTRU may transmit the SRS in an aperiodic manner, for example, if the WTRU may receive an aperiodic SRS (A-SRS) transmission trigger in a DCI format. A WTRU may transmit DM-RS for the PUSCH demodulation at the eNB receiver and the location of DM-RS may be in the middle of the SC-FDMA symbols (e.g., fourth SC-FDMA symbol in normal CP) in each slot for the resource blocks for which PUSCH transmission may be granted.

A WTRU may receive user plane and/or control plane data in a PDSCH transmission from an eNB. A WTRU may receive RLC and/or MAC control information, for example, in a PDSCH transmission from an eNB.

An eNB and/or a WTRU may use a Random Access (RA) procedure for at least one of: (i) WTRU initial access (for example to a cell or eNB) and/or registration and/or a Radio Resource Control (RRC) Connection Request such as for initial access or registration; (ii) connection re-establishment such as RRC Connection re-establishment which may follow radio link failure; (iii) access to a handover target cell and/or reset or alignment of WTRU UL timing to a handover target cell, for example for or during a handover; (iv) reset or alignment of WTRU UL timing with respect to a certain cell such as a serving cell, for example to obtain UL synchronization with the cell, such as when UL synchronization may be lost and DL data may arrive or there may be UL data to send; (v) sending and/or receiving a scheduling request (SR), for example when the WTRU may have UL data to send and there may be no dedicated resources (e.g., no PUCCH resources) assigned which may be used for the SR; and/or (vi) positioning purposes such as when timing advance, which may be used for UL timing alignment, may be needed for WTRU positioning.

A RA procedure may be contention-based (which may also be called common) or non-contention based (which may also be called contention free or dedicated).

When using a RA procedure which may be a contention-based RA procedure, the WTRU may initiate the process by transmitting a RA preamble that it may randomly select from a common pool of preambles that may be communicated to the WTRU by the network such as via broadcasted system information. The WTRU may transmit the preamble on a PRACH resource (e.g., a resource in time and frequency) that the WTRU may select from a set of allowed resources that may be communicated to the WTRU by the network such as via broadcasted system information. The cell's configured set of PRACH resources may be or may include this set of allowed PRACH resources. The unit of time for the PRACH resource may be a subframe. The subframe the WTRU selects (or may select) for the PRACH resource may be the next subframe configured for PRACH in which the WTRU may transmit the PRACH (e.g., based on timing, measurement, and/or other WTRU considerations). The WTRU may select a frequency aspect of the PRACH resource (e.g., the resource blocks (RBs)) in the selected subframe, for example, based on parameters which may be communicated to the WTRU by the network, e.g., via broadcasted system information. A frequency resource (e.g., one or at least one frequency resource) may be allowed for PRACH in a subframe for FDD or other cases. It may be defined by a starting (e.g., lowest) RB number that may be provided by the network, e.g., prach-FrequencyOffset, and may have a fixed bandwidth such as six RBs.

Multiple WTRUs may select the same resources (e.g., preamble and PRACH resource) for random access, and a contention situation may be resolved when a contention-based random access procedure is used, or in other cases.

The WTRU may transmit a RA preamble that may be (e.g., explicitly) signaled to the WTRU by the network, e.g., ra-PreambleIndex, when using a non-contention based RA procedure. The WTRU may transmit the preamble on a PRACH resource that it selects from a specific subset of the cell's configured PRACH resources. The subset (e.g., the mask) may be (e.g., explicitly) signaled to the WTRU by the network, e.g., ra-PRACH-MaskIndex. The WTRU may use the indicated resource when the subset includes one choice or in other cases.

It is contemplated that a preamble transmission may span or be repeated over more than one subframe, for example for contention-based and/or contention-free RA. The selected subframe (e.g., for transmission) may be the starting subframe for the transmission, for example in this and/or other cases.

A PRACH preamble may be considered a PRACH resource. For example, PRACH resources may include a PRACH preamble, time, and/or frequency resources.

It is contemplated that the terms RACH resources and PRACH resources may be used interchangeably. It is further contemplated that RA, RACH, and PRACH may be used interchangeably. It is further contemplated that PDCCH and EPDCCH may be used interchangeably. (E)PDCCH may be used to represent PDCCH and/or EPDCCH.

Figure 2:
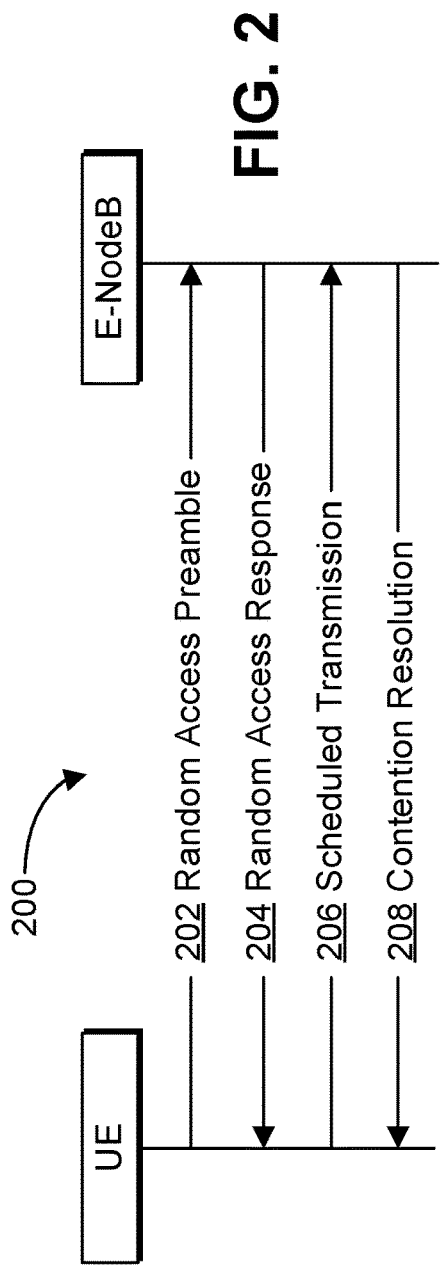
FIG. 2 illustrates an example of a contention based random access (RA) procedure.

FIG. 2 illustrates an example random access procedure 200. At 202 (e.g., msg1), the WTRU transmits (or may transmit) a preamble, which may be at a certain power level. An eNB that receives (or may receive) the preamble may respond with a Random Access Response (RAR), e.g., msg2, at 204. If the WTRU does not receive the RAR within a certain time window, the WTRU may transmit another preamble (which may be different from the previous preamble) and may transmit it at a higher power (e.g., ramp up the power such as according to a ramping protocol). Before ramping the power and trying again, the WTRU may wait some backoff time. The WTRU may repeat transmitting preambles until at least one of the following events may occur: the WTRU receives an RAR that is (or may be) intended for it, the WTRU reaches (or exceeds) its maximum power, and/or the WTRU reaches (or exceeds) the maximum number of permitted ramps. If the WTRU reaches or exceeds one of the maxima, the WTRU may consider the random access procedure 200 to fail. The ramping step (e.g., powerRampingStep) and maximum number of ramps (e.g., preambleTransMax) may be provided by the eNB, such as via system information that may be broadcast.

If the WTRU receives an RAR, the RAR may include one or more of a grant for resources on which the WTRU may send an UL transmission at 206 (e.g., msg3), a Cell (C)-Radio Network Temporary Identifier (C-RNTI) or Temporary C-RNTI (TC-RNTI), and/or a timing advance (TA). In response to the RAR, the WTRU may transmit in the UL at 206 (e.g., msg3) on the granted resources and may adjust its UL timing according to the TA. For a contention-free RA procedure, the random access procedure 200 may end at 206.

For a contention-based procedure, contention resolution may occur at 208 (e.g., msg4). A contention resolution message may include information (e.g., C-RNTI or TC-RNTI) that indicates (or may indicate) or identifies (or may identify) the WTRU for which the RAR may have been intended. If the WTRU receives a contention resolution message indicating that it was the intended WTRU, the WTRU may consider the random access procedure 200 successful. If not, the WTRU may consider the random access procedure 200 a failure and may try again.

At 202, the WTRU may transmit a RA preamble on a selected or identified PRACH resource. After transmitting the preamble, the WTRU may monitor and/or read a PDCCH or EPDCCH and/or look for a Random Access RNTI (RA-RNTI) corresponding to (or which may correspond to) the first subframe on which the WTRU transmitted the preamble. The RA-RNTI may indicate the presence of a RAR which may be intended for the WTRU. The RA-RNTI may, for example, be determined according to: RA-RNTI=1+t_id+10*f_id where t_id may be the index of the first subframe of the PRACH used for preamble transmission (e.g., 0≤t_id<10), and f_id may be the index of the PRACH used for preamble transmission within that subframe, for example in ascending order of frequency domain (e.g., 0≤f_id<6). The value f_id may always be 0, for the case of one frequency resource per subframe, for FDD, and/or other cases.

A RAR may be provided and/or used at 204. A RAR, which may be transmitted by the eNB, may include a timing advance command, for example to adjust the WTRU transmit timing and/or an allocation (e.g., grant) for uplink resources for the WTRU. The RAR may be sent on a PDCCH (or EPDCCH). The RAR may use a RA-RNTI to identify which WTRU group the allocation (e.g., scheduling grant) is (or may be) for. Within each group, a RA preamble identifier (RAPID) may be used to further narrow down (e.g., at the MAC level) the WTRU group identified by (or which may be identified by) the RA-RNTI, for example to the subset of WTRUs which used (or may have used) the same preamble during the preamble transmission (202) of the random access procedure. The RA response may include one or more of: (i) the index of the random access preamble sequences the network may have detected and/or for which the response is (or may be) valid; (ii) a timing correction which may be calculated by the random access preamble receiver; (iii) a scheduling grant; and/or (iv) a TC-RNTI.

A scheduled (or granted) transmission may be made by a WTRU at 206. The WTRU may use allocated resources indicated by the scheduling grant (which may be included in the RAR) to transmit a message at 206, such as a RRC Connection Request. If the WTRU is connected to a known cell (e.g., in RRC_CONNECTED state), the WTRU may have a C-RNTI that it may include in the uplink message. Otherwise a core network terminal identifier may be used. The uplink transmission (UL SCH) may be scrambled by the WTRU using a TC-RNTI received in the RAR.

Contention resolution may be performed and/or used at 208. The eNB may send a contention resolution message, e.g., on PDCCH (or EPDCCH), which may be based on C-RNTI or a WTRU contention resolution identity, e.g., the core network terminal identifier which a WTRU may have sent in msg3 (206). A WTRU that observes a match between an indication or identity received at 208 and an indication or identity it transmitted at 206 may declare the RA procedure successful. Contention between WTRUs that choose the same PRACH time-frequency resource and the same preamble may be resolved in this manner.

For RA such as contention-based RA, the WTRU may derive the common pool of preambles from parameters which may be provided by the network. From these parameters, the WTRU may derive a full set of preambles, e.g., a certain number such as 64 preambles, which may be based on one or more root Zadoff-Chu sequences. A parameter that may designate the sequence or sequences to use may be rootSequenceIndex. The WTRU may receive additional parameters which may indicate a subset of the preambles that may be used by the WTRU and how to divide this subset into groups such as two groups, A and B. For example, numberOfRA-Preambles may define the subset of preambles. The first sizeOfRA-PreamblesGroupA may be in group A (e.g., preambles 0 to sizeOfRA-PreamblesGroupA−1), and the remaining preambles in the subset, if any (e.g., sizeOfRA-PreamblesGroupA to numberOfRA-Preambles−1), may be in Group B. When to use a Group A vs. a Group B preamble may be known to the WTRU. The decision may be based on criteria such as the size of msg3 and/or pathloss (PL). Preambles in the full set that are not in Group A or B may be used by the network when it assigns dedicated preambles, e.g., for contention-free RA.

A PRACH Configuration Index, e.g., prach-ConfigIndex, may be used by the network to tell a WTRU (and/or by a WTRU to determine) which of a preset list of possible configurations it is (or may be) choosing for the cell's configured set of PRACH resources. The preset configurations may define, for example for FDD, one or more of the preamble format, which may define the time for the preamble cyclic prefix (CP) and the time for the preamble sequence, the system frame numbers (SFNs) in which PRACH may be allowed (e.g., any, even only, odd only), and the subframes of the allowed SFNs (e.g., a specific 1, 2, 3, 4, 5, or all 10 subframes) in which PRACH may be allowed.

In UL transmissions, a WTRU may perform power control based on a number of factors which may include: (1) measured pathloss on the DL carrier; (2) transmit power control (TPC) commands (e.g., from the eNB); (3) the number of resource blocks on which it may transmit; and/or (4) other static or semi-static parameters, among others.

The static or semi-static parameters may be provided by the eNB or other network resources. The parameters and/or the power control formula and/or the power control procedure may be established based on or found in, for example, LTE or LTE-A standards. The power control procedure may account for a possibility that the calculated transmit power of the WTRU may exceed its maximum allowed transmit power and may provide that the WTRU scale back the transmit power so as not to exceed the maximum allowed transmit power.

The maximum allowed transmit power (or the configured maximum output power), $P_{CMAX}$, may be a function of one or more of the power class of the WTRU, a power limit that may be signaled by the eNB and/or power reductions the WTRU may be permitted to make, which may be based on the signals to be transmitted by the WTRU to, for example, avoid exceeding out-of-band emissions requirements or allowed values or levels. For example, for LTE/LTE-A transmissions, the WTRU may reduce its maximum output power based on Maximum Power Reductions (MPR) and/or additional MPR (A-MPR) and/or one or more allowed tolerance values such as $\Delta Tc$ and $\Delta Tib$, and/or other allowed reductions. MPR, A-MPR, $\Delta Tc$, and $\Delta Tib$ values may be found in the LTE/LTE-A standards. Which values the WTRU may use may be based on a combination of one or more of certain transmission characteristics and signaling from the eNB. The values may be considered by the WTRU to be maximum allowed values and as such the WTRU may use the MPR, A-MPR, $\Delta Tc$, $\Delta Tib$ values and/or other lesser values. A power management power reduction (P-MPR) may also be used to reduce $P_{CMAX}$.

It is contemplated that one or more (e.g., all) of maximum allowed transmit power, maximum allowed power, maximum allowed output power, maximum allowed transmission power, maximum transmit power, maximum power, maximum output power, maximum transmission power, maximum UL transmission power, configured maximum output power, and/or maximum configured output power may be used interchangeably.

A WTRU that supports carrier aggregation, for example according to LTE Release 10 (R10), may be configured with one or more serving cells (or component carriers (CCs)), and for each CC, the WTRU may be configured for UL communication. It is contemplated that the CC and the serving cell may be used interchangeably and still be consistent with the embodiments contained herein.

A WTRU may perform power control (PC) for each UL channel on each component carrier (or CC), c. There may be a configured maximum output power, $P_{CMAX,c}$, for each UL carrier (or CC). There may be more than one $P_{CMAX,c}$ for an UL CC, for example for a primary CC. A WTRU may perform PC on a subframe basis and may determine (e.g., only determine) the power for channels for which it is to make or will make an UL transmission in the subframe.

A transmission power for a PUCCH may be determined, for example by a WTRU. In an example, PUCCH power, such as LTE-A PUCCH power, may be determined according to:

$$P_{PUCCH}(i) = \min\begin{cases} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{cases} \quad \text{Eq. 1}$$

$P_{CMAX,c}(i)$ is a configured maximum output power for serving cell c, and it may be configured by the WTRU to a value between a high value which may be equal to MIN (Pemax$_c$, Ppowerclass) and a low value which may be equal to the minimum of Pemax,c and Ppowerclass minus a combination of allowed power reductions which depending on the situation may include one or more of MPR, A-MPR, P-MPR, $\Delta Tc$, and $\Delta Tib$. The power reductions may be WTRU or CC specific. Ppowerclass may be the maximum power of the WTRU's powerclass. Pemax$_c$ may be a maximum allowed output power for CC c which may be signaled to the WTRU, for example by the eNB via RRC signaling and may correspond to the signaled p-max for that CC.

$\Delta_{F\_PUCCH}(F)$ is a function of the PUCCH format used for the transmission $h(n_{CQI}, n_{HARQ}, n_{SR})$ is a function of the PUCCH format and the number of bits of each type (CQI, HARQ, SR) being transmitted.

$P_{O\_PUCCH}$ is a parameter which may be composed of 2 parameters (e.g., $P_{O\_NOMINAL\_PUCCH}$ and $P_{O\_UE\_PUCCH}$) which may be provided to the WTRU via RRC signaling.

$PL_c$ is the pathloss for the CC which may be determined by the WTRU, for example from measurements.

g(i) is an adjustment factor, that may be referred to as the PUCCH power control adjustment state. g(i) may include the power ramp-up delta after an RA procedure (which may be zeroed if a new Po is signaled) and/or the accumulation of transmit power control (TPC) commands, $\delta_{PUCCH}$. Accumulation may be as follows:

$$g(i) = g(i-1) + \sum_{m=0}^{M-1} \delta_{PUCCH}(i - k_m)$$

where, for example M=1 and $k_0$=4 may apply for FDD. In another example, which may apply for TDD, the values of M and $k_m$ may be a function of the TDD UL/DL configuration.

TPC commands for PUCCH may be transmitted in certain DCI formats (e.g., PDCCH or EPDCCH with certain DCI formats) such as DCI format 3/3A or with DL grants in DCI formats 1A/1B/1D/1/2A/2B/2C/2, and may be +1 or −1 dB, e.g., in format 3A or 0 (hold), −1, +1, or +3 dB, e.g., in the other formats. If the PDCCH (or EPDCCH) with DCI format 1/1A/2/2A/2B is validated as a semi-persistent scheduling (SPS) activation PDCCH, or the PDCCH with DCI format 1A is validated as an SPS release PDCCH, then $\delta_{PUCCH}$ may be 0 dB.

A transmission power for a PUSCH may be determined, for example by a WTRU. In an example, PUSCH power, such as LTE-A PUSCH power, may be determined according to:

$$P_{PUSCH,c}(i) = \min\begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix} \quad \text{Eq. 2}$$

where the PUCCH term may or may only be present (or non-zero) when PUSCH and PUCCH are being transmitted simultaneously in subframe i.

The parameters in Eq. 2 may be similar to those described for PUCCH power. For PUSCH, the adjustment factor which may be an accumulation of TPC commands may be represented by a CC specific term, $f_c(i)$. $f_c(0)$ may be a function of the power ramp-up delta after an RA procedure and/or the TPC command which may be received in a RAR.

$M_{PUSCH,c}$ may be the bandwidth of the PUSCH resource assignment which may be expressed in a number of resource blocks.

$P_{O\_PUSCH,c}(j)$ is a parameter which may be composed of the sum of a component $P_{O\_NOMINAL\_PUSCH,c}(j)$ and a component $P_{O\_UE\_PUSCH,c}(j)$ which may have known values or may be provided by higher layers. The value of j may be a function of the type of transmission. For example, for PUSCH (re)transmissions which may correspond to a semi-persistent grant, j may be 0. For PUSCH (re)transmissions which may correspond to a dynamic scheduled grant, j may be 1. For PUSCH (re)transmissions which may corresponding to a RAR grant j may be 2.

$\alpha_c(j)$ may, for example based on the value of j, be a known value or may be provided by higher layers.

A transmission power for a PRACH may be determined, for example by a WTRU. In an example, PRACH power, such as LTE-A PRACH power, may be determined according to:

$$P_{PRACH} = \min\{P_{CMAX,c}(i), \text{PREAMBLE\_RECEIVED\_TARGET\_POWER} + PL_c\} \quad \text{Eq. 3}$$

where PREAMBLE_RECEIVED_TARGET_POWER may be indicated by higher layer.

$P_{CMAX,c}(i)$ may be a configured maximum output power for serving cell c, for example as described for PUCCH power. $PL_c$ may be the pathloss for the CC which may be determined by the WTRU, for example from measurements.

The PREAMBLE_RECEIVED_TARGET_POWER may be determined, for example in a higher layer such as the MAC layer, by the WTRU. The determination may, for example, be according to:

PREAMBLE_RECEIVED_TARGET_POWER={preambleInitial-
ReceivedTargetPower+DELTA_PREAMBLE+
(PREAMBLE_TRANSMISSION_COUNTER−
1)*powerRampingStep} Eq. 4

The value of preambleInitialReceivedTargetPower and/or powerRampingStep may be configured by the eNB, for example via signaling such as broadcast or dedicated signaling.

DELTA_PREAMBLE may be determined as a function of the PRACH format which the WTRU may use which may be according to configuration and/or signaling from the eNB such as broadcast or dedicated signaling.

PREAMBLE_TRANSMISSION_COUNTER may be used to ramp the power for PRACH transmissions. PREAMBLE_TRANSMISSION_COUNTER may be set to 1 for the first PRACH transmission and increased +1 for each PRACH retry or retransmission. Power ramping by the powerRampingStep may be accomplished in this manner.

The physical resources which may be used for PUCCH may depend on parameters, e.g., $N_{RB}^{(2)}$ and $N_{CS}^{(1)}$, which may be provided by higher layers. The parameter, $N_{RB}^{(2)}$, which may be an integer greater than or equal to 0, denotes the bandwidth in terms of resource blocks that are available for use by certain PUCCH formats for transmission, such as PUCCH formats 2/2a/2b, in each slot. The variable $N_{CS}^{(1)}$ denotes the number of cyclic shifts which may be used for PUCCH formats, such as PUCCH formats 1/1a/1b, in a resource block which may be used for a mix of certain formats such as formats 1/1a/1b and 2/2a/2b. The value of $N_{CS}^{(1)}$ may be an integer multiple of $\Delta_{shift}^{PUCCH}$ which may be within the range of $\{0, 1, \ldots, 7\}$, where $\Delta_{shift}^{PUCCH}$ may be provided by higher layers. In an example, no mixed resource block may be present if $N_{CS}^{(1)}$=0. One (e.g., at most one) resource block in each slot may support a mix of formats 1/1a/1b and 2/2a/2b. Resources which may be used for transmission of PUCCH formats 1/1a/1b, 2/2a/2b and 3 may be represented by the non-negative indices $n_{PUCCH}^{(1,\tilde{p})}$, $$n_{PUCCH}^{(2,\tilde{p})} < N_{RB}^{(2)} N_{sc}^{RB} + \left\lceil \frac{N_{cs}^{(1)}}{8} \right\rceil \cdot (N_{sc}^{RB} - N_{cs}^{(1)} - 2),$$

and $n_{PUCCH}^{(3,\tilde{p})}$, respectively.

A block of complex-valued symbols $z^{(\tilde{p})}(i)$ may be multiplied with the amplitude scaling factor $\beta_{PUCCH}$, for example to conform to the transmit power $P_{PUCCH}$, and may be mapped in sequence starting with $z^{(\tilde{p})}(0)$ to resource elements. PUCCH may use one resource block in each of the two slots in a subframe. Within the physical resource block that may be used for transmission, the mapping of $z^{(\tilde{p})}(i)$ to resource elements (k,l) on antenna port p and not used for transmission of reference signals may be in increasing order of first k, then l and finally the slot number, starting with the first slot in the subframe. An example of the relation between the index $\tilde{p}$, and the antenna port number p may be given by Table 1.

TABLE 1

Example of Antenna ports used for different physical channels and signals

| Physical channel or signal | Index $\tilde{p}$ | Antenna port number p as a function of the number of antenna ports configured for the respective physical channel/signal | | |
|---|---|---|---|---|
| | | 1 | 2 | 4 |
| PUSCH | 0 | 10 | 20 | 40 |
| | 1 | — | 21 | 41 |
| | 2 | — | — | 42 |
| | 3 | — | — | 43 |
| SRS | 0 | 10 | 20 | 40 |
| | 1 | — | 21 | 41 |
| | 2 | — | — | 42 |
| | 3 | — | — | 43 |
| PUCCH | 0 | 100 | 200 | — |
| | 1 | — | 201 | — |

The physical resource blocks which may be used for transmission of PUCCH in slot $n_s$ may be given by the following:

$$n_{PRB} = \begin{cases} \left\lfloor \frac{m}{2} \right\rfloor & \text{if } (m+n_s \bmod 2) \bmod 2 = 0 \\ N_{RB}^{UL} - 1 - \left\lfloor \frac{m}{2} \right\rfloor & \text{if } (m+n_s \bmod 2) \bmod 2 = 1 \end{cases}$$

where the variable m may depend on the PUCCH format.

In an example, for formats 1, 1a and 1b, m may be determined according to:

$$m = \begin{cases} N_{RB}^{(2)} & \text{if } n_{PUCCH}^{(1,\tilde{p})} < c \cdot N_{cs}^{(1)} / \Delta_{shift}^{PUCCH} \\ \left\lfloor \frac{n_{PUCCH}^{(1,\tilde{p})} - c \cdot N_{cs}^{(1)} / \Delta_{shift}^{PUCCH}}{c \cdot N_{sc}^{RB} / \Delta_{shift}^{PUCCH}} \right\rfloor + N_{RB}^{(2)} + \left\lceil \frac{N_{cs}^{(1)}}{8} \right\rceil & \text{otherwise} \end{cases}$$

$$c = \begin{cases} 3 & \text{normal cyclic prefix} \\ 2 & \text{extended cyclic prefix} \end{cases}$$

In another example, for formats 2, 2a and 2b, m may be determined according to:

$$m = \lfloor n_{PUCCH}^{(2,\tilde{p})} / N_{sc}^{RB} \rfloor.$$

In another example, for format 3, m may be determined according to:

$$m = \lfloor n_{PUCCH}^{(3,\tilde{p})} / N_{SF,0}^{PUCCH} \rfloor.$$

Mapping of modulation symbols for the PUCCH may be, for example, as illustrated in Table 2.

TABLE 2

Example mapping to physical resource blocks for PUCCH.

| $n_{PRB} = N_{RB}^{UL} - 1$ | m = 1 | m = 0 |
| . | m = 3 | m = 2 |
| . | | |
| . | m = 2 | m = 3 |
| $n_{PRB} = 0$ | m = 0 | m = 1 |
| | ← One Subframe → | |

A shortened PUCCH format may be used, where the last SC-FDMA symbol, e.g., in the second timeslot, of a subframe may be left empty, for example in the case of simultaneous transmission of a SRS and a PUCCH. The shortened PUCCH may apply for one or more of PUCCH formats 1, 1a, 1b and/or 3. The shortened PUCCH may apply when there may be one serving cell configured or one serving cell with configured and/or activated UL.

HARQ-ACK transmission on two antenna ports, e.g., ($p \in [p_0, p_1]$), may be supported for certain PUCCH formats such as PUCCH format 1a/1b.

The WTRU may use PUCCH resource $n_{PUCCH}^{(e,\tilde{p})}$ for transmission of HARQ-ACK in subframe n for $\tilde{p}$ mapped to antenna port p for certain PUCCH formats such as PUCCH formats 1a/1b.

In an example, which may include one serving cell and/or may use FDD, for a PDSCH transmission (e.g., in subframe n−4) which may be indicated by the detection of a corresponding PDCCH in subframe n−4, or for a PDCCH which may indicate downlink SPS release in subframe n−4, the WTRU may use $n_{PUCCH}^{(1,\tilde{p}_0)} = n_{CCE} + N_{PUCCH}^{(1)}$ for antenna port $p_0$, where $n_{CCE}$ is the number of the first control channel element (CCE) (e.g., the lowest CCE index used to construct the PDCCH) used for transmission of the corresponding DCI assignment, and $N_{PUCCH}^{(1)}$ may be configured by higher layers. For two antenna port transmission, the PUCCH resource for antenna port $p_1$ may be given by $n_{PUCCH}^{(1,\tilde{p}_1)} = n_{CCE} + 1 + N_{PUCCH}^{(1)}$.

In another example, which may use FDD, for a PDSCH transmission on a cell (e.g., a primary cell) where there may not be a corresponding PDCCH detected in subframe n−4, for example in case of DL SPS, the value of $n_{PUCCH}^{(1,\tilde{p})}$ may be determined, for example, according to a mapping such as by higher layer configuration and/or a table such as Table 3. Signaling, e.g., a PUCCH TPC command, may be used to select the mapping, e.g., in the table. The PUCCH resource value may map to a single PUCCH resource $n_{PUCCH}^{(1,\tilde{p}_0)}$ for antenna port $p_0$, for example for single antenna port transmission. For a WTRU configured for two antenna port transmission, a PUCCH resource value, e.g., in Table 3, may map to two PUCCH resources, for example with the first PUCCH resource $n_{PUCCH}^{(e,\tilde{p}_0)}$ for antenna port $p_0$ and the second PUCCH resource $n_{PUCCH}^{(1,\tilde{p}_1)}$ for antenna port $p_1$.

TABLE 3

Example PUCCH Resource value for Downlink Semi-Persistent Scheduling

| Value of 'TPC command for PUCCH' | $n_{PUCCH}^{(1,p)}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

System information may be provided, e.g., by an eNB and/or used, e.g., by a WTRU. A WTRU may acquire cell and/or network related system information that it may use for cell selection, access, and/or connection establishment, among others. The system information may be broadcasted by the cell in blocks. One or more information blocks may be used by a WTRU for a cell. One cell may provide system information for another cell. For example a primary cell may provide system information for a secondary cell for carrier aggregation.

A MIB may be provided and/or used. A MIB may be transmitted on the PBCH in a certain subframe such as subframe 0 and may have a fixed transmission time interval (TTI), e.g., 40 ms. The MIB may be repeated, e.g., every 10 ms. The information contained in this block may include one or more of at least part of the SFN (e.g., the 8 most significant bits of the SFN), configured DL bandwidth of the cell, and/or PHICH configuration for the cell. By acquiring 1 of the 4 repeated MIBs in the 40 ms TTI, the WTRU may be able to derive the 2 least significant bits of the SFN for the full SFN value.

A System Information Block (SIB) may be transmitted on a PDSCH. The resource location of a SIB may be indicated by (E)PDCCH which may be scrambled with System Information (SI)-RNTI. A SIB, e.g., SIB Type 1 (SIB1), may provide information a WTRU may use for access to the cell and/or network, and/or scheduling information for other SIBs. The SIB, e.g., SIB1, may be transmitted in a certain subframe such as subframe 5, may have a TTI which may be fixed (e.g., 80 ms), and/or may be repeated periodically (e.g., every 20 ms).

A SIB, e.g., SIB Type 2 (SIB2) may be transmitted on a PDSCH based on scheduling information which may be contained in another SIB, e.g., SIB1. The resource location may be indicated by (E)PDCCH scrambled by SI-RNTI. A SIB, e.g., SIB2, may provide information a WTRU may use to access and/or initiate connectivity with the cell and/or network. The information in the SIB, e.g., SIB2, may include one or more of channel common configuration such as for PRACH and/or RACH, Multimedia Broadcast multicast service Single Frequency Network (MBSFN) subframe configuration, UL information, among others.

Scheduling Information which may include a scheduling information list for system information (SI) messages may be provided and/or used. The scheduling information list, e.g., schedulingInfoList, may provide a mapping of SIBs to SI messages except, for example SIB1. A (e.g., each) SI message may contain one or more SIBs and/or each SIB may or may only be mapped to one SI message. Scheduling of SIs may be based on periodicity of the system information and/or SI-window length. For example, SIBs (e.g., only SIBs) which may have the same periodicity may be mapped to the same SI message. SIB2 may or may always be mapped to a certain SI message such as to the SI message that may correspond to the first entry in the list of SI messages in the scheduling information list. The eNodeB may have some flexibility in the time and frequency resource for sending SIBs.

Other SIB information may be related to cell reselection information, handover, Multimedia Broadcast Multicast Service (MBMS), emergency and/or warning system related information that the WTRU may use, among others. Some of the SIBs may be optional based on the configuration of the cell and/or network, and may not be transmitted by the cell.

Methods and procedures for link adaptation of PRACH may be provided and/or used.

Downlink measurements may include measurements of one or more of reference signal receive power (RSRP), pathloss, and/or wideband channel quality indicator (CQI). A downlink measurement may include one or more of a measurement defined as a function of RSRP, a measurement defined as a function of pathloss, and/or a measurement defined as a function of wideband CQI. It is contemplated that RSRP may be replaced by another downlink measurement such as pathloss, wideband CQI, a measurement defined as a function of RSRP, a measurement defined as a function of wideband CQI, among others, while remaining consistent with an embodiment.

A PRACH preamble may be transmitted, e.g., repetitively, over two or more subframes, for example in order to enhance coverage. A WTRU may transmit a PRACH preamble, that may be chosen (e.g., by the WTRU) for random access such as contention-based random access, in one or more subframes where PRACH resources may be configured. The number of subframes in which the WTRU may transmit the same PRACH preamble (e.g., repetitively) may be different, for example according to a coverage enhancement (CE) level, e.g., of the WTRU. For example, N1 repetitions may be used for CE level-1. A WTRU which may be configured to or may select CE level-1 may or may need to transmit the PRACH preamble, that may be chosen for random access such as contention-based random access, N1 times (e.g., in N1 subframes), where each transmission may be in an associated PRACH resource which may correspond to N1 subframes. If a WTRU may be configured to or may select CE level-2, the WTRU may or may need to transmit the PRACH preamble, that may be chosen for random access such as contention-based random access, N2 times (e.g., in N2 subframes) where each transmission may be in an associated PRACH resource which may correspond to N2 subframes. If CE level-2 has better coverage enhancement than CE level-1, N2 may be a larger value than N1. The CE level and/or associated parameters for each CE level may include, but may not be limited to, one or more of PRACH resource configuration, power control parameters, and/or number of repetitions. There may be, or an eNB may support, a number of CE levels, for example L or up to L levels, where L may be 3. The number of CE levels, e.g., which may be supported by an eNB and/or one or more CE levels and/or associated parameters for the CE levels may be provided by signaling such as broadcast signaling, e.g., from an eNB which may support CE or WTRUs in CE mode.

CE mode may correspond to a mode of operation in which one or more CE levels is (are) supported and/or used and/or coverage enhancement techniques may be used, for example by a WTRU and/or eNB.

It is contemplated that a WTRU configured with or for a certain mode such as CE mode may use or be in that mode. In some embodiments, configured with or for a mode may be used interchangeably with using the mode or being in the mode.

In an embodiment, the PRACH resources for two or more CE levels may be multiplexed in the code domain while the same PRACH time/frequency resources may be used for two or more CE levels. A number of PRACH preambles, e.g., $N_{PRACH}$, may be configured for CE mode, and the $N_{PRACH}$ preambles may be grouped and/or partitioned into multiple subsets which may correspond to the number of CE levels supported in the cell. Time/frequency may correspond to and/or may be used to represent time and/or frequency.

In an example, the $N_{PRACH}$ preambles may be grouped into the number of CE levels supported (e.g., by the eNB or cell) and each CE level may have a number (e.g., the same number) of PRACH preambles. The number of CE levels may be provided by the eNodeB as a parameter such as $N_{CE}$. A WTRU may determine or derive the preambles that belong to each CE level using $N_{PRACH}$ and/or $N_{CE}$. For example, in each CE level, Ngrp=$\lfloor N_{PRACH}/N_{CE} \rfloor$ preambles may be grouped.

The PRACH preambles may, for example, be grouped in ascending order. The first (e.g., lowest number or index) preambles (e.g., Ngrp preambles) which may be in the set of $N_{PRACH}$ preambles may be associated with a first CE level (e.g., the CE level with the lowest number or configured index and/or the least or lowest CE). The next group (e.g., next higher number or index) of preambles (e.g., Ngrp preambles) may be associated with the next CE level (e.g., the CE level with the next higher number or configured index and/or next highest CE), and so on.

The PRACH preambles may, for example, be grouped in descending order. The highest number or index preambles (e.g., Ngrp preambles) which may be in the set of $N_{PRACH}$ preambles may be associated with a first CE level (e.g., the CE level with the lowest number or configured index and/or the least or lowest CE). The next group (e.g., next lower number or index) preambles (e.g., Ngrp preambles) may be associated with the next CE level (e.g., the CE level with the next higher number or configured index and/or next highest CE), and so on.

If the number of PRACH preambles is not divisible by $N_{CE}$, the remainders may belong to a certain CE level. The certain CE level may be the first CE level (e.g., the CE level with the lowest number or configured index and/or the least or lowest CE). Alternatively, the certain CE level may be the last CE level (e.g., the CE level with the highest number or configured index and/or the most or highest CE).

In another example, PRACH preambles for each CE level may be (e.g., explicitly) indicated for example by the eNodeB such as via broadcasting signaling and/or a SIB. A PRACH preamble list may be provided for each CE level which may identify specific preambles for each CE level.

A starting (or first) PRACH preamble (or preamble index or indication) and a number of preambles may (e.g., may both) be provided for each CE level where the preambles for a CE level may be consecutive.

A starting (or first) PRACH preamble (or preamble index or indication) may be provided and a number of preambles for each CE level may be provided. The preambles for each CE level may be consecutive and the groups of preambles for the different CE levels may be adjacent. The WTRU may have knowledge of which level begins with the provided starting (or first) preamble and may use the number of preambles in a first CE level to determine the starting (or first) PRACH preamble of a second CE level. The WTRU may determine the preambles in each group from the starting preamble, the number of groups and the number of preambles in each group. If the number of preambles in each group is the same, one value may be used to represent the number of preambles instead of one value per CE level. If the number of preambles in each group is the same and is known to the WTRU (e.g., a fixed known value), the number of preambles in each group may not be provided, e.g., only the starting (or first) PRACH preamble (or preamble indication) may be provided by the eNodeB.

Figure 3:
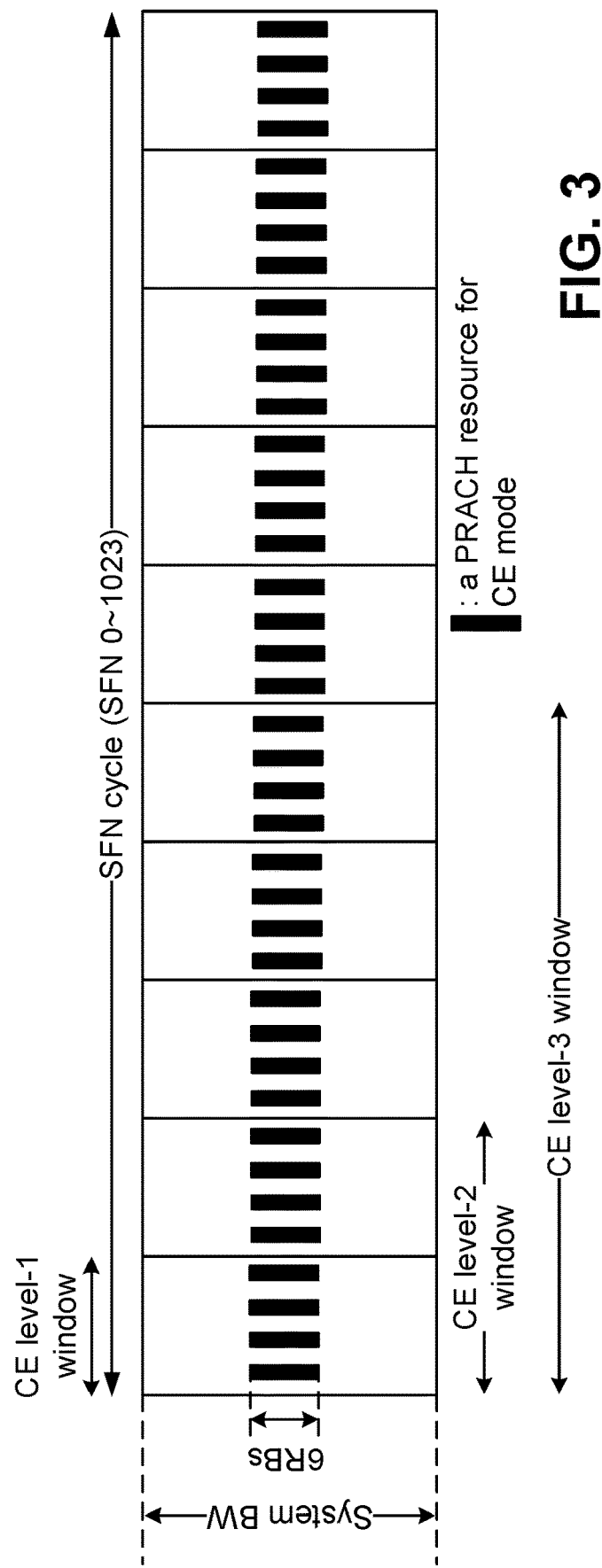
FIG. 3 illustrates an example of a physical random access channel (PRACH) window according to a CE level.

In an embodiment, the starting subframe for a PRACH preamble transmission may be configured separately for each CE level and/or different according to the CE level. Each CE level may have a certain PRACH time window in which a PRACH preamble may be (or may need to be) transmitted, e.g., repetitively. FIG. 3 illustrates an example of a PRACH transmission time window according to the CE level. In the example in FIG. 3, the CE level-1 window may include 4 PRACH resources so that a PRACH preamble belonging to CE level-1 may be (or may need to be) transmitted 4 times in this window, e.g., N1=4. The CE level-2 window may include 8 PRACH resources which may be two times larger than that of CE level-1, e.g. N2=8. In the example in FIG. 3, the time windows for the CE levels may be overlapped.

A WTRU may select or be configured with a certain CE level and may transmit a PRACH preamble belonging to a set of PRACH preambles which may be associated with the CE level in a PRACH resource (e.g., selected time/frequency resource). The PRACH preamble may be transmitted in a (or the) first PRACH resource within a PRACH window and may be repetitively transmitted in other PRACH resources within the PRACH window.

The PRACH window (which may be or may be referred to as a number of consecutive subframes) may be (or may be defined as) a function of PRACH resource configuration (which may be referred to as PRACH subframe configuration) and/or the number of repetitions of or associated with PRACH preamble transmission for a certain CE level. Within a PRACH window associated with a CE level, a PRACH preamble which may belong to the CE level may be or may need to be transmitted in one or more (e.g., all) of the PRACH resource(s) configured for the CE level within the window.

The PRACH windows for one or more CE levels may be overlapped in time. For example, as illustrated in FIG. 3, a CE level-2 PRACH window may be overlapped with one or more CE level-1 PRACH windows. PRACH resources (e.g., time and/or frequency resources) may be shared by two or more CE levels and mutually exclusive PRACH preambles (or non-overlapped PRACH preamble set) may be used to multiplex one or more CE levels in the same PRACH resources, for example in this case and others. For example, a PRACH preamble which may belong to the PRACH preamble group associated with CE level-1 (e.g., PRACH preamble index 0 through N) may be transmitted, e.g., repetitively, over 4 subframes containing PRACH resources. A different PRACH preamble belonging to the PRACH preamble group associated with CE level-2 (e.g., PRACH preamble index N+1 through M) may be repetitively transmitted over 8 subframes containing PRACH resources, where the PRACH resources (e.g., time and/or frequency resources) may be shared by CE level-1 and CE level-2. PRACH resources (e.g., time and/or frequency resources) may be non-overlapped for multiple CE levels. For example, a PRACH resource for CE level-1 may not be used for other CE levels. One or more (e.g., all) PRACH preambles may be the same for multiple (e.g., all) CE levels, for example when PRACH resources for the CE levels may be non-overlapped.

The PRACH window for a CE level may be located in a subset of subframes. For example, the PRACH window for CE level-1 may be located in (e.g., only in) even numbered radio frames and the PRACH window for CE level-2 may be located in (e.g., only in) odd numbered radio frames.

Figure 4:
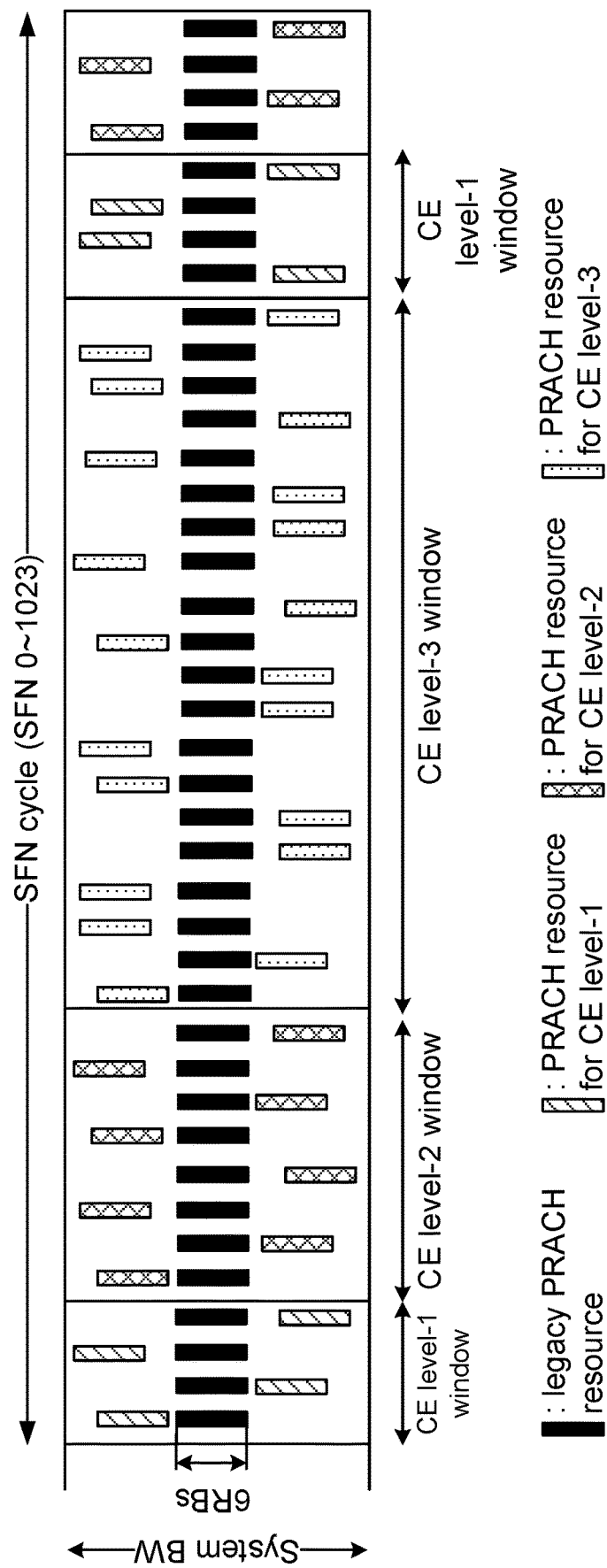
FIG. 4 illustrates an example of PRACH resource frequency division multiplexing (FDM) between normal mode and CE mode.
Figure 5:
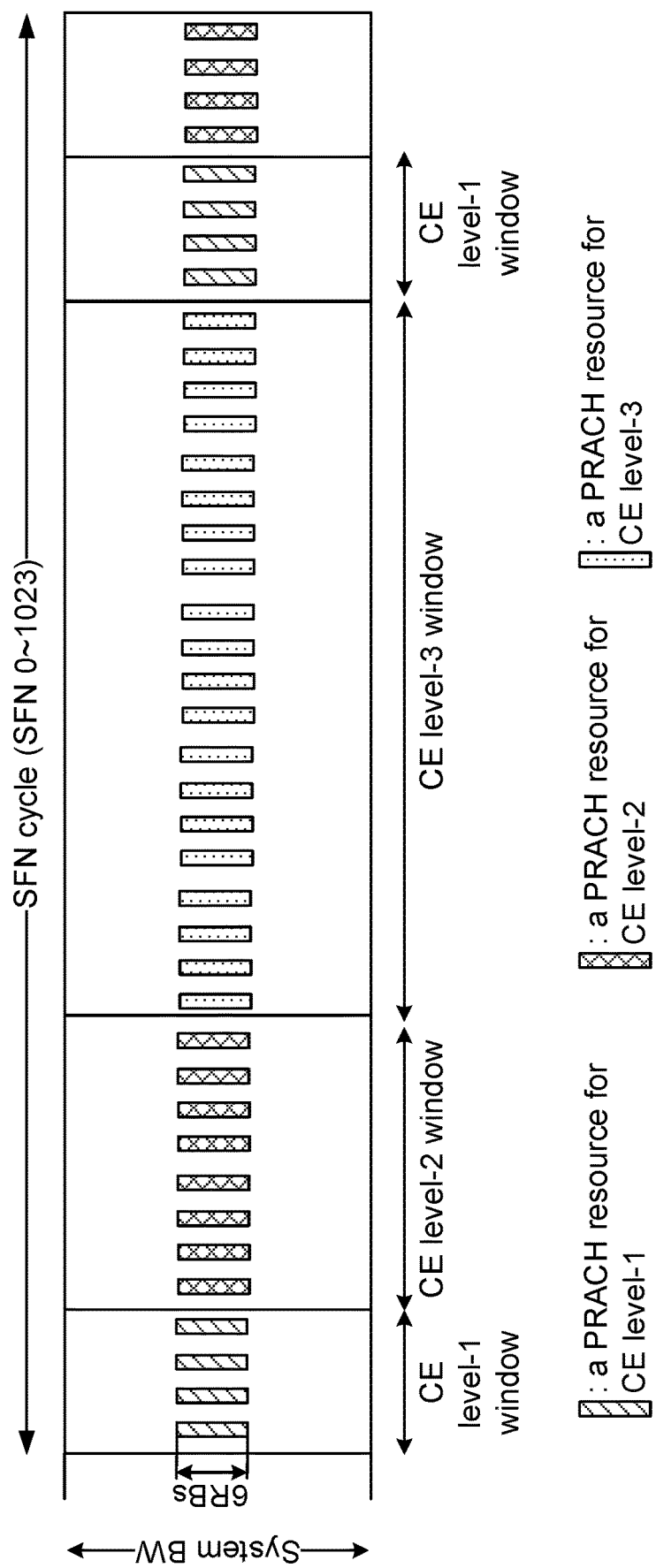
FIG. 5 illustrates an example of PRACH resource code division multiplexing (CDM) between normal mode and CE mode.

In another embodiment, the PRACH resources for two or more CE levels may be multiplexed in non-overlapped or partially overlapped time/frequency resources. For example, PRACH resources for CE levels such as CE level-1 and CE level-2 may be located in one or more different subframes and/or different frequency bands (e.g., different RBs) from each other and/or PRACH resources (e.g., legacy PRACH resources) which may be used for non-CE operation. FIG. 4 and FIG. 5 illustrate examples of time and/or frequency domain multiplexing of PRACH resources for two or more CE levels.

A set of time and/or frequency PRACH resources may be configured for CE mode (e.g., for one or more CE levels) and the PRACH resources for CE mode may be non-overlapped (in time and/or frequency) with PRACH (e.g., legacy PRACH) resources which may be used for normal mode (e.g., non-CE mode) and/or may be used without PRACH repetitions.

The PRACH resources for CE mode may be located in a frequency band (e.g., RBs) which may be non-overlapped with the PRACH resources for normal (e.g., non-CE) mode.

The PRACH resources for CE mode may be in subframes containing other (e.g., legacy) PRACH resources in a different frequency band (e.g., RBs) from the PRACH resources which may be used for CE mode. The frequency location(s) for CE mode may be changed over time, for example to achieve frequency diversity gain. For example, a frequency-hopping pattern may be defined for the PRACH resources for CE mode while the frequency location for normal mode may be fixed or semi-static.

The set of preambles which may be used for non-CE (e.g., legacy) operation may be reused for CE mode, for example when the time and/or frequency resources for PRACH for CE mode are non-overlapped with the time and/or frequency resources for PRACH (e.g., legacy PRACH) for non-CE mode.

FIG. 4 illustrates an example of PRACH resource frequency division multiplexing (FDM) between normal mode and CE mode.

A set of PRACH time and/or frequency resources may be configured for CE mode. The PRACH resources may be shared with PRACH resources (e.g., legacy PRACH resources) which may be used for normal mode and/or which may not use or support PRACH repetitions. The PRACH preambles may be partitioned for normal mode and CE mode. For example, a number M (e.g., 64) PRACH preambles may be configured (or available) for both normal mode and CE mode, and the first N preambles may be used for normal mode and the next P (P≤M−N) preambles may be used for CE mode. This may be applicable when PRACH resources may be shared for normal and CE use. In another example M (e.g., 64) PRACH preambles may be configured (or available) for both normal mode and CE mode, and the first N preambles may be used for normal mode (e.g., for contention based RA) and the next P (P≤M−N) preambles may be used for CE mode (e.g., for contention based RA). The next Q (Q=M−N−P or Q≤M−N−P) preambles may be used for non-contention based RA for normal or CE mode and the mode may depend on the WTRU to which the preamble is assigned, e.g., based on the mode in which the WTRU may be operating. This may be applicable when PRACH resources may be shared for normal and CE use. FIG. 5 illustrates an example of PRACH resource Code Division Multiplexing (CDM) between normal mode and CE mode.

A means for CE level determination for PRACH transmission may be provided and/or used.

Two or more CE levels may be used for PRACH transmission and each CE level may be associated with one or more PRACH resource(s) which may include time/frequency resources and PRACH preambles. The associated PRACH resources for the CE levels may be non-overlapped (e.g., in at least one of time and/or frequency and/or preamble). A WTRU may determine the associated PRACH resource for PRACH transmission based on the CE level determined and/or configured.

In an embodiment, a WTRU may determine a CE level (or starting CE level) as a function of a downlink measurement. The CE level may be changed, e.g., by the WTRU, in or for a subsequent PRACH preamble transmission, for example based on the number of PRACH preamble retransmissions (or attempts) in the current CE level.

A WTRU may determine a CE level (or starting CE level) within the multiple CE levels supported in a cell from a downlink measurement. For example, if the RSRP measurement result is x dB, the WTRU may select a CE level based on the x dB.

A mapping rule between an RSRP value or a range of RSRP values and a CE level may be used. For example, a look-up table where an RSRP measurement result is mapped onto a specific CE level may be used. A WTRU may measure RSRP and determine CE level by using the mapping rule (e.g., look-up table). If the CE level selected from the mapping rule is not supported in the cell, a higher CE level may be selected instead where the higher CE level may have a larger repetition number. The mapping may be a function of WTRU implementation and/or configuration which may be provided by the eNB, for example via signaling such as broadcast signaling.

The CE level may be determined based on the number of repetitions the WTRU may use which may be determined based on the assumption that maximum uplink transmission power may be used, e.g., for the PRACH transmission. For example, a WTRU may (e.g., first) estimate or determine one or more CE levels which may provide sufficient CE, for example based on a downlink measurement. The WTRU may determine the CE level (or starting CE level) which has the minimum (or lowest) number of repetitions within the CE levels which may provide sufficient CE where it may be assumed that the maximum uplink transmission power is used. The maximum uplink transmission power may be a nominal maximum transmission power (e.g. $P_{EMAX}$, $P_{PowerClass}$, $P_{CMAX\_L}$, or $P_{CMAX\_H}$), or a combination of one or more of $P_{EMAX}$, $P_{PowerClass}$, $P_{CMAX\_L}$, and $P_{CMAX\_H}$. Alternatively, the maximum uplink transmission power may be the $P_{CMAX,c}(i)$ for a certain subframe i, e.g., the subframe in which the PRACH is transmitted by the WTRU.

The PRACH power, PPRACH, in CE mode may be determined as a maximum uplink transmission power (e.g. $P_{CMAX,c}(i)$) while $P_{PRACH}$ in normal mode may be determined as a function of one or more of $P_{CMAX,c}(i)$, PREAMBLE_RECEIVED_TARGET_POWER, and pathloss (e.g., as shown in Eq. 3). Alternatively, $P_{PRACH}$ in CE mode may be determined as a function of one or more of $P_{CMAX,c}(i)$, pathloss (PL), $N_{OFFSET}$, and PREAMBLE_RECEIVED_TARGET_POWER, where the $N_{OFFSET}$ may be determined as a function of at least one of the CE level, PRACH format, and/or the number of repetitions, e.g., for the CE level.

The uplink transmission power $P_{PRACH}$ for CE mode may be determined as $P_{PRACH}=\min\{P_{CMAX,c}(i),\ \text{PREAMBLE\_RECEIVED\_TARGET\_POWER}+PL+N_{OFFSET}\}$, where $N_{OFFSET}$ may be determined as a function of the CE level and/or the number of repetitions, e.g., for the CE level. The PREAMBLE_RECEIVED_TARGET_POWER may be determined as a function of the CE level and/or the number of repetitions, e.g., for the CE level.

PREAMBLE_RECEIVED_TARGET_POWER may be determined as a function of the CE level. For example, PREAMBLE_RECEIVED_TARGET_POWER=preambleInitialReceivedTargetPower+DELTA_PREAMBLE+DEL- TA_OFFSET+(PREAMBLE_TRANSMISSION_COUNTER−1)*powerRampingStep where DELTA_OFFSET may be a function of the CE level and/or the number repetitions for the CE level and/or configuration which may be provided via higher layer signaling.

The CE levels may be defined as or associated with one or more new PRACH preamble formats and DELTA_PREAMBLE may be determined as a function of the PRACH preamble format. For example, CE level-1 may be defined as or associated with PRACH preamble format 5, CE level-2 may be defined as or associated with PRACH preamble format 6, and so on. DELTA_PREAMBLE may be defined for the new PRACH preamble formats, for example as a function of the number of repetitions. PREAMBLE_RECEIVED_TARGET_POWER may be determined according to: PREAMBLE_RECEIVED_TARGET_POWER=preambleInitialReceivedTargetPower+DELTA_PREAMBLE+(PREAMBLE_TRANSMISSION_COUNTER−1)*powerRampingStep Uplink transmission power $P_{PRACH}$ for CE mode may be determined as $P_{PRACH}=\min\{P_{CMAX,c}(i), \text{PREAMBLE\_RECEIVED\_TARGET\_POWER}+PL\}$, where the PREAMBLE_RECEIVED_TARGET_POWER may be CE mode specific or CE level specific.

The maximum uplink transmission power (e.g. $P_{CMAX,c}(i)$) may be used for a subset of CE levels and the uplink transmission power in the other CE levels may be determined as a function of at least one of $P_{CMAX,c}(i)$, pathloss, the number of repetitions which may be used for the CE level, and PREAMBLE_RECEIVED_TARGET_POWER.

The maximum uplink transmission power may be assumed for CE level selection while the actual uplink transmission power for PRACH preamble transmission may be calculated, for example according to one of the equations described herein (which may or may not be numbered) such as Eq. 3, which may be used for non-CE mode and/or legacy PRACH transmissions. The maximum uplink transmission power for CE level selection may be a nominal maximum uplink transmission power (e.g. $P_{EMAX}$, $P_{PowerClass}$, $P_{CMAX\_L}$, or $P_{CMAX\_H}$) or an actual maximum uplink transmission power determined for a certain subframe (e.g. $P_{CMAX,c}(i)$).

A WTRU may calculate or determine the number of repetitions which may be needed, used, and/or sufficient, for example for use with a CE level. The WTRU may calculate or determine the number of repetitions, for example when the WTRU may determine the CE level (e.g., the starting CE level) which may be for PRACH transmission. To calculate the number of repetitions, the WTRU may assume the maximum transmission power (e.g. nominal maximum uplink transmission power or actual maximum uplink transmission power) may be used. The WTRU may determine a number of repetitions which may be included in the supported number of repetitions in the cell (e.g., nearest number greater than or equal to the number or repetitions that may be sufficient) and may use that number of repetitions.

A WTRU may determine the smallest number of repetitions supported in the cell that may be greater than or equal to the number of repetitions determined by the WTRU to be needed or sufficient, for example, if the WTRU's calculated or determined number of repetitions is not available or supported in a cell.

For example, the repetition numbers {5, 10, 20} may be supported in a cell and the repetition numbers may be associated with CE levels {1, 2, 3}. If the number of repetitions calculated (e.g., to be needed or sufficient) based on the maximum transmission power is not in the repetition numbers supported in the cell, a repetition number supported in the cell which is larger than the calculated repetition number may be selected and the transmission power may be adjusted based on the selected repetition number which may not be the maximum transmission power.

The determination of CE level may be based on the uplink transmission power for PRACH preamble transmission that may be calculated or determined using one of the equations described herein, for example Eq. 3 which may be used for non-CE mode and/or legacy PRACH.

The determination of the CE level may be based on the number of repetitions which may at least achieve (e.g., provide enough gain to achieve) the amount by which the calculated power may exceed the maximum power.

The delta power by which the calculated PRACH power exceeds the maximum power, $P_E$, may be calculated as $P_E=P_{PRACH\_REQ}-P_{MAX}$, for example if $P_{PRACH\_REQ}>P_{MAX}$, where $P_{MAX}$ may be the maximum power (e.g. nominal maximum uplink transmission power) and $P_{PRACH\_REQ}$ may be a transmission power needed or calculated for PRACH without repetition, which may be determined as PREAMBLE_RECEIVED_TARGET_POWER+pathloss. The number of repetitions for a certain $P_E$, for example, may be calculated as 10 log 10 (the number of repetitions)=$P_E$. If the number of repetitions calculated is not an integer number, the closest integer number larger than the number of calculated repetitions may be selected and/or used.

In an embodiment, a WTRU may determine the starting CE level as the lowest CE level (e.g., which may use the least amount of repetition) irrespective of the downlink measurement result. For example, a WTRU may determine the uplink transmission power based on downlink measurement and may use the lowest CE level for PRACH preamble transmission. The WTRU may use (or assume) the lowest CE level when determining the transmission power. In another example, a WTRU may transmit a maximum uplink transmission power with the lowest CE level for PRACH preamble transmission.

In another embodiment, the uplink transmission power for the PRACH preamble may be defined, calculated, and/or determined as a function of the number of repetitions. In an example, a CE level specific power offset may be used according to the number of PRACH preamble repetitions. For example, the offset may be to subtract 10 log 10 (the number of repetitions) or a scale factor multiplied by 10 log 10 (the number of repetitions). In another example, uplink transmission power may be scaled with a CE level specific scalar (e.g. α). The scalar may be predefined according to the CE level or configured by higher-layer signaling.

In an embodiment, a WTRU may determine the mode of operation for a transmission such as a PRACH transmission. The determination, which may be or include a selection of normal mode operation or CE mode operation (and/or a CE level), may be based on the channel or channels from or on which the WTRU received (or receives) the MIB. For example, if a WTRU received (or receives) the MIB from the legacy PBCH (e.g., only the legacy PBCH), the WTRU may (or may start to) transmit a PRACH preamble in a normal mode operation. If a WTRU received (or receives) the MIB from a coverage enhanced PBCH (CE PBCH), the WTRU may (or may start to) transmit a PRACH preamble in a CE mode operation. The legacy PBCH may be a PBCH without repetitions within a radio frame. The CE PBCH may be a PBCH with repetitions within a radio frame. For CE PBCH, there may be two or more subframes (or transmissions) containing the PBCH within a radio frame. For legacy PBCH, there may be one (e.g., only one) subframe containing the PBCH per radio frame. The legacy PBCH which may be transmitted in one of the subframes in a radio frame may be included or considered as one of the repetitions for CE PBCH, for example if the CE PBCH may be the same as (e.g., a repetition of) the legacy PBCH. If a WTRU receives (e.g., successfully receives) the MIB from the PBCH using at least one of the repetitions of the PBCH in a radio frame (e.g., other than the legacy transmission), the WTRU may transmit a PRACH preamble using CE mode of operation. If a WTRU receives (e.g., successfully receives) the MIB from the PBCH without using any repetitions of the PBCH in a radio frame (e.g., using only the legacy PBCH), the WTRU may transmit a PRACH preamble using the normal mode of operation. A WTRU may determine the mode of operation for the PRACH transmission based on at least one or more of a downlink measurement, a channel (e.g., legacy PBCH or CE PBCH) from which WTRU may receive (or may have received) the MIB, and the time which may be needed and/or used for initial synchronization and/or MIB acquisition. For CE PBCH, each repetition of PBCH may be referred to as PBCH.

A WTRU may determine the CE level based at least on the number of PBCH repetitions (e.g., in a frame and/or a set of frames such as the frames in the TTI of the MIB) it may need or use to successfully receive the MIB.

In another embodiment, a WTRU may make a RACH CE determination, which may include determining at least one of whether to use CE mode or normal mode (e.g., for an RA procedure), a CE level (e.g., for an RA procedure) and/or a PRACH repetition level, a PRACH resource in time (e.g. subframe) and/or frequency, and a PRACH preamble index for a CE mode RACH procedure. A WTRU may at least make and/or use measurements to make a RACH CE determination. A WTRU may at least receive and/or use information, e.g., from an eNB, to make a RACH CE determination.

A WTRU may use the received signal strength of Synchronization signals, e.g. PSS and/or SSS to make a RACH CE determination.

A WTRU may use the number of PSS and/or SSS accumulated (or that it may accumulate) in time to make a RACH CE determination. For example, a WTRU may determine (e.g., by counting or otherwise keeping track of) the number of subframes over time or total time the WTRU may need or use to properly acquire the PSS and/or SSS and may use that number or time to make a RACH CE determination.

A WTRU may use the number of repetitions accumulated (or that it may accumulate) in time to correctly receive and/or decode the PBCH and/or MIB that may be included in the PBCH to make a RACH CE (e.g., RACH CE mode and/or level) determination. For example, a WTRU may determine (e.g., by counting or otherwise keeping track of) the number of PBCH it may need or use in a MIB TTI (e.g., 40 ms cycle) to properly decode the PBCH and/or MIB. In a "keep trying" PBCH decode method (e.g., in which the WTRU may keep trying over multiple periods of the MIB TTI to successfully decode a PBCH), a WTRU may determine (e.g., by counting or otherwise keeping track of) the number of MIB TTI (e.g., 40 ms) PBCH cycles it may need and/or use to properly decode the PBCH and may use that number or time to make a RACH CE (e.g., RACH CE mode and/or level) determination.

A WTRU may use the means by which PBCH and/or the MIB (which may be included in the PBCH) may be correctly received and/or decoded, for example whether the repetition burst for coverage enhancement may be needed and/or used, to make a RACH CE determination. For example, a WTRU may determine to operate in CE mode for a RACH procedure if PBCH may be decoded with a repetition burst for coverage enhancement and/or if the WTRU may not have been able to properly decode PBCH during a normal repetition cycle (e.g., 40 ms repetition cycle) which may include PBCH once (e.g., only once) per radio frame.

A WTRU may use the number of repetitions it may need to correctly receive and/or decode a SIB or coverage enhancement specific SIB that may be transmitted by the eNodeB, for example with a specific SIB time window and/or scheduling to make a RACH CE determination. For example, a WTRU may determine (e.g., by counting or otherwise keeping track of) the number of repetitions of a SIB which may be used by the WTRU to properly decode the SIB in one or more scheduled SIB time windows to make a RACH CE (e.g., RACH CE mode and/or level) determination.

A WTRU may use information regarding CE mode and/or level it used when last served by a particular cell or neighboring cell to make a RACH CE (e.g., RACH CE mode and/or level) determination. For example, a WTRU may store information regarding CE mode and/or level usage for a particular cell and may use that information to determine CE mode and/or level if a WTRU may select that cell at another (e.g., later) time.

A WTRU may receive, for example during its transition from connected to IDLE mode, a CE mode and/or CE level, e.g. in an RRC connection release message, for one or more cells such as the current serving cell and/or another (e.g., neighbor) cell. CE mode and/or level may be used or may be intended for use by the WTRU when it selects the same cell or another cell, e.g., for camping in IDLE mode. A WTRU may receive CE mode and/or level information during a connection establishment procedure failure (e.g., rejection). The WTRU may use the information for or during a re-attempt at connection establishment on the same cell or another cell.

A PRACH attempt may refer to a set of PRACH preamble transmissions which may include an initial PRACH preamble, which may be followed by preamble repetitions in certain subframes which may be defined for a CE mode PRACH procedure, before a WTRU may attempt to monitor and/or decode for the corresponding RAR, e.g., from an eNodeB. A PRACH preamble retransmission or reattempt may refer to a PRACH preamble re-transmission and subsequent preamble repetition which may follow a failed PRACH procedure.

PRACH power ramping may be provided and/or used.

In an embodiment, a WTRU may apply independent power ramping for a PRACH procedure for CE mode operation. A WTRU may receive from the eNodeB an independent power ramping parameter for PRACH for CE mode operation that may be different from normal mode operation. For example, CE mode specific power ramping parameter may be broadcast in a SIB such as SIB2 or coverage enhanced (CE)-SIB, for example by the eNodeB. A WTRU may receive one or more power control and/or power ramping related parameters for CE mode which may be specific to CE mode.

A WTRU may receive one or more PRACH power control (e.g., open loop power control) parameters such as an initial power value (e.g., preambleInitialReceivedTargetPower), a power ramping value or step (e.g., powerRampingStep), and/or a number of ramping attempts (e.g., PreambleTransMax) which may be specific for CE mode PRACH preamble transmission. For example, a WTRU which may perform CE mode RACH may apply the CE power ramping value to each repetition of the PRACH preamble in a single RACH preamble transmission attempt. The WTRU may maintain the same power (e.g., not increment by the ramping step) for each repetition or may ramp (e.g., increment by the ramping step) the power for each (or each of a group) of repetitions. As another example, a WTRU may apply the power ramping value to the preamble transmission power for each initial preamble re-transmission attempt and may apply the same PRACH preamble transmission power to each repetition in the preamble attempt. The WTRU may apply the power ramping value to both preamble repetition and preamble re-transmission attempts in conjunction. A separate ramping value may be provided and/or used for preamble repetitions and preamble re-transmission attempts.

A WTRU may receive separate PRACH power control (e.g., open loop power control) parameters for each CE level which a WTRU may apply to the preamble transmission power according to the CE level the WTRU may use for the PRACH attempt. In an example, a WTRU may receive PreambleTransMax for each CE level and the WTRU may attempt the PRACH preamble transmission in a certain CE level up to PreambleTransMax. If the WTRU does not receive the corresponding RAR in the certain CE level with the maximum number of attempts (e.g., PreambleTransMax), the WTRU may increase the CE level to the next CE level having a larger number of repetitions. In another example, a WTRU may or may need to, e.g., based on an indication or configuration from the eNB, increase the CE level to the next CE level after $N_{ATTEMPTS}$ PRACH preamble transmission attempts in a certain CE level, where the $N_{ATTEMPTS}$ may be of or more of: (i) a predefined number; (ii) a configured number which may be provided via higher layer signaling; (iii) determined as a function of one or more parameters such as power ramping value, initial power value, and the number of ramping attempts; and/or (iv) determined by one or more parameters including the number of repetitions for each CE level, downlink measurement, and the nominal maximum transmission power. $N_{ATTEMPTS}$ may be CE level dependent or common for all CE levels.

A WTRU may receive a PRACH maximum power usage indication (or configuration) from the eNodeB which may inform the WTRU to transmit PRACH at a maximum power, e.g., for one or more (e.g., all) CE levels and/or CE mode. The indication may be provided and/or received in higher layer signaling such as broadcast signaling. A WTRU that receives the indication to transmit at maximum power may transmit the initial PRACH preamble and subsequent (e.g., all subsequent) preamble repetitions at the maximum allowed transmission power for the PRACH preamble, which may be determined by the WTRU for example based on various factors such as WTRU powerclass, a maximum which may be provided by the eNodeB, and allowed reductions such as MPR, A-MPR, and the like.

The WTRU may receive an indication of maximum power usage that may indicate to use (or whether to use) maximum power for all CE levels, or a separate indication for each CE level may be provided. The default (e.g., no indication) may be to not use the maximum power and to ramp instead. Based on the CE level the WTRU may use for PRACH transmission, the WTRU may transmit at maximum power or ramp the power (e.g., using power control which may be open loop and/or may be based on RSRP and/or pathloss such as described in one or more equations herein) accordingly.

The WTRU may receive an indication of maximum power usage for each CE level for which maximum power may be used. Default (e.g., no indication) may mean to not use the maximum power and to ramp instead. Based on the CE level the WTRU may use for PRACH transmission, the WTRU may transmit at maximum power or ramp the power (e.g., using power control which may be open loop and/or which may be based on RSRP and/or pathloss such as described in one or more equations herein) accordingly.

In an example, a WTRU may receive an indication to transmit using maximum power for the PRACH preamble for one CE level, e.g., CE level-2 (e.g., a level for 10 dB enhancement), and may transmit at maximum power if using that CE level for PRACH transmission. The WTRU may receive no indication for another CE level, e.g., CE level-1 (e.g., a level for 5 dB enhancement) or may receive an indication to not use maximum power for that CE level. For normal mode and for that CE level (e.g., CE level-1), the WTRU may use power control which may be open loop and/or which may be based on RSRP and/or pathoss for PRACH preamble transmission such as described in one or more equations herein.

A WTRU may receive an offset value, e.g., from the eNodeB, that the WTRU may apply to the PRACH preamble power when transmitting the preamble in CE mode. A WTRU may receive the offset in system information of the cell, e.g. SIB2 or a CE specific SIB. A WTRU may receive an offset to apply for each CE level, or a single offset for all CE levels. A WTRU may apply the offset to the preamble transmission power and/or power ramping parameter, and/or the preamble transmission power determined in the PRACH power control which may be based on RSRP and/or pathoss such as described in one or more equations herein.

An offset may (e.g., instead or in addition) be determined by the WTRU based on the number of repetitions (e.g., for PRACH transmission) that may correspond to the CE level. The WTRU may determine the offset from 10 log 10 (the number of repetitions). The WTRU may add or subtract the offset.

The PRACH power control which may be performed by the WTRU may be or may be considered open loop power control, for example since no power adjustment feedback may be received from the eNB.

A coverage enhanced RA procedure may be used. The procedure may include one or more (e.g., four) parts, steps, or messages, e.g., msg1 (e.g., RA Preamble), msg2 (RAR), msg3 (Scheduled UL Transmission), and/or msg4 (Contention Resolution), which may be similar to and/or enhanced versions of those for normal RA such as illustrated in the example in FIG. 2.

A WTRU may perform PRACH preamble transmission. A WTRU may receive PRACH configuration information from at least one normal SI-message which may be carried via a non-coverage enhanced SIB and/or one CE SI-message which may be provided and/or used for CE mode. A WTRU may receive one or more PRACH resources which may be used for CE mode and/or may be according to CE level. For example, a WTRU may receive two coverage enhanced PRACH resources with CE level-1 and CE level-2, respectively. A WTRU may determine the type of PRACH preamble transmission between normal PRACH preamble and CE PRACH preamble based on the channel condition or a predefined WTRU behavior.

RAR for CE mode and/or one or more CE levels may be provided and/or used, for example when a WTRU may transmit a CE mode or CE level PRACH preamble.

In an embodiment, the RA-RNTI may be allocated, determined, provided, and/or used with an offset value. For example, if a WTRU transmits a normal PRACH preamble, the WTRU may monitor PDCCH (or EPDCCH) which may be scrambled with RA-RNTI where RA-RNTI may be determined by or based on RA-RNTI=1+t_id+10*f_id, where f_id may be equal to 0, e.g., for FDD, and t_id may be a value in a range such as 0<=t_id<=9. If a WTRU transmits a CE mode or level PRACH preamble, the WTRU may monitor PDCCH (or EPDCCH) which may be scrambled with a RA-RNTI where RA-RNTI may be determined by or based on RA-RNTI=1+t_id+delta_offset+10*f_id. Alternatively, the RA-RNTI may be calculated as RA-RNTI=11+CE-level+10*f_id, where CE-level may be one of a set such as {1, 2, 3}. The delta_offset may be a predefined number such as delta_offset=10. Alternatively, the delta_offset may be a function of at least one of system bandwidth, the number of CE levels supported for CE mode PRACH, and/or the number of repetitions for a CE (e.g., CE mode and/or CE level) PRACH.

In another embodiment, an (E)PDCCH which may indicate a grant for RAR, and/or a PDSCH which may carry RAR, may be transmitted repetitively within a time window which may be predefined. The time window may be located after (e.g., a number of subframes after) the last subframe of the CE PRACH preamble transmission. A WTRU that transmitted (or transmits) a CE PRACH preamble may monitor (E)PDCCH and/or PDSCH which may carry RAR with repetitions which may be based on the RA-RNTI configured and/or used. An RA-RNTI which may equal 1+t_id+delta_offset+10*f_id may be used. Alternatively, an RA-RNTI which may equal 11+CE-level+10*f_id may be used. The time window and/or the number of repetitions for the PDCCH (or EPDCCH) and/or PDSCH which may carry RAR may (e.g., may each) be a function of CE mode and/or one or more CE levels.

The time window and/or the number of repetitions for the PDCCH (or EPDCCH) and/or PDSCH which may carry RAR may be configured separately and/or may be different. The number of repetitions for PRACH preamble transmission, PDCCH (or EPDCCH) and/or PDSCH which may carry RAR may be configured separately and/or may be different. One or more of the messages which may be used for the RA procedure may have and/or use and/or be configured for a different number of repetitions for a same mode or CE level.

In another embodiment, configured and/or predefined PDSCH resources may be used for RAR. For example, if a WTRU transmits CE PRACH preamble, corresponding PDSCH resources which may contain RAR may be configured and/or predefined for eNB transmission and/or WTRU reception.

A set of physical resource blocks (PRBs) may be used for PDSCH which may carry RAR. The set of PRBs may be transmitted, e.g., repetitively, over multiple subframes. The multiple subframes may be referred to as a time window. In an example, the starting subframe of the time window may be defined as n+k where n may be the last subframe of the repetition of a CE PRACH preamble transmission and k may be a positive integer number which may be predefined (e.g., k=4), configured, or a function of the TDD UL/DL configuration.

A set of PRBs may be used for PDSCH which may carry RAR and the frequency location of the set of PRBs may be configured and/or predefined.

In another embodiment, PDSCH resources may be used to transmit RAR without associated PDCCH (or EPDCCH). The PDSCH resource location may be defined as a function of the RA-RNTI used. For example, RA-RNTI=1+t_id+delta_offset+10*f_id may be used for or by a WTRU that transmits (or transmitted) a CE PRACH preamble. The WTRU may derive or determine which PDSCH resources the WTRU may need to receive, for example based on the RA-RNTI.

A number (e.g., up to 10) PDSCH resources which may carry RAR may be defined and/or determined according to the RA-RNTI. The PDSCH resources may be one-to-one mapped. A WTRU may monitor and/or try to decode a PDSCH resource based on the (e.g., the value of) RA-RNTI.

In an embodiment, the RAR for CE PRACH preamble transmission may contain an index of the random access preamble sequences the network may have detected and/or a timing correction. The RAR may contain a scheduling grant, e.g., for UL transmission of msg3 on a PUSCH. The RAR may include the number of repetitions for the WTRU to use for PUSCH transmission, for example with or as part of (e.g., included with or in) the scheduling grant. The scheduling grant may include a starting subframe and/or an end subframe for the PUSCH transmission and/or parameters from which the WTRU may derive or determine the starting subframe and/or end subframe for the PUSCH transmission. The RAR may contain a TC-RNTI. The RAR may include a power offset which the WTRU may use to adjust the transmission power for the PUSCH transmission and/or the power ramp-up delta of the RA procedure which may affect PUSCH power. The WTRU may transmit in the UL on the scheduled resources, for example if the WTRU may (e.g., successfully) receive an RAR that may be intended for it. The WTRU may adjust the timing according to the timing correction and/or the power according the power offset.

In an embodiment, the network (eNodeB) may send a contention resolution message on the downlink based on C-RNTI, e.g., on PDCCH (or EPDCCH). The PDCCH (or EPDCCH) which may be scrambled C-RNTI may be transmitted over multiple subframes.

A WTRU that transmits (or transmitted) PUSCH with a TC-RNTI (e.g., in RACH msg3) may monitor the PDCCH (or EPDCCH) which may be scrambled with TC-RNTI in a configured and/or predefined time window. Within the time window, the WTRU may expect that the PDCCH (or EPDCCH) which may be scrambled with TC-RNTI may be repetitively transmitted in a configured and/or predefined location. For example, the PDCCH (or EPDCCH) which may be scrambled with TC-RNTI may be transmitted in a configured and/or predefined set of CCEs in common search space.

A WTRU that transmits (or transmitted) RACH msg3 in a CE mode may monitor the PDCCH (or EPDCCH) which may be scrambled with TC-RNTI in the PDCCH (or EPDCCH) common search space, for example with or using CE mode. The PDCCH (or EPDCCH) common search space with or using CE mode may have one or more CE PDCCH (or EPDCCH) candidates. The CE PDCCH (or EPDCCH) candidates may be defined as or by aggregation level and/or repetition level. The WTRU may monitor PDCCH (or EPDCCH) which may be scrambled with TC-RNTI, for example to receive a DL grant for a contention resolution message.

In another embodiment, the network (eNB) may send a contention resolution message on the downlink based on PDSCH without associated PDCCH (or EPDCCH). In this case, the location of PDSCH which may contain a contention resolution message may be configured based on the uplink scheduling grant for RACH msg3.

Link adaptation of PDSCH and/or PUSCH may be provided and/or used.

A WTRU may receive an indication from an eNB for the mode of operation (e.g., normal mode operation or CE mode operation) and/or CE level (e.g., repetition level). The WTRU may receive the indication dynamically, e.g., via physical layer signaling such as via a DCI format. For example, a WTRU may be provided an (e.g., an explicit) indication, for example in a DCI format which may grant an UL PUSCH and/or in a DCI format which may assign a DL PDSCH transmission. This indication may be a (e.g., an absolute) repetition level (which may be or correspond to a number of repetitions). The indication may be a relative repetition level, for example such that the repetition level may be determined from a previous repetition level plus (or minus) the relative repetition level provided, for example in the DCI. For example, a WTRU may be configured with N (e.g., 4) possible repetition levels which may be in order of fewest to most repetitions. A DCI (or other mechanism) may include a dynamic indication that the repetition level may (or should) be increased or decreased. For example, the indication may be 2 bits and may have the following meaning '00'—decrease repetition level by 1, '01'—maintain repetition level, '10' increase repetition level by 1, and '11'—increase repetition level by two.

It is contemplated that CE level, repetition level, and number of repetitions may be used interchangeably. It is further contemplated that number of repetitions and repetition number may be used interchangeably.

For UL transmission, for example when the repetition level may be received with a UL grant, the WTRU may apply the received repetition level starting with the PUSCH transmission for which the UL grant was received.

For UL transmission, for example when the repetition level may be received with a DL grant, the WTRU may apply the received repetition level starting with a PUSCH (or other UL) transmission which may be at least some number, k, of subframes after the subframe in which the DL grant may be (or may have been) received. For example, k may be 4 (e.g., for FDD). In another example k may be a function of the TDD UL/DL configuration.

The indication of CE level in a DCI may be via a DCI format (e.g., an existing legacy DCI format) that may have one or more bits which may be used (or may be intended for use) for one purpose for non-CE mode and for another purpose for CE mode.

Figure 6:
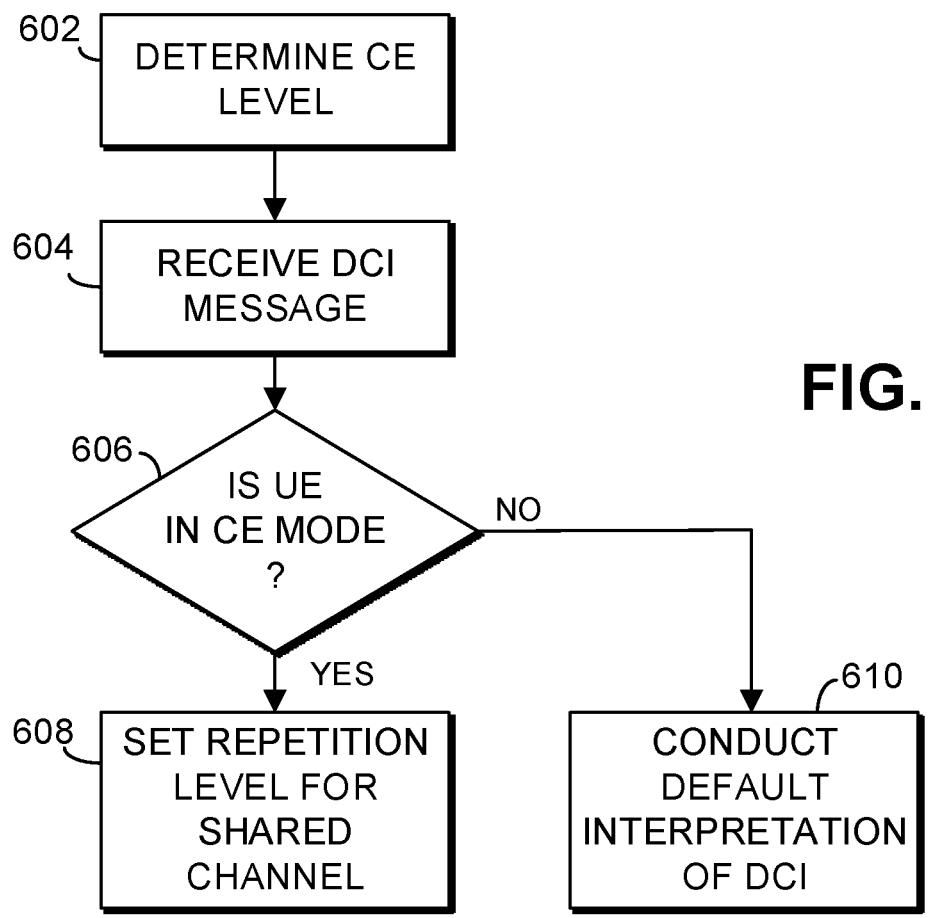
FIG. 6 is a flow diagram illustrating a method of setting repetition level according to some embodiments.

FIG. 6 illustrates an example method for setting a CE level (or repetition level). A WTRU determines in step 602 a level of coverage enhancement, using, for example one or more of the techniques described herein. In step 604, the WTRU receives a DCI message, for example from an eNodeB. If the WTRU is in a coverage enhancement mode (step 606), then the WTRU in step 608 uses the information in the DCI message to set a repetition level for one or more shared channels, such as a PDSCH and/or a PUSCH. If the WTRU is not in a coverage enhancement mode, then the bits of the DCI message may be interpreted in step 610 according to known techniques such as known LTE or LTE-A techniques (e.g., which may be described in Release 8, 9, and/or 10). DCI, DCI format and DCI message may be used interchangeably.

A TPC command may be provided and/or used to indicate a CE or repetition level, for example for PUSCH coverage enhancement.

UL transmissions on PUSCH may be granted via a DCI format such as DCI Format 0 or 4. Such a DCI may include a field for a TPC command. A WTRU in CE mode operation may assume or expect that the TPC command may be used (e.g., used solely) to dynamically indicate the repetition level (e.g., either in an absolute or relative/accumulated manner), for example if or when a WTRU may (or may be configured to) operate (e.g., transmit) at a fixed power for CE mode or for one or more CE levels or repetition levels. In an example, a WTRU may (or may be configured to) operate (e.g., transmit) at a specific power level (e.g. full power) for any repetition level. In another example, the WTRU may be semi-statically configured with one or more specific UL transmission powers which may be used for one or more (e.g., each) repetition level. In another example, the transmission power may depend on the subframe in which the UL transmission occurs. For example, in a first subset of subframes, a transmission for a repetition level may use a first set of transmission powers (e.g., which may correspond to the set of CE levels or repetition levels), and in a second subset of subframes, a transmission for a repetition level may use a second set of transmission powers (e.g., which may correspond to the set of CE levels or repetition levels). The meaning of the TPC command (e.g., to either indicate a change in PUSCH transmission power or a change in repetition level) may be set semi-statically, possibly via RRC configuration. The repetition level and the repetition number may be interchangeably used.

A TPC command may be used to indicate at least one of a change in UL transmission power or a (or a change in) repetition level. For example, a WTRU may be pre-configured with a vector (or set) of PUSCH transmission powers and repetition levels. A TPC command may indicate to the WTRU whether it should move to a different PUSCH transmission power and/or repetition level (e.g., either in an absolute value, such as by pointing to a vector entry, or in relative value, such as by indicating a shift in vector entries). A TPC command may indicate no change to a PUSCH transmission power and/or repetition level (e.g., either in an absolute value such as by pointing to a vector entry which may be the same as a current value or vector, or in relative value, such as by indicating no or zero change in value or shift in vector entries).

As an example, a WTRU may be configured with transmission powers such as A, B and C, and the WTRU may also be configured with repetition levels 1, 2 and 3. The vector of PUSCH transmission powers and repetition levels may be written as 1A, 1B, 1C, 2A, 2B, 2C, 3A, 3B, 3C. In such an example, if a TPC command indicates a relative shift of +2, then the WTRU may move two levels to the right and a relative shift of −1 may imply to move one level to the left. For example, if a WTRU is transmitting with repetition level 2 and power level B and receives a TPC command indicating a shift of +2, the WTRU may change its next transmission to be at repetition level 3 and power level A. A power level/repetition level vector may not (or need not) include all possible combinations of power level and repetition level.

The meaning of a TPC command may depend on whether the WTRU is configured for (or using) CE mode or not. For example, the TPC command may map to one interpretation when in non-CE mode (e.g., to relative power changes), and it may map to a different interpretation when in CE mode (for example, to relative or absolute repetition levels). In another example, in CE mode, the TPC command may (or may always) be two bits or more with some bits mapping to an absolute or relative PUSCH transmission power and other bits mapping to an absolute or relative repetition level. The repetition level may be configured semi-statically and/or the interpretation of the TPC command table may depend on the repetition level (or CE level). For example, for one repetition level (or CE level), a TPC command with two bits may be interpreted as "−1, 0, 1, 2" and for another repetition level (or CE level), the two bits for the TPC command may be interpreted as "−2, 0, 2, 4" and so on.

Figure 7:
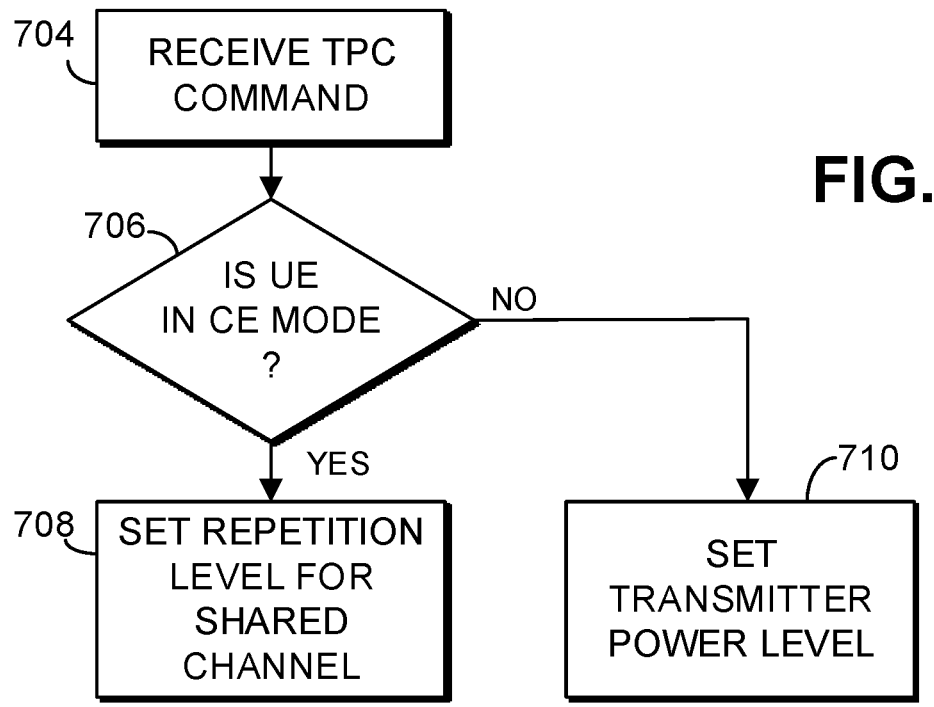
FIG. 7 is a flow diagram illustrating a method of setting repetition level according to some embodiments.

FIG. 7 illustrates an example method for setting a CE level (or repetition level). After a WTRU receives a TPC command in step 704, the WTRU determines in step 706 whether the WTRU is in a CE mode. If the WTRU is in a CE mode, then in step 708, the WTRU uses the information in the TPC to set the repetition level for the PUSCH and/or the PDSCH. If the WTRU is not in a CE mode, then the WTRU employs conventional techniques to use the information in the TPC command, for example to set transmitter power level in step 710.

The applicability of the TPC command to power level, repetition level or both may be determined at least in part by configuration (or use) of the CE mode. For example a WTRU with CE mode on (or which may be configured for and/or operating in CE mode) may interpret the TPC command as applicable to (e.g., only to) the repetition level or to both the power level and repetition level.

The applicability of the TPC command to power level, repetition level or both may be determined at least in part by explicit indication. For example, the WTRU may receive an indication as to the meaning of the TPC command which may, for example apply upon being configured with CE-mode. In another example, the WTRU may receive an indication as to the meaning of the TPC command which may, for example, apply upon being configured with CE-mode and/or when operating in CE mode. The indication may be provided via higher layer signaling such as broadcast or dedicated signaling from the eNB.

The applicability of the TPC command to power level, repetition level or both may be determined at least in part by subframe number. For example, a TPC command received in subframe n for a PUSCH transmission in subframe n+k may have different meaning depending on the value of n, k or both, for example for CE mode and non-CE mode.

The applicability of the TPC command to power level, repetition level or both may be determined at least in part by DCI Format. For example, a new DCI Format may be designed for CE mode transmissions. In such a DCI format, the TPC command may be applicable to a combination of transmission power and repetition levels in a manner detailed herein.

The applicability of the TPC command to power level, repetition level or both may be determined at least in part by the resources on which the DCI carrying the TPC is (or was) transmitted. For example, the search space (e.g., WTRU-specific or common), the type of PDCCH (regular PDCCH or EPDCCH) or the EPDCCH resources may (e.g., implicitly) indicate the meaning of the TPC command to the WTRU.

In CE mode, a WTRU may receive in a DCI which it may monitor, the number of repetitions which may be used for (E)PDCCH and the associated PDSCH and/or PUSCH. The DCI may be provided by and/or received from an eNB. In an example, a parameter to indicate the number of repetitions for (E)PDCCH, e.g. $N_{EPDCCH\_REP}$, and another parameter to indicate the number of repetitions for the associated PDSCH or PUSCH, e.g. $N_{DATA\_REP}$, may be received from a DCI (e.g., a DCI being monitored). In another example, a single parameter may be used to indicate the number of repetitions for the (E)PDCCH and the associated PDSCH or PUSCH.

In an embodiment, some parameters of PUSCH grants may be restricted (e.g., limited or not used for their typical or legacy purpose) in CE mode. Such restrictions may allow the eNodeB to indicate the repetition level by reusing some of the bits located in the DCI.

The number of carriers supported may be restricted in CE mode, for example to enable at least part of the carrier indicator field to be used for CE mode. Part or all of the carrier indicator field may be reused to indicate the repetition level, or the meaning of the TPC command. In another example, multiple carriers (e.g., carrier aggregation) and the carrier indicator field may not be used in CE mode. If a WTRU is configured with multi-carrier operation (e.g., more than one carrier is configured) in normal mode operation, the PCell in the normal mode operation may be used for the single carrier operation in CE mode operation. Alternatively, a WTRU may receive an indication from the eNB identifying which carrier within the configured multiple carriers the WTRU may use in CE mode operation. Upon or following a switch to CE mode, the WTRU may switch from multi-carrier operation to single carrier operation and may use the PCell or the designated cell as its single serving cell.

The Modulation and Coding Scheme (MCS) and/or redundancy versions supported and/or used in CE mode may be restricted. Some MCS levels and/or redundancy versions may be restricted in CE mode operation. For example, the MCS table may be interpreted differently by a WTRU in CE mode operation and/or each MCS level may be assigned a repetition level. In another example, a subset of modulation orders in the MCS table may be used in CE mode operation and the rest (e.g., of the entries in the table) may be reused to indicate a repetition number.

Resource block assignment may be restricted in CE mode. For example, some PRBs and/or resource allocation sizes may be restricted and the assignments may be used to (e.g., implicitly) indicate a repetition level.

CSI Request may be limited to a 1 bit field in CE mode and the other bit may be used to indicate a repetition level to the WTRU (or to indicate the meaning of the TPC command to the WTRU).

The number of layers may be limited in CE mode. For example, DCI Format 4 allows transmission on up to a number of antenna ports (e.g., 4 antenna ports), some of which may not be used in CE mode. Some elements of the precoding information field table may be restricted and/or may be reinterpreted to indicate a repetition level.

One or more restrictions on or which may impact a DCI format or field (e.g., as described herein) may depend on the repetition level (e.g., in CE mode). For example, a WTRU may be configured (e.g., a priori) with and/or use a repetition level and the meaning of the MCS field in a DCI may depend on the repetition level.

A new DCI format may be designed with limitations or restricted values for some of the fields which may enable the inclusion of a new field which may indicate (e.g., explicitly) the repetition level for a PUSCH transmission.

In a DCI granting PDSCH, a TPC command (e.g., command bit) may be intended for use with HARQ feedback on PUCCH for such a DL assignment. A WTRU in CE mode may or may be configured to reinterpret the TPC command as a repetition level indicator for the assigned PDCCH and/or the PUCCH. The TPC command may indicate to the WTRU a combination of repetition level for the assigned PDCCH and/or PUCCH in combination with the power level for the PUCCH, for example in a manner similar to that described herein for PUSCH. For example, the WTRU may be configured with a vector of combinations of repetition values for PDCCH, repetition values for PUCCH and power level for PUCCH and the TPC command may map to one of the vector values (e.g., either in an absolute manner or in a relative/accumulated manner). In an example, for each PUCCH repetition level, the WTRU may use a fixed (and possibly different) transmission power. The TPC command may map (e.g., only map) to PDSCH and/or PUCCH repetition levels. In another example, the repetition level and transmission level of PUCCH may be fixed (and possibly different) for each PDSCH repetition level and the TPC command may map (e.g., only map) to a PDSCH repetition level.

To determine the meaning of the TPC command (e.g., whether it may be intended to be used for PUCCH power control, PUCCH repetition level and/or PDSCH repetition level), and/or to determine the PUCCH repetition level and/or PDSCH repetition level, the eNodeB and/or WTRU may use at least one of: (i) whether PDCCH or EPDCCH is used; (ii) the EPDCCH resources used; (iii) the (E)PDCCH search space used (e.g., whether it is WTRU-specific or common); (iv) the value of n, k or n+k for a grant in subframe n and HARQ feedback in subframe n+k; (v) what DCI Format is used; (vi) a new field in a pre-existing DCI Format or a new DCI Format for CE mode; (vii) RRC signaling; and/or (viii) whether the WTRU is in CE mode.

In CE mode, the WTRU may have restrictions (e.g., limitations) on some parameters of the DL assignment. The meaning of at least one of the fields in the DL assignment DCI may be reinterpreted, for example by reusing the bits, to indicate a repetition level (for either PDSCH and/or PUCCH) and/or the meaning of the TPC command. For example, part or all of the carrier indicator field (CIF) may be reused and/or reinterpreted. The number of carriers may be limited in CE mode and some values of the CIF may be restricted and/or reused and/or reinterpreted. In another example, the HARQ-ACK resource offset may be reused in PDCCH as a flag (e.g., to indicate repetition level or TPC command meaning), for example in CE mode. In another example, the resource block assignment may be restricted or limited in CE mode. Some values of PRB and/or allocation sizes may be restricted and some bits of this field may be reused and/or reinterpreted. In another example, the transport block to codeword swap flag may be reused and/or reinterpreted. In another example, some elements of the MCS table may be reused and/or reinterpreted. In another example precoding information may be restricted in CE mode. Some precoders and/or layers and/or transmission ranks may be restricted and a portion of this field may be reused and/or reinterpreted.

For CRS-based demodulation of PDSCH and/or for CSI feedback measurements, the WTRU may be configured with a power offset assumption between CRS and PDSCH. A WTRU may be configured with multiple such power offsets, for example one per repetition level. Therefore, upon (or after) being configured with a new PDSCH repetition level, the WTRU may use a new appropriate power offset value. The CRS-to-PDSCH power offset value may be configured, e.g., concurrently, with a (e.g., any) new repetition level.

A WTRU may report, for example in a new CSI feedback report type (e.g. which may be a repetition level indicator report or may include a repetition level indicator), a recommended repetition level for PDSCH. Such a report may be transmitted periodically, or aperiodically. For example, when (or only when) a new repetition level may be needed or required, e.g., by the WTRU, the WTRU may, for example, autonomously, report the new repetition level in a (e.g., a next or closest) CSI feedback time/frequency resource which may be configured for at least the new CSI feedback report. A flag (e.g. a reserved bit in the CSI feedback) may be used to indicate whether or not the CSI feedback may include an (e.g., an updated) repetition level recommendation. In an example, if a new repetition level (or an updated repetition level) is included in the CSI feedback, the current and/or the subsequent CSI feedback (e.g. CQI, PMI, and/or RI) which may be determined and/or reported by the WTRU may be based on the new repetition level (e.g., based on PDSCH with the new repetition level assumed). In another example, the CSI feedback may be based on a repetition level configured and/or used (e.g. by eNodeB) for PDSCH which may be irrespective of a (e.g., new) repetition level which may be recommended by the WTRU. In another example, the repetition level which may be assumed for the CSI feedback may be determined as a function of at least one of the subframe location, subframe type, and subframe configuration. In another example, the eNodeB may configure a WTRU with multiple CSI Processes where each process may be configured with a separate and/or different repetition level assumption.

PUCCH resource allocation for CE mode may be provided and/or used.

In an embodiment, PUCCH resources may be assigned dynamically for CE mode in a separate PUCCH resource. In an example, the PUCCH resource may be assigned based on $n_{PUCCH}^{(1,\tilde{p}_0)}=n_{CCE}+N_{PUCCH}^{(1)}$ in normal mode, where $n_{CCE}$ is the number of the first CCE (e.g., lowest CCE index which may be used to construct the PDCCH) used for transmission of the corresponding DCI assignment and $N_{PUCCH}^{(1)}$ may be configured by higher layers, while the PUCCH resource in k-th subframe in the repetition window may be assigned based on $n_{PUCCH,k}^{(1,\tilde{p}_0)}=n_{CCE,m}+N_{PUCCH}^{(1)}+\Delta_{PUCCH}^{Offset}$.

$n_{PUCCH,k}^{(1,\tilde{p}_0)}$ may be defined for the PUCCH resource allocation for the k-th subframe within the PUCCH repetition window. For example, a PUCCH repetition window may be defined as 20 subframes, and the WTRU which may transmit coverage enhanced PUCCH may use the PUCCH resource $n_{PUCCH,1}^{(1,\tilde{p}_0)}$ in the first subframe within the PUCCH repetition window and the PUCCH resource $n_{PUCCH,2}^{(1,\tilde{p}_0)}$ in the second subframe and so forth.

One or more of subframes within the PUCCH repetition window may not have the allocated PUCCH. The subframe or subframes not containing an allocated PUCCH resource may be predefined, configured via higher layer, or defined as a function of at least one of CE level which may be configured and/or used for uplink and/or downlink, subframe number, C-RNTI, and/or number of repetitions for the corresponding PDSCH or (E)PDCCH. The k may be used as the k-th repetition subframe. For example, if 10 PUCCH repetitions are used within a 20 subframe PUCCH repetition window, the $2^{nd}$ repetition in the PUCCH repetition window may be $n_{PUCCH,2}^{(1,\tilde{p}_0)}$ irrespective the subframe number within the PUCCH repetition window.

$n_{CCE,m}$ may be defined as the first CCE (e.g., lowest CCE index used for the associated PDCCH received for the corresponding PDSCH reception) in the m-th subframe in the PDCCH repetition window. If the number of repetitions is the same for the PDCCH and PUCCH, m=k may be assumed.

$\Delta_{PUCCH}^{Offset}$ may be defined for PUCCH resource allocation in CE mode, for example in order to avoid collisions between PUCCH resources for normal mode and coverage enhanced mode. The $\Delta_{PUCCH}^{Offset}$ may be at least one of: predefined as a fixed number, configured via higher layer signaling, and/or defined (e.g., implicitly) as a function of at least one of downlink system bandwidth, CE-level, and/or C-RNTI.

$N_{PUCCH}^{(1)}+\Delta_{PUCCH}^{Offset}$ may be defined as $N_{PUCCH,CE}^{(1)}$. A WTRU may transmit PUCCH using $N_{PUCCH}^{(1)}$ when the WTRU is configured in normal mode and may transmit PUCCH using $N_{PUCCH,CE}^{(1)}$ when the WTRU is configured in CE mode.

The PUCCH resource in the k-th subframe in the repetition window may be assigned based on $n_{PUCCH,k}^{(1,\tilde{p}0)} = n_{ID} + N_{PUCCH}^{(1)} + \Delta_{PUCCH}^{Offset}$, where the $n_{ID}$ may be defined as a function of one or more of system parameters and/or WTRU parameters. Alternatively, $n_{ID}$ may be configured via higher layer signaling in a WTRU-specific manner. In this case, the $n_{ID}$ may be defined as a function of WTRU-ID (e.g. C-RNTI). For example, a modulo operation may be used to determine $n_{ID}$ with $n_{RNTI}$ (e.g., C-RNTI) and $n_{mod}$ such as $n_{ID} = n_{RNTI} \mod n_{mod}$. $n_{mod}$ may be a predefined number, $n_{mod}$ may be configured via higher layer signaling, or $n_{mod}$ may be defined as a function of system bandwidth.

A higher layer configured PUCCH resource may be used. For example, $n_{PUCCH}^{(1,p)}$ may be configured via higher layers for CE mode and a WTRU may repetitively transmit a PUCCH in the higher layer configured PUCCH resource over one or more subframes.

The higher layer configured PUCCH resource for CE mode may be the same as the higher layer configured PUCCH resource for HARQ-ACK repetition in normal mode. For example, a PUCCH resource $n_{PUCCH,ANRep}^{(1,p)}$ may be configured via higher layer signaling, and if a WTRU is configured with ackNackRepetition in higher layers in normal mode of operation the WTRU may use $n_{PUCCH,ANRep}^{(1,p)}$ for HARQ-ACK response and repeat the transmission $N_{ANRep} - 1$ times when the WTRU receives (or received) PDSCH with a corresponding PDCCH, where $N_{ANRep}$ may be configured via higher layer signaling. If a WTRU is configured as and/or uses CE mode, the WTRU may or may also use $n_{PUCCH,ANRep}^{(1,p)}$ for HARQ-ACK response and repeat the transmission $N_{ANRep}$ times even though the WTRU receives (or received) PDSCH with a corresponding PDCCH.

$N'_{ANRep}$ may be configured via higher layer signaling independently from $N_{ANRep}$. The $N'_{ANRep}$ may have two or more candidate parameters. For example, $N'_{ANRep} = \{n10, n20, n40, spare2\}$ which may imply that 10, 20, and 40 repetitions may be used for HARQ-ARQ response transmission.

$N'_{ANRep}$ may be the same as $N_{ANRep}$, $N'_{ANRep} = N_{ANRep}$.

$N'_{ANRep}$ may be defined as a function of $N_{ANRep}$. For example, a multiple of $N_{ANRep}$ may be used for $N'_{ANRep}$. In an example, $N'_{ANRep} = N_{ANRep} \times N_{temp}$ where $N_{temp}$ may be a predefined positive integer number.

A single repetitionFactor may be configured via higher layer and the repetitionFactor in PUCCH-ConfigCommon and may be interpreted differently according to the mode of operation. In an example, $N_{ANRep} = \{n2, n4, n6, spare1\}$ and $N'_{ANRep} = \{n10, n20, n40, spare2\}$ are used according to the repetitionFactor. Therefore, if a WTRU is configured with repetitionFactor=1, the $N_{ANRep} = n2$ and $N'_{ANRep} = n10$ may be implicitly configured.

$N'_{ANRep}$ may be defined as a function of at least one of the number of repetitions for corresponding (E)PDCCH transmission, the number of repetitions for corresponding PDSCH transmission, and/or CE-level used. In an example, $N'_{ANRep}$ may be defined as a function of the total aggregation level of (E)PDCCH, where the total aggregation level may be defined as the multiplication of the aggregation level and the number of repetitions.

$N'_{ANRep}$ may be dynamically indicated via corresponding (E)PDCCH. For example, a DCI format in the corresponding (E)PDCCH may include one or more explicit bits to indicate the number of repetitions for use (or which may be required and/or used) for HARQ-ACK response in CE mode.

The higher layer configured PUCCH resource for CE mode may be (e.g., implicitly) indicated, for example using a predefined offset with the higher layer configured PUCCH resource for HARQ-ACK repetition in normal mode. For example, a PUCCH resource $n_{PUCCH,ANRep}^{(1,p)}$ may be configured via higher layer signaling for normal mode, then $n_{PUCCH,ANRep}^{(1,p)} + \Delta_{offset}$ may be used for coverage enhanced mode. $\Delta_{offset}$ may be a predefined number. For example, $\Delta_{offset} = 1$ may be used. $\Delta_{offset}$ may be a higher layer configured value.

The HARQ-ACK repetition in normal mode may be reused for CE mode by adding an additional number of repetitions. For example, the reserved state, e.g., spare1, of the repetition factor, e.g., $N_{ANRep} = \{n2, n4, n6, spare1\}$ in the normal mode, may be used for CE mode to indicate a number of repetitions required for CE mode. For example, n32 may replace spare1 to indicate that the HARQ-ACK response transmission (e.g., the PUCCH resource configured via the higher layer signaling which carries the HARQ-ACK response transmission) requires or uses 32 repetitions and $N_{ANRep} = \{n2, n4, n6, n32\}$ is used. The $N_{ANRep}$ may be updated if the mode of operation is changed from normal mode to coverage enhanced mode, or vice versa.

A higher layer configured PUCCH resource may be used and the higher layer configured PUCCH resource may be defined as a function of the subframe number. The PUCCH resource may be changed from a subframe to another.

$n_{PUCCH,k}^{(1,\tilde{p}0)}$ may be defined as a function of at least one of the $n_{RNTI}$ (e.g., C-RNTI), subframe number, and/or SFN number. $n_{PUCCH,k}^{(1,\tilde{p}0)} = (A \cdot n_{PUCCH,k-1}^{(1,\tilde{p}0)}) \mod D$ may be used, where A and D are predefined positive integer numbers and $n_{PUCCH,-1}^{(e,\tilde{p}0)} = n_{RNTI}$. For example, A=39827 and D=2014 may be used. Alternatively, D may be configured via higher layer signaling.

The value $n_{PUCCH,k}^{(1,\tilde{p}0)} = (A \cdot \lfloor n_s/2 \rfloor) \mod D$ may be used, where $n_s$ is the slot number.

UL transmissions on PUSCH may be granted via a DCI format such as DCI Format 0 and 4. DL transmissions for PDSCH may be granted by several possible DCI Formats, including DCI Formats 1, 1A, 1C, 2, 2A, 2B, 2C and 2D. Such DCI may include a field for resource block allocations and resource allocation type including for example support for contiguous or non-contiguous RB allocations and support for the different DL resource allocation types 0, 1 and 2 and UL resource allocation types 0 and 1.

In an embodiment, the DCI resource allocation field(s) contained in a DCI is (are) used to distinguish between resource allocations to a WTRU operating in CE mode versus to a WTRU operating in non-CE mode (e.g., normal mode). For example, a WTRU receiving a DCI, e.g., in a first step, may determine if it is operating in CE mode or non-CE mode. The WTRU may determine in which mode it is operating as a function of a previously received configuration such as RRC or it may use radio link measurements to decide which mode applies or it may derive the applicable mode from received signaling in a DCI or through MAC CE for the time period under consideration. More than one coverage extension level may or may need to be distinguished and/or used when operating in CE mode. In another (e.g., next) step, the WTRU may interpret the DCI resource allocation field subject to the determined mode from the first step and the WTRU may configure receiver operation to decode an allocated PDSCH or may configure transmitter operation for sending an allocated PUSCH, for example according to the interpreted DCI.

A WTRU which may or may not determine to operate in non-CE mode may decode the DCI resource allocation field(s) according to the coding of existing LTE resource allocation types, but when determining to operate in CE mode, the WTRU may decode the resource DCI allocation field subject to a resource allocation type and/or encoding approach which may be valid for WTRUs operating in one or more CE modes and/or with one or more CE levels.

In an embodiment, the coding and/or interpretation of a DCI resource allocation for a WTRU operating in CE mode may include or may be selected to include one or more restrictions on the number and/or maximum number of allocated RBs. For example, the maximum number of allocated RBs may not exceed a maximum value of N RBs for a given CE level. For example, the maximum value of N may be 6 for all CE levels.

In another example, the number of allocated RBs may (or may only) correspond to a well-defined (or well-determined) set of possible RBs, such as for example 1, 2 or 4 RBs or 2, 4, 6 RBs. Each CE level may have a well-defined (or well-determined) set such as 1, 2 or 4 RBs for one CE level (e.g., CE level-2) and 2, 4, 6 RBs for another CE level (e.g., CE level-1).

In another example, the RB allocation may (or may only) include a selected subset of OFDM tones that are part of an allocated PRB, for example, a PRB where only RE's 1-6 but not RE's 7-12 are used to carry the signal. For this example, one advantage is that WTRUs operating in CE mode may be assigned PDSCH or PUSCH transmission resources that may maximize power spectral density, e.g., receive or transmit power per RE for the PDSCH reception or PUSCH transmission duration under consideration. Similarly, restricting or choosing a well-defined set of allocable RBs may allow application of channel coding rates that may maximize coding gains for typical small payloads for MTC type of applications given parameterization of the LTE air interface in time/frequency domain which may increase link budget and communications range.

In another embodiment, a part of a resource allocation bit field in a certain DCI format may be (or may only be) used in CE mode. The certain DCI format may include DCI format 0 and 4. For example, NCE_RA bits out of NRA bits may be used in CE mode where NRA may be the number of bits for resource allocation in a certain DCI in normal mode and the NRA may be equal to or larger than NCE_RA. A consecutive NCE_RA bits may be selected in ascending order or descending order.

In an example, the remaining NRA-NCE_RA bits may be reused for CE mode specific operation. For example, the remaining bits may be used to indicate the CE mode repetition levels for a PUSCH or a PDSCH transmission. In another example, the remaining bits may be used to indicate a CE mode and/or CE level frequency-hopping pattern for a PUSCH or a PDSCH transmission with repetition. In this case, the frequency hopping may be used from a subframe to another.

In another example, the remaining NRA-NCE_RA bits may be used as a virtual CRC so that a predefined bit sequence may be used such as 0's or 1's for all remaining bits.

In another embodiment, the number of resource blocks, the number of MCS levels, and/or the number of HARQ process may be restricted in CE mode. In an example, the NCE_RA may be defined according to the CE level. The smaller NCE_RA may be used for higher CE level, where higher CE level may imply smaller repetition number. The DCI payload size may be smaller as CE level gets lower, for example due to smaller NCE_RA bits. The DCI payload size may be kept same for all CE levels and unused bits may be used as a virtual CRC.

In another example, a subset of MCS levels may be used for CE mode and the number of MCS levels that are supported may be different according CE level. A smaller number of bits may be used for MCS field for the lower CE level. For example, a 5-bit MCS field may be used for normal mode while a 4-bit MCS field may be used for CE mode with CE level-1. A 3-bit MCS field may be used for CE mode with CE level-2. The DCI payload size may be smaller as CE level gets lower, for example due to smaller MCS field. The DCI payload size may be kept same for all CE levels and unused bits may be used as a virtual CRC.

In another example, a subset of HARQ processes may be used for CE mode and the number of supported HARQ process may be different according to CE level. A smaller number of HARQ process may be used for the CE mode and the lower CE level. For example, 8 HARQ processes may be used for normal mode while less than 8 HARQ processes may be used for CE mode. In an example, 4 HARQ processes may be supported in CE mode with CE level-1 and 2 HARQ processes may be used in CE mode with CE level-2.

The resource allocation in CE mode or for a CE level may be defined as a predetermined number $N_{alloc}$. In an example, $N_{alloc}$ PRBs (e.g. N=6) may be used, e.g., always, for a CE mode or a certain CE level in CE mode. If a system bandwidth is larger than 6 PRBs, the location of N PRBs may be predetermined, configured via higher signaling, or indicated dynamically from a DCI. In another example, the $N_{alloc}$ may be determined as a function of the repetition level (or repetition number).

For one or more UL power control parameters and/or values, a WTRU may at least one of receive (e.g., from the eNodeB), configure, be configured with (e.g., by the eNodeB), determine, calculate, use, or intend to use, a separate value for CE mode and non-CE mode (e.g., normal mode). The separate values may be equal or not equal.

For one or more UL power control parameters and/or values, a WTRU may at least one of receive (e.g., from the eNodeB), configure, be configured with (e.g., by the eNodeB), determine, calculate, use, or intend to use, a separate value for each of one or more CE levels (e.g. repetition levels). The separate values may be equal or not equal.

UL transmission power of PUSCH (e.g. $P_{PUSCH,c}(i)$) and/or PUCCH (e.g. $P_{PUCCH}(i)$) in a subframe i may be determined based on one or more UL power control parameters and values, where the UL power control parameters and values may include at least one of: (i) $P_{CMAX,c}(i)$; (ii) $\Delta_{F\_PUCCH}(F)$; (iii) $P_{O\_PUCCH}$ and/or one or more of its parameters which may include $P_{O\_NOMINAL\_PUCCH}$ and $P_{O\_UE\_PUCCH}$; (iv) $P_{O\_PUSCH,c}(j)$ and/or one or more of its parameters which may include $P_{O\_NOMINAL\_PUSCH,c}(j)$ and $P_{O\_UE\_PUSCH,c}(j)$; (v) $\alpha_c(j)$; (vi) $\Delta_{TF,c}(i)$; (viii) total transmission power for PUCCH and/or PUSCH and/or SRS, e.g., in subframe i; and/or (viii) any other UL power control related parameter.

As an example, in CE mode the UE may set the value of the $P_{CMAX,c}(i)$, $P_{PUSCH,c}(i)$, and/or $P_{PUCCH}(i)$ to a fixed value (or a value determined in the first subframe of a certain time window) for a certain time window, where the certain time window may be located within a repetition window which may be associated with a CE level. The certain time window (e.g., which may be or may be referred to as a number of consecutive subframes) may be a predefined number (or a number configured by the eNB) which may be for example equal to or smaller than the lowest number of repetitions in CE mode for PUSCH transmission. Alternatively, the certain time window may be the same as the number of repetitions for a certain CE level the UE may operate with.

As another example, in CE mode the UE may set (or may be configured to set) the value of the $\alpha_c(j)$, e.g., the pathloss scalar, to a fixed value such as 1. The UE may effectively fully compensate the path loss, e.g., $PL_c$, by increasing the UL power, if the transmission power is not limited by the maximum value. As another example, in CE mode, the UE may set (or be configured to set) the value of the $\alpha_c(j)$ to a fixed value such as 0 which may make the transmission power independent of pathloss.

As another example, in CE mode the WTRU may set the value of the either PUSCH and/or PUCCH total power to the maximum value, e.g., $P_{CMAX,c}(i)$. The WTRU may not, for example in this case, need to receive the closed loop power control commands, e.g., TPC commands, since the transmission power may be fixed to certain values. However, the TPC signaling may be used for other purposes rather than closed-loop power control TPC.

In normal mode, PUCCH power may be determined according to a power control formula or equation such as Eq. 1. Formula and equation may be used interchangeably.

In CE mode, for example as shown in Eq. 5, scaled pathloss may be used in the power control formula, where the pathloss term $PL_c$ may be scaled by $\beta$ where the $\beta$ may have a value from 0 to 1. Alternatively, the $\beta$ may have a '0' value, and the pathloss may not be compensated.

$$P_{PUCCH}(i) = \min\left\{\begin{array}{l} P_{CMAX,c}(i), \\ P_{0\_PUCCH} + \beta PL_c + h(n_{CQI}, n_{HARQ}, n_{SR}) + \Delta_{F\_PUCCH}(F) + \Delta_{TxD}(F') + g(i) \end{array}\right\} \quad \text{Eq. 5}$$

The $P_{0\_PUCCH}$ may be configured differently for normal mode and CE mode. The $P_{0\_PUCCH}$ value, e.g., one of two values, may be used according to the mode of operation. $P_{0\_PUCCH}$ may be configured independently according to the CE levels.

Repetition compensation may be provided and/or used.

The impact of the repetition level on the UL transmission power in CE mode may be modeled by addition of a new component to the power control and/or power headroom formulas. This component may be modeled as a function of the repetition level. One example of this additional component in the UL power control formula may be $d_c(Rp)$ where Rp refers to the coverage enhancement repetition level (e.g., Rp=2 when 2 repetitions may be used) and $d_c(.)$ represents a function of Rp, which may or may not be the same for all component carriers c. By doing so the PUSCH and/or PUCCH power control formulas may become as follows:

$$P_{PUCCH}(i) = \min\left\{\begin{array}{l} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) - d_c(Rp) \end{array}\right\}$$

$$P_{PUSCH,c}(i) = \min\left\{\begin{array}{l} 10\log_{10}(\hat{P}_{CMAX,c}(i) - \hat{P}_{PUCCH}(i)), \\ 10\log_{10}(M_{PUSCH,c}(i)) + P_{0\_PUSCH,c}(j) + \alpha_c(j) \cdot PL_c + \Delta_{TF,c}(i) + f_c(i) - d_c(Rp) \end{array}\right\}$$

As another example, in CE mode the WTRU may be configured with N, e.g., 4, different values of alpha, e.g., {1, 0.8, 0.6, 0.4}, where each may be used by the WTRU for a certain repetition, e.g., {1, 2, 4, 8}, correspondingly.

PUCCH transmission may perform differently according to the mode of operation (normal mode or CE mode) and/or CE level. For example, the maximum transmission power may be used for PUCCH transmission if a WTRU is configured with or using CE mode. In another example, the power control formula may be different for PUCCH transmission according to the mode of operation and/or CE level.

An example of this additional component which may be used in the UL power control formula, e.g., $d_c(Rp)$, may be $a \times 10\log_{10}(b \times Rp + c)$ where a, b and c may be parameters with values that may be fixed or determined by implementation, and/or configured dynamically and/or semi-statically by the eNodeB, for example by signaling. An example of such parameters may be a=b=1 and c=0. This may result in having the following power control additional component:

$d_c(Rp)=10\log_{10}(Rp)$

The PUSCH and PUCCH power control formulas may become as follows:

$$P_{PUCCH}(i) = \min\left\{\begin{array}{l} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) - 10\log_{10}(Rp) \end{array}\right\}$$

$$P_{PUSCH,c}(i) = \min\left\{\begin{array}{l} 10\log_{10}(\hat{P}_{CMAX,c}(i) - \hat{P}_{PUCCH}(i)), \\ 10\log_{10}(M_{PUSCH,c}(i)) + P_{0\_PUSCH,c}(j) + \alpha_c(j) \cdot PL_c + \Delta_{TF,c}(i) + f_c(i) - 10\log_{10}(Rp) \end{array}\right\}$$

Using the above or similar formulas for power control may result in the WTRU adjusting its UL transmission power for a given repetition level, for example per subframe (or at least per subframe in which it may transmit).

The initial PUCCH and/or PUSCH transmission power may be set based on the power ramp-up of the PRACH transmission for which the WTRU may have received a random access response (RAR) from the eNodeB, e.g., a PRACH that might have been successfully received and/or decoded by the eNodeB. For example, the initial value of the TPC accumulation term, fc(i) in the PUSCH power calculation may be set based on the PRACH power ramp-up value. It may be set equal to the total power ramp-up from the first to the last preamble transmitted in serving cell c plus any adjustment based on a TPC command which may be included in a random access response from the eNodeB.

For example, the initial value of the accumulator may be:
$f_c(0) = \Delta P_{rampup,c} + \delta_{msg2,c}$.

CE mode may be used to represent operation or intended operation in a manner that may (or may be intended to) enhance coverage.

In one example, a WTRU, such as one that may use coverage enhancement (CE) or be in CE mode, may transmit at a fixed power such as its maximum power (e.g., the maximum power configured by the WTRU).

In another example, transmit power may be determined by the WTRU based on factors which may include one or more of pathloss, TPC commands, received parameters, any one or more factors which may be included in the legacy power control equations, number of repetitions, and the like. The WTRU may transmit at this power as long as it does not exceed its maximum allowed power that may be the WTRU's configured maximum output power.

Power headroom (PH) and PH reporting for CE mode may be provided and/or used.

Power headroom, e.g., for serving cell c, PHc, may be computed as the difference between a WTRU's computed power and the WTRU's configured maximum output power, e.g., Pcmax,c, where this computed power, e.g., Pcomputed_unconstrained,c, may be a computed power without (or prior to) accounting for constraints which may be imposed on the transmission power by the WTRU's maximum power or power allocation to higher priority channels.

Power headroom may be represented by the following equation for serving cell (or CC) c in subframe i.

$PHc(i) = Pcmax,c(i) - Pcomputed\_unconstrained,c(i)$.      Eq. 6

For example, the PH for LTE (or LTE-A) for a subframe in which there is a PUSCH without a PUCCH transmission may be given by:

$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}$      Eq. 7

For a WTRU which may use or need coverage enhancement, the pathloss (PL) which may be measured or determined by the WTRU may be higher than what may be the typical PL for non-CE mode WTRUs which may include cell edge WTRUs. This may result in the computed power being higher, and the PH being more negative, than may be anticipated in the range of reported values for a PH report (PHR).

As an example, a legacy WTRU may report a power headroom value using a certain number of bits (e.g., 6) that may correspond to a certain number of possible values (e.g., 64) that may represent a certain range of PH values (e.g., [−23:40] dB) with a certain step (e.g., 1 dB) between the values. A WTRU that may experience higher PL may need to report values outside of that range.

For CE mode, for PH reporting when operating in a CE manner (e.g., when employing repetitions for coverage enhancement), or for another reason or condition, there may be at least one different mapping (e.g., from a legacy mapping) of PH to PH value for reporting. For example, there may be one new mapping for CE mode. In another example, one CE (or repetition) level may have a different mapping than another CE (or repetition) level. There may be a different mapping for each CE (or repetition level).

In CE mode, for PH reporting when operating in a coverage enhanced manner (e.g., when employing repetitions for coverage enhancement), or for another reason or condition, a WTRU may use one or more of: a different number of bits, a different number of available values, a different range, and/or a different step size when mapping computed or otherwise determined PH values to the PH values for reporting. The mapping a WTRU uses may depend on whether the WTRU is in CE mode or otherwise operating (or intending to operate) in a coverage enhanced manner and/or the CE level or repetition level the WTRU may use (or intend to use) or be using (or intending to use).

As an example, a WTRU that may not be operating in CE mode may use a non-CE mode or legacy mapping, e.g., [−23:40] dB in 1 dB steps. A WTRU that may be operating in CE mode may use another mapping such as [−40:23] dB with the step size of 1 dB or [−80:47] dB with a step size of 2 dB. In another example, a WTRU which may be operating in CE mode with one CE level, e.g., CE level 1, may use a mapping such as [−28:35] dB with the step size of 1 dB and a WTRU which may be operating in CE mode with another CE level, e.g., CE level 2, may use a mapping such as [−33, 30] with a step size of 1 dB.

A WTRU may change between CE mode and non-CE mode and/or among CE (or repetition) levels. A WTRU may use the PHR mapping that may correspond its mode or CE (or repetition) level at the time it may determine and/or send a PHR.

A WTRU's computed transmission power may include a compensation factor for the repetitions that the WTRU may be performing in the UL. Such repetition may provide gain over multiple subframes that may enable the WTRU to reduce its power in each subframe. As described earlier herein, a compensation factor, e.g., dc(Rp), may be included in the computation.

If the computed power for transmission includes the compensation factor, the PH computation in its use of computed power may also include the compensation factor. This may provide the eNodeB with a more accurate representation of the WTRU's headroom in the subframe. Alternatively, the compensation factor may be removed from the computed power for the purpose of the PH computation. This may provide the eNodeB with a more accurate representation of the PL that the WTRU may be experiencing in the subframe. If the compensation factor can be determined by the eNodeB, then it may not matter which approach may be taken as long as the WTRU and eNodeB have the same understanding.

If the computed power for transmission may not include the compensation factor, the PH computation in its use of computed power may also not include the compensation factor. Alternatively, the compensation factor may be included in the computed power for (e.g., only for) the purpose of the PH computation.

If the WTRU may not compute transmit power for transmission, e.g., such as may be the case for fixed (e.g., use of maximum) transmission power, it may (e.g., still) be useful for a WTRU to compute (or otherwise determine) PH and report it, e.g., to the eNodeB.

PH may be computed in the usual way or one or more factors included in the legacy PH calculation may be removed, set to 0, or set to a fixed value.

For example, for transmission at a fixed power, TPC commands may not be used. As a result, the TPC accumulation factor may be removed or set to 0.

Since the eNodeB may be aware of (or be able to compute) the values of some of the elements in the ordinary or legacy PH computation, e.g., the Type 1 PH shown in Eq. 7, it may be useful to send a modified or virtual PH report which may use or be based on a reference grant or format.

For example, the WTRU may use a reference grant (e.g., 1 RB) instead of the real grant for the subframe, which may be equivalent to removing the term that may be based on the grant (e.g., MPUSCH,c(i)).

In another example, the WTRU may remove all terms except the PL term (or the PL term and the repetition compensation term) and may compute the PH based on that term (or those terms). The WTRU may include or exclude the multiplier (e.g., $\alpha_c$) from the PL term. For example, the WTRU may transmit a PHR which may correspond to a PH value which may be computed as:

$$PHc(i) = Pc\,\max,c(i) - 10\log 10(PL)$$

or $$PHc(i) = Pc\,\max,c(i) - 10\log 10(\alpha_c \times PL)$$

A PHR may include values representing PHc and/or Pcmax,c.

A PHR may or may also include an indication regarding whether P-MPR may be affecting a reported Pcmax,c value. P-MPR may be a power management reduction a WTRU may take, for example to meet certain requirements such as Specific Absorption Rate (SAR) requirements, for example when a WTRU may be in proximity to a human body and/or when a WTRU may transmit on multiple radio access technologies (RATs).

Whether or not a PH value may be useful to the eNodeB, for example in the case of the WTRU transmitting at a fixed power such as maximum power, the value of Pcmax,c may be useful to the eNodeB, for example to know at what power the WTRU may be transmitting.

For example, a WTRU that may require or use coverage enhancement may have its maximum power affected by P-MPR, e.g., based on human proximity, and the maximum transmit power (or configured maximum output power) of the WTRU may fluctuate.

In one embodiment, the WTRU may send a PHR that may contain for a serving cell c, Pcmax,c, for example without any PHc values.

Certain triggers (e.g., legacy triggers) such as the PL and/or Scell activation triggers may not be used by CE-mode WTRUs. The P-MPR trigger may or may not be used by CE-mode WTRUs.

In another embodiment, a new mechanism, e.g., a new MAC control element (MAC-CE) or RRC signaling, may be used by the WTRU to transmit Pcmax,c to the eNodeB. The indication regarding whether P-MPR may be affecting a reported Pcmax,c value may be included in the new signaling. One or more PHR triggers (e.g., legacy PHR triggers) may be used to trigger this signaling.

Link adaptation for a DL control channel may be provided and/or used. In an embodiment, the WTRU-specific search space of (E)PDCCH may be dependent on the mode of operation (e.g., normal mode or CE mode) and/or CE level.

The WTRU-specific search space may be configured in all downlink subframes in (or for) normal mode, while the WTRU-specific search space may be configured in a subset DL subframes in (or for) CE mode. A WTRU may monitor (E)PDCCH in all downlink subframes if the WTRU is configured with normal mode and/or a WTRU may monitor (E)PDCCH in a subset of DL subframes if the WTRU is configured with CE mode.

The subset of subframes for (E)PDCCH monitoring in CE mode may be different according to the CE level. The subset of subframes for each CE level may be partially overlapped. A WTRU may monitor (E)PDCCH in a different set of subframes based on the CE level used.

The subset of subframes for (E)PDCCH monitoring may be defined as a function of the number of (E)PDCCH repetitions for the CE level.

The subset of subframes for (E)PDCCH monitoring may be predefined according to the CE level.

The subset of subframes for (E)PDCCH monitoring may be configured via higher layer signaling.

The WTRU-specific search space may be defined with the number of repetitions for CE mode. For example, the table for the WTRU-specific search space may be defined as a combination of aggregation level and the number of repetitions. An example is provided in Table 4.

For PDCCH, a WTRU may monitor an aggregation level set such as {1, 2, 4, 8} with a number of repetitions that may be predefined or configured by higher layer signaling. For a certain aggregation level, two or more repetitions may be used.

For EPDCCH distributed mode, a WTRU may monitor an aggregation level set such as {1, 2, 4, 8, 16} in combination with the number of repetitions that may be predefined or configured by higher layer signaling.

For a certain aggregation level with multiple repetition levels, the (E)PDCCH resources may be partially overlapped. For example, if there may be two candidates with aggregation level 4 and one uses 4 repetitions and the other 8 repetitions, the first 4 repetitions may be overlapped for two candidates. If a WTRU receives (E)PDCCH with a (E)PDCCH candidate with 4 repetitions, the WTRU may skip decoding the (E)PDCCH candidate with 8 repetitions.

The number of repetitions may be different according to the aggregation level, for example as shown in Table 4.

TABLE 4

Example mapping of aggregation level to number of repetitions and number of (E)PDCCH candidates monitored by a WTRU in CE mode.

| | Search space $S_k^{(L)}$ | | Number of ePDCCH |
|---|---|---|---|
| Type | Aggregation level L | Number of repetitions R | candidates $M^{(L)}$ |
| WTRU-specific | 1 | 4 | 3 |
| | 1 | 8 | 3 |
| | 2 | 4 | 3 |
| | 2 | 8 | 3 |
| | 4 | 4 | 1 |
| | 4 | 8 | 1 |
| | 8 | 4 | 1 |
| | 8 | 8 | 1 |

In another embodiment, the set of aggregation levels in the WTRU-specific search space may be dependent on the mode of operation (e.g., normal mode or CE mode) and/or CE level, for example as shown in Table 5.

A subset of aggregation levels may be used according to the CE level. For example, the aggregation level set {1, 2} with a set of repetitions may be used for CE level-1 and the aggregation level set {4, 8} with a set of repetitions may be used for CE level-2, where the set of repetitions may be predefined or configured by higher layer signaling.

The set of aggregation levels may be partially overlapped for each CE level. For example, CE level-2 may use the aggregation level set {4, 8} and the CE level-3 may use the aggregation level set {8, 16}.

The EPDCCH localized transmission may be supported in a specific mode of operation or a specific CE level. For example, the EPDCCH localized transmission may (or may only) be supported in normal mode and/or CE level-1 (e.g., the lowest CE level which may use the fewest number of repetitions).

TABLE 5

Example mapping of aggregation level to number of repetitions and number of (E)PDCCH candidates monitored by a WTRU according to CE level.

| Type | Search space $S_k^{(L)}$ Aggregation level L | Number of repetitions R | Number of ePDCCH candidates $M^{(L)}$ | | |
|---|---|---|---|---|---|
| | | | CE level 1 | CE level 2 | CE level 3 |
| WTRU-specific | 1 | 4 | 6 | | |
| | 1 | 8 | 6 | | |
| | 2 | 4 | 2 | | |
| | 2 | 8 | 2 | | |
| | 4 | 4 | | 4 | |
| | 4 | 8 | | 4 | |
| | 8 | 4 | | 2 | 2 |
| | 8 | 8 | | 2 | 2 |
| | 16 | 4 | | | 2 |
| | 16 | 8 | | | 2 |

In another embodiment, a certain aggregation level may be used in CE mode and the number of repetitions may be determined as a function of the CE level. The aggregation level may be the maximum number of (E)CCEs within the a certain number of PRBs (e.g. maximum number of PRBs which may be used for CE mode, or allocated PRB for (E)PDCCH in CE mode) in a certain subframe, a higher layer configured number, or a predefined number. For example, the (E)PDCCH candidates which may be monitored may be defined based on the repetition number of each CE level with a certain number of aggregation level (e.g. 16). An example is provided in Table 6.

TABLE 6

Example of (E)PDCCH candidates monitored by a WTRU according to CE level.

| Type | Search space $S_k^{(L)}$ Aggregation level L | Number of repetitions R | Number of ePDCCH candidates $M^{(L)}$ | | |
|---|---|---|---|---|---|
| | | | CE level 1 | CE level 2 | CE level 3 |
| WTRU-specific | 16 | 2 | 4 | | |
| | 16 | 4 | 2 | | |
| | 16 | 8 | 1 | 4 | |
| | 16 | 16 | | 2 | |
| | 16 | 32 | | 1 | 4 |

TABLE 6-continued

Example of (E)PDCCH candidates monitored by a WTRU according to CE level.

| Type | Search space $S_k^{(L)}$ Aggregation level L | Number of repetitions R | Number of ePDCCH candidates $M^{(L)}$ | | |
|---|---|---|---|---|---|
| | | | CE level 1 | CE level 2 | CE level 3 |
| | 16 | 64 | | | 2 |
| | 16 | 128 | | | 1 |

In another embodiment, for example to avoid the ambiguity between the (E)PDCCH candidates having the same aggregation level with a different repetition number, the repetition number of the (E)PDCCH may be indicated in a DCI (e.g., a received DCI). Alternatively, a different C-RNTI may be used for each repetition number. For example, a C-RNTI-1 may be used for the first repetition number within a certain CE level (e.g. R=2 in CE level-1 and R=8 in the CE level-2 in the example in Table 6), a C-RNTI-2 may be used for the second repetition number within the same CE level. The received, indicated, or detected repetition number for or for use by or with (or used for or by) the (E)PDCCH may be used to determine the starting subframe of the associated PDSCH and/or PUSCH.

In another embodiment, a WTRU (e.g., a WTRU receiver implementation) may monitor (E)PDCCH according to the mode of operation (e.g., normal mode or CE mode) and/or CE level.

A WTRU may start to decode lower aggregation level and repetition number, where the lower aggregation level may be smaller L and lower repetition number may be smaller R. If the WTRU succeeds in receiving a (E)PDCCH, the WTRU may skip decoding (e.g., more or another) (E)PDCCH.

When a WTRU monitors (E)PDCCH with repetition R in CE mode, the WTRU may integrate received signals which may include decoded soft bits, modulation symbols, and/or OFDM symbols. The WTRU may not try to decode the integrated signal until the number of repetitions is finished.

When a WTRU monitors (E)PDCCH with repetition R in CE mode, the WTRU may integrate received signals and may keep trying to decode and check the CRC in each repetition.

Link adaptation of (E)PDCCH common search space may be provided and/or used.

In an embodiment, the (E)PDCCH common search space may be defined or configured separately for normal mode operation and CE mode operation where the separation may be based on the different resources such as (i) different time/frequency resource; (ii) different set of (E)CCEs; and/or (iii) different set of (E)REGs. The resources for normal mode and CE mode may be mutually exclusive or partially overlapped.

A WTRU may monitor separate (E)CCEs which may be reserved for CE mode operation. For example, the first 16 CCEs (e.g., the (E)CCE #0-(E)CCE #15) in each subframe may be used for the (E)PDCCH common search space in normal mode operation, and the (E)CCEs non-overlapped with the (E)CCEs used for normal mode may be defined or configured for CE mode specific common search space.

The (E)CCEs for CE mode specific common search space may be located in the (E)CCE #16-(E)CCE #23. A WTRU operating in CE mode may monitor (E)PDCCH in CE mode specific common search space.

A WTRU may monitor a subset of (E)PDCCH (or DCI) in CE mode specific common search space and may monitor the other (E)PDCCH (or DCI) in the normal mode common search space. For example, (E)PDCCH with P-RNTI and RA-RNTI may be monitored in CE mode specific common search space while the other (E)PDCCH may be monitored in normal mode common search space.

In another embodiment, a subset of RNTI may be supported in the (E)PDCCH common search space for CE mode operation. For example, a WTRU may monitor a DCI which may be scrambled with one or more of RA-RNTI, SI-RNTI, P-RNTI, and eIMTA-RNTI in the normal mode common search space while the WTRU may monitor (e.g., only monitor) RA-RNTI and P-RNTI in CE mode common search space. The (E)PDCCH common search space and common search space may be used interchangeably.

In normal mode common search space, aggregation levels, e.g., {4, 8}, may be used with repetitions while a single aggregation level (e.g. the maximum aggregation level) may be used in CE mode specific common search space.

In another embodiment, the (E)PDCCH common search space may be defined separately for each CE level. For example, the common search space for CE level-1 and CE level-2 may be in a different time and/or frequency location, or the same time/frequency location with a different set of (E)CCEs. A WTRU may monitor a certain DCI in the corresponding common search spaced based on the CE level determined or configured. In another example, the common search space for a lower CE level may be a subset of the common search space for a higher CE level, where the lower CE level may have a lower number of repetitions. The common search space for the different CE levels may have a different number of aggregation levels and/or repetition numbers.

A (E)PDCCH candidate in CE mode specific common search space may be defined as a combination of an aggregation level ($N_{AL}$) and a repetition level ($N_R$). One or more (E)PDCCH candidates for a specific total aggregation level ($N_{TAL}=N_{AL} \times N_R$) may be defined in CE mode specific common search space. A (E)PDCCH candidate in CE mode specific common search space may have a single aggregation level and multiple repetition levels. A (E)PDCCH candidate in CE mode specific common search space may have multiple aggregation levels with a single repetition level. The repetition level and/or aggregation level may be determined as a function of at least one of RNTI and DCI format. In an example, a (E)PDCCH carrying a DCI scrambled with RA-RNTI may be monitored with the repetition level $N_1$ (e.g. 20) and a (E)PDCCH carrying a DCI scrambled with P-RNTI may be monitored with the repetition level $N_2$ (e.g. 30). In another example, a (E)PDCCH carrying a DCI format A (e.g. DCI format 1A) may be monitored with the repetition level $N_1$ (e.g. 20) and a (E)PDCCH carrying a DCI format B (e.g. DCI format 1C) may be monitored with the repetition level $N_2$ (e.g. 30).

CE mode specific common search space may be located in a subset of subframes. In an example, CE mode specific common search space may be defined as consecutive $N_{CSS}$ subframes, which may be referred to as a common search space burst, and the common search space burst may be located a periodic manner. A WTRU in CE mode operation may monitor CE mode specific common search space (e.g., only) in the subset of subframes which may be defined as common search space burst. Within the consecutive $N_{CSS}$ subframes, a (E)PDCCH candidate may be transmitted repetitively.

In another embodiment, a subset of (E)CCEs used for normal mode (E)PDCCH common search space may be used for CE mode specific (E)PDCCH common search space.

The first 8 (E)CCEs (e.g., (E)CCE #0-(E)CCE #7) may be used for CE mode specific common search space. Alternatively, the first 4 (E)CCEs may be used for CE mode specific common search space. A single aggregation level may be used. For example, the aggregation level 8 may be used in CE mode specific common search space. A repetition window may be defined and a (E)PDCCH which may be transmitted in CE mode specific common search space may be transmitted repetitively within the repetition window. The aggregation level may be changed according to the repetition window. For example, non-overlapped repetition windows may be defined for CE mode specific common search space, and the aggregation level may be changed according to the repetition window.

CE mode specific common search space may be located in a subset of subframes. The subset of (E)CCEs used for CE mode may be reserved in (e.g., only in) a subset of subframes. A WTRU operating in CE mode may monitor common search space in a subset of subframes if the subframe contains CE mode specific common search space. The subset of subframes containing CE mode specific common search space may be configured via higher layer signaling. The subset of subframes containing CE mode specific common search space may be defined as a function of at least one of subframe number, SFN number, physical cell-ID, and/or WTRU-ID.

In another embodiment, an RNTI specific repetition window may be defined and/or used. For example, multiple repetition windows which may be non-overlapped in time domain may be defined and/or used, and a certain RNTI based (E)PDCCH may be transmitted per repetition window. A (E)PDCCH carrying a DCI scrambled with RA-RNTI may be transmitted in a certain repetition window and a (E)PDCCH carrying a DCI scrambled with P-RNTI may be transmitted in another repetition window which may not be overlapped with the repetition window for the (E)PDCCH carrying a DCI scrambled with RA-RNTI. A (E)PDCCH received in a certain repetition window may be (e.g., implicitly) determined as a certain RNTI based on the time location of the repetition window. The repetition window for RA-RNTI may be located a few subframes after the last subframe of coverage enhanced PRACH resource. The resource configuration information for RNTI specific repetition window may be transmitted in a broadcasting channel (e.g. SIB).

Link adaptation of a broadcast channel may be provided and/or used. Two types (or at least two types) of PBCH may be transmitted in a cell such as legacy PBCH and CE PBCH. Legacy PBCH may be a PBCH transmitted in subframe 0 in every radio frame and may not be repeated within a radio frame. CE PBCH may be a PBCH transmitted in a subframe other than subframe 0 and may be repeated within a radio frame. CE PBCH may be transmitted in subframe 0 in OFDM symbols not containing legacy PBCH. A WTRU may receive legacy PBCH and/or CE PBCH to obtain master information block (MIB) information. In some embodiments, for example when CE PBCH is a repetition of the legacy PBCH in a radio frame, the legacy PBCH may be considered to be one of the repetitions of CE PBCH. CEr PBCH may be used to denote the CE PBCH transmissions which may not include the legacy PBCH transmissions.

In an embodiment, a WTRU or WTRU receiver (e.g., a WTRU receiver for PBCH reception) may try to decode legacy PBCH and if that may fail, may try to decode CEr PBCH and/or combine legacy PBCH and/or one or more repetitions of CEr PBCH in order to successfully decode PBCH and obtain the MIB.

A WTRU may (e.g., first) try to decode legacy PBCH. If the WTRU fails to receive and/or decode the legacy PBCH within a certain PBCH cycle, where the certain PBCH cycle may be a 40 ms window during which the MIB information is (or may be) unchanged, the WTRU may keep trying to receive and/or decode the legacy PBCH.

One or more events may trigger a WTRU to decode (or try to decode) CEr PBCH. Receiving and/or decoding CEr PBCH may include combining multiple repetitions of the CEr PBCH with each other and/or with legacy PBCH. For example, if the WTRU fails to decode legacy PBCH K times, the WTRU may start to receive and/or decode CEr PBCH. The number K may be a fixed number in a WTRU implementation. Alternatively, the number K may be a different number according to an RSRP measurement level. A timer may be used to receive the MIB via legacy PBCH and if the WTRU may not succeed to decode PBCH before the timer expires, the WTRU may start to receive and/or decode CEr PBCH when or after the timer expires.

A WTRU may check whether or not CEr PBCH is supported in the cell and may use CEr PBCH if supported.

A WTRU may perform a cell search procedure and the WTRU may start to receive PBCH once the cell search procedure is finished. If the WTRU spends (or spent) a time more than a certain (e.g., predefined) threshold to finish the cell search procedure (e.g., to receive synchronization channels), the WTRU may start to receive and/or decode CEr PBCH. The WTRU may start to receive and/or decode legacy PBCH otherwise. The threshold may be set as a time requirement for synchronization channel reception in normal mode. If a WTRU spends (or spent) a time more than a predefined threshold to finish a cell search procedure, the WTRU may first check whether CEr PBCH is supported in the cell or not. For the CEr PBCH probing, the WTRU may use a correlator so that correlating of legacy PBCH signal and the repetition of legacy PBCH in other time locations within a radio frame may be performed. If the autocorrelation of these two signals is higher than a predefined level, the WTRU may consider that CEr PBCH is supported in the cell. Then, the WTRU may perform PBCH reception procedures with CEr PBCH.

A SIB may be transmitted in a certain subframe. For example, SIB1 may be transmitted in subframe #5 in every radio frame and the associated (E)PDCCH which may carry scheduling information may be CRC scrambled with SI-RNTI in the subframe. Resource allocation and MCS level may be selected dynamically in each subframe for SIB1 transmission.

A coverage enhanced SIB (CE-SIB) may carry system information for CE mode operation and/or for WTRUs which may be operating in CE mode.

In an embodiment, the associated (E)PDCCH for CE-SIB may be transmitted over multiple subframes. For example, the associated (E)PDCCH may be repetitively transmitted over multiple subframes within a time window. A WTRU may (e.g., first) receive the associated (E)PDCCH for CE-SIB within a time window and may (e.g., then) receive CE-SIB based on the information carried via the associated (E)PDCCH. The associated (E)PDCCH for CE-SIB may be transmitted with a specific RNTI for CE-SIB.

In another embodiment, the CE-SIB may be transmitted in a certain time/frequency (e.g., time and/or frequency) location and/or with a certain MCS level. A WTRU may receive the CE-SIB without an associated (E)PDCCH. The certain time/frequency location may be predefined. The certain time/frequency location may be determined as a function of cell-ID. The certain time/frequency location may be indicated via MIB. In an example, a WTRU may receive an indication from an eNB (e.g. the indication may be signaled in MIB) which may provide scheduling information for the CE-SIB. The scheduling information may include one or more of the time and/or frequency location, the schedule (e.g., periodicity, offset, and the like), and/or MCS level of the CE-SIB. If the information does not include an MCS level, the WTRU may or may need to attempt to decode the CE-SIB with a set of MCS levels that may be used for CE-SIB transmission, e.g., to determine the MCS level which may have been used. The MCS level may be determined as a function of TBS size of the CE-SIB and the modulation order may be fixed (e.g. QPSK). In another example, the certain time/frequency location and/or the MCS level for the CE-SIB may be predefined as a set. A WTRU may need to attempt to decode the CE-SIB within a set of time/frequency locations and/or MCS levels until it receives the CE-SIB.

In an embodiment, a CE-SIB may be transmitted in a subset of radio frames. The radio frames containing a CE-SIB may be defined as a function of physical cell-ID (PCI). The radio frames containing a CE-SIB may be determined from a modulo operation which may be used with SFN and PCI. For example, CE-SIB may be located in radio frames for which SFN mod PCI=0. The radio frames which may contain a CE-SIB may be determined from a list of radio frames (e.g., SFNs of radio frames) which may contain CE-SIB.

The radio frames containing CE-SIB may be dependent on the location of CE-PBCH. For example, the timing relationship between CE-SIB and CE-PBCH may be defined and/or known. The radio frames containing the CE-SIB may be located in n+k radio frames when the last radio frame containing CE-PBCH is n and k may be a positive integer number.

The frequency resource allocated for CE-SIB in a subframe containing (or which may contain) the CE-SIB may be predefined in the subframes containing (or which may contain) the CE-SIB. For example, a center x PRBs may be used for the CE-SIB transmission in the subframes containing the CE-SIB, where x may be a positive integer number. Alternatively, the frequency resource may be defined as a function of the system bandwidth and/or subframe number.

It is contemplated that CE level, enhanced coverage level, repetition number, repetition window length, and CE amount may be used interchangeably. It is further contemplated that channel, physical channel, and LTE (or LTE-A) physical channel may be used interchangeably. An LTE (or LTE-A) physical channel may be at least one of a PDSCH, a PUSCH, a PUCCH, an (E)PDCCH, a PRACH, and/or a PBCH.

In some embodiments, two or more CE levels may be defined and/or configured for a channel. The number of CE levels may be dependent on a physical channel and/or a traffic type. Alternatively, the number of CE levels may be defined and/or configured independently for each physical channel or group of physical channels.

The number of CE levels supported for (or which may be used for) PRACH may be different from the number of CE levels supported for (or which may be used for) one or more data channels such as PDSCH and/or PUSCH. For example, 3 CE levels may be used for PRACH while 6 CE levels may be used for PDSCH and/or PUSCH. A CE level for the PRACH may be defined as a number of repetitions for a PRACH preamble transmission. The repetition number for each CE level may be predefined, broadcasted, higher layer configured, and/or determined as a function of the repetition number of PBCH. A CE level of a data channel (e.g. PDSCH and/or PUSCH) may be defined as a number of repetitions, where the repetition number may be determined by higher layer signaling or broadcast channel (e.g. SIB), or by a dynamic indication from a DCI format, where the CRC of the DCI may be scrambled with a RNTI used for (or which may be used for) the data channel (e.g. C-RNTI), or a RNTI used for (or which may be used for) the CE level indication.

The same number of CE levels may be used for a group of channels, and a determined CE level among the supported CE levels may be applied for the group of channels. For example, $N_{CE}$ CE levels may be defined for a group of channels including PRACH and (E)PDCCH, and where a CE level is determined for PRACH, the same CE level may be used for the (E)PDCCH for the corresponding RAR reception. If a CE level is determined for PRACH, the CE level may be used for the (E)PDCCH. In some embodiments, a repetition number may be used as a CE level for a channel, and the repetition number for a channel for a certain CE level may be different from the repetition number used for the CE level for another channel in the group. For example, the CE level-1 for the PRACH may use 10 repetitions while the CE level-1 for the (E)PDCCH may use 15 repetitions. In other embodiments, a power boosting level may be used as a CE level for a channel, and the power boosting level for a channel in a certain CE level may be different from the power boosting level for another channel in the group in the same CE level. In an example, 3 dB boosting may be considered as CE level-1 for (E)PDCCH and 4 dB boosting may be considered as CE level for PDSCH, where the power boosting level may be defined as power ratio between reference signal and PDSCH RE.

A different number of CE levels may be used according to the information or traffic type which may be carried in a physical channel. For example, a PDSCH containing unicast traffic may use $N_{CE}$ CE levels while a PDSCH containing broadcasting information may use $M_{CE}$ CE levels.

The CE level may be indicated dynamically in the associated DCI for (E)PDCCH, PDSCH, and/or PUSCH. For example, $N_{CE}$ CE levels may be used for a PDSCH containing unicast traffic and a $\log_2[N_{CE}]$ bit CE level indicator field may be defined in the associated DCI scrambled with C-RNTI. $M_{CE}$ CE levels may be used for a PDSCH containing broadcasting information and a $\log_2[M_{CE}]$ bit CE level indicator field may be defined in the associated DCI scrambled with SI-RNTI. The number of bits for the CE level indication field in a DCI may be defined as a function of RNTI type. The number of CE levels indicated in a DCI may be determined according to the RNTI type. The number of bits for the CE level indication field may be defined as a function of the DCI format. The repetition number used for a CE level may be predetermined, signaled e.g., by higher layer signaling, determined as a function of RNTI type, DCI format, and/or information type which may be contained in the PDSCH.

The CE level may be indicated dynamically in the associated DCI for a PDSCH and/or a PUSCH such as the DCI where the CRC may be scrambled with C-RNTI. The CE level for DCI where the CRC scrambled with other RNTI than C-RNTI may be determined based on the CE level used for PRACH. A CE level for the PDSCH containing SIB, Paging, and/or PMCH may be determined as a function of the CE level which may be determined in RACH procedure.

A CE level for the PDSCH containing unicast traffic may be the same as the CE level for the CE level which may be determined during RACH procedure, for example unless otherwise configured by higher layer or indicated by a DCI format.

In some embodiments, the CE level may be indicated (e.g., implicitly) by the associated (E)PDCCH CE level used and/or detected from the blind decoding. For example, a WTRU in CE mode may monitor (E)PDCCH with multiple CE levels, and if the WTRU receives an (E)PDCCH in a certain CE level, the WTRU may assume that the same CE level may be used for the associated PDSCH or PUSCH.

In another embodiment, the same number of CE levels may be defined for all physical channels. However, the number of repetitions for a CE level may be determined as a function of a channel and/or a traffic type carried in a channel. As an example, $N_{CE}$ CE levels may be defined for a PRACH, where CE level-1 may correspond to $N_{rep}$ repetitions while the CE level-1 for PDSCH may correspond to $M_{rep}$ repetitions, where $N_{rep}$ and $M_{rep}$ may be different. In another example, $N_{CE}$ CE levels may be defined or configured for a PDSCH, where CE level-1 may correspond to $N_{rep}$ repetitions if the PDSCH contains broadcasting information, while the CE level-1 may correspond to $M_{rep}$ repetitions if the PDSCH contains unicast traffic. The number of CE levels may be predefined (or signaled) while the corresponding repetition number may be configured by a higher layer signaling per channel.

In some embodiments, a window-based transmission may be used. In such embodiments, a time window may be defined for a physical channel, and the physical channel may be transmitted repetitively within the time window. In one example, a time window may be defined for (E)PDCCH, PDSCH, and PUSCH, among other options, and a WTRU may receive (E)PDCCH within (E)PDCCH window with repetitions. The associated PDSCH or PUSCH may be transmitted or received in the following PDSCH or PUSCH window.

The windows for the physical channels may be partially or fully overlapped irrespective of the direction of the communication (e.g. DL or UL). For example, a WTRU may monitor (E)PDCCH in the (E)PDCCH window, while the WTRU may transmit PUSCH in the PUSCH window, which may be fully or partially overlapped with the (E)PDCCH window. A WTRU may transmit and receive at the same time in a subframe.

The window for the physical channels may be partially or fully overlapped in the same direction of communication (e.g. DL or UL) only. The (E)PDCCH window may be partially or fully overlapped with the PDSCH window. The (E)PDCCH window may not be overlapped with a PUSCH window.

Figure 8:
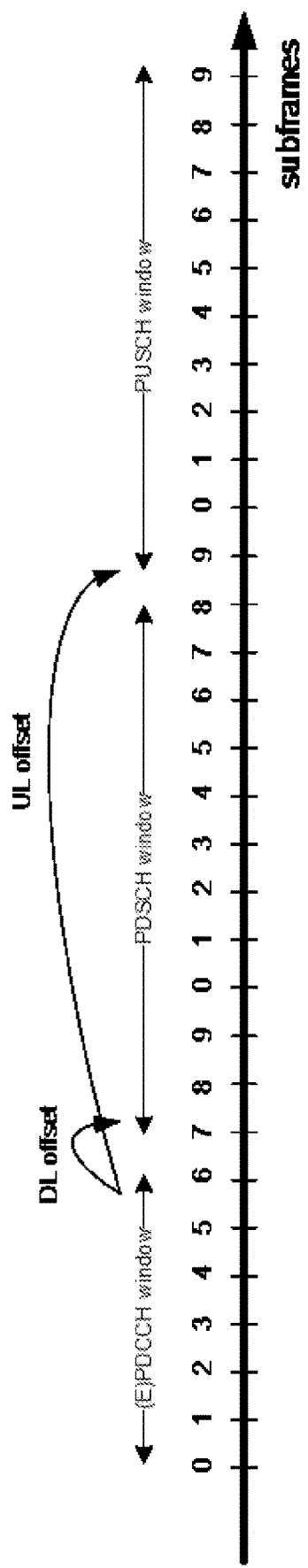
FIG. 8 illustrates an example of a method using a downlink (DL) and uplink (UL) offset for indicating the starting subframe of PDSCH and PUSCH windows.

In another embodiment, an offset from the last subframe of the (E)PDCCH may be used to indicate the starting subframe of at least one of the PDSCH, PUSCH, and/or PUCCH window as shown in FIG. 8 as an example. For example, if the (E)PDCCH window finishes in the subframe n, the starting subframe of the PDSCH window may be the subframe $n+N_{DL}$, and the starting subframe of the PUSCH window may be the subframe $n+N_{UL}$, where $N_{DL}$ and $N_{UL}$ may be the offsets.

The numbers $N_{DL}$ and $N_{UL}$ may be predefined numbers applied for all WTRUs. Alternatively, the $N_{DL}$ and $N_{UL}$ may be configured via higher layer signaling in a cell-specific or WTRU-specific manner. For example, the $N_{UL}$ may be dependent on the length of the PDSCH window. The $N_{UL}$ may be determined as a function of the length of the PDSCH window: for example, if the PDSCH window length is $N_{PDSCH}$, the $N_{UL}$ may be determined as $N_{PUSCH}+1$, i.e., $N_{UL}=N_{PUSCH}+1$. The $N_{DL}$ and $N_{UL}$ may be indicated in the associated DCI. For example, $N_{DL}$ may be indicated in the associated DCI for the PDSCH, and the $N_{UL}$ may be indicated in the associated DCI for the PUSCH. The $N_{DL}$ and $N_{UL}$ may be indicated in the associated DCI for PDSCH and/or PUSCH if a WTRU is configured with a CE mode.

The relationship between $N_{DL}$ and $N_{UL}$ may be dependent on the WTRU capability. For example, $N_{DL}=1$ and $N_{UL}=4$ may be used if the WTRU is full duplex mode capability, while $N_{DL}=1$ and $N_{UL}=N_{OFF}$ may be used if the WTRU is half duplex mode and/or time duplex mode capability.

In some embodiments, the PUSCH and PUCCH windows may be partially or fully overlapped. If a WTRU receives a PDSCH allocation and a PUSCH grant in the same (E)PDCCH window, the WTRU may transmit both PUSCH and PUCCH in the PDSCH region. Therefore, HARQ_ACK may be piggybacked on data. Alternatively, if a WTRU receives PDSCH allocation and PUSCH grant in the same (E)PDCCH window, the WTRU may drop one of the channels in uplink.

In an embodiment, a method performed at a wireless transmit/receive unit (WTRU) includes determining a repetition number for an uplink signal, deriving an uplink transmission power for the uplink signal, wherein the transmission power is based on the repetition number; and transmitting an uplink signal with repetitions, using the determined repetition number and the derived uplink transmission power.

In such an embodiment, the determination of the repetition number for an uplink signal used for a physical random access channel (PRACH) is based on a downlink measurement. The determination of the repetition number may be performed by selecting a repetition number from a set of repetition levels. The set of repetition levels may be configured by an enhanced Node-B (eNB). The determination of the repetition number may be performed by selecting a repetition number from a set of repetition levels.

The determination of the repetition number may be performed based on information received from an enhanced Node-B (eNB). The uplink signal may be sent on a physical uplink shared data channel (PUSCH). The determination of the repetition number may be performed based on information received in a downlink control indicator (DCI). The deriving of the uplink transmission power may be performed using a power control formula that includes an offset parameter, wherein the offset parameter is determined as a function of the repetition number. The deriving of the uplink transmission power may include determining a target received power; and deriving the uplink transmission power from the target received power.

The determination of the target received power may be performed based on information received from an enhanced Node-B (eNB). The target received power may be determined as a function of the number of repetitions.

The uplink signal with repetition may be an uplink signal transmitted repetitively over multiple subframes.

In an embodiment, a method performed at a wireless transmit-receive unit (WTRU) comprises: receiving a downlink control information (DCI) message from a radio access network and, based at least in part on the downlink control information message, setting a repetition level for at least one shared channel between the WTRU and the radio access network.

In such an embodiment, a transmitter power of the WTRU may be set, wherein the transmitter power depends at least in part on the repetition level. The downlink control information message may include a transmit power control (TPC) command, with the repetition level being based at least in part on the transmit power control command. The repetition level may be set for a physical downlink control channel (PDCCH) based on the transmit power control (TPC) command. The repetition level may be set for a physical uplink control channel (PUCCH) based on the transmit power control (TPC) command. The shared channel is a physical downlink shared channel (PDSCH). The WTRU may be configured to receive data on the physical downlink shared channel (PDSCH) using the repetition level.

A power offset may be set between a cell-specific reference signal (CRS) and the physical downlink shared channel (PDSCH), where the power offset is determined at least in part by the repetition level of the physical downlink shared channel (PDSCH).

The shared channel may be a physical uplink shared channel (PUSCH). The method may further comprise transmitting data on the physical uplink shared channel using the repetition level.

In an embodiment, a wireless transmit-receive unit (WTRU) includes a transceiver operative to receive a transmit power control (TPC) command from a radio access network; and decoder logic operative, in response to the transmit power control (TPC) command, to set a repetition level for at least one shared channel between the WTRU and the radio access network, wherein the repetition level is based at least in part on the transmit power control (TPC) command.

In such an embodiment, the shared channel may be a physical downlink shared channel (PDSCH), and the decoder logic may further be operative to receive data on the physical downlink shared channel (PDSCH) using the repetition level. The shared channel may be a physical uplink shared channel (PUSCH), and the transceiver may be operative to transmit data on the physical uplink shared channel using the repetition level.

In an embodiment, a method performed at a wireless transmit-receive unit (WTRU) includes receiving from a radio access network a transmission including a plurality of subframes, each subframe including a plurality of control channel elements (CCEs); determining whether the WTRU is in a coverage enhancement mode; if the WTRU is not in a coverage enhancement mode, monitoring a first set of CCEs for physical downlink control channel (PDCCH) communications, wherein the first set of CCEs is a first search space; and if the WTRU is in a coverage enhancement mode, monitoring a second set of CCEs for physical downlink control channel (PDCCH) communications, wherein the second set of CCEs is a second search space, and wherein the search space is different from the first search space.

In such an embodiment, the physical downlink control channel may be an enhanced physical downlink control channel (EPDCCH). The first search space may be monitored with a plurality of aggregation levels, and the second search space may be monitored with a single aggregation level. The second search space may be monitored with a single aggregation level and multiple repetition levels. The second search space may be monitored with multiple aggregation levels and a single repetition level.

In an embodiment, a wireless transmit-receive unit (WTRU) includes a transceiver operative to receive from a radio access network a transmission including a plurality of subframes, each subframe including a plurality of control channel elements (CCEs). In this embodiment, the transceiver is operative, if the WTRU is not in a coverage enhancement mode, to monitor a first set of CCEs for physical downlink control channel (PDCCH) communications, wherein the first set of CCEs is a first search space; and the transceiver is operative, if the WTRU is in a coverage enhancement mode, to monitor a second set of CCEs for physical downlink control channel (PDCCH) communications, wherein the second set of CCEs is a second search space, and wherein the search space is different from the first search space.

In such an embodiment, the physical downlink control channel may be an enhanced physical downlink control channel (EPDCCH). The first search space may be monitored with a plurality of aggregation levels, and the second search space may be monitored with a single aggregation level. The second search space may be monitored with a single aggregation level and multiple repetition levels. The second search space may be monitored with multiple aggregation levels and a single repetition level.

In an embodiment, a method performed at a wireless transmit-receive unit (WTRU) includes: selecting a first coverage enhancement level for a first communication channel from a first number of coverage enhancement levels; selecting a second coverage enhancement level for a second communication channel from a second number of coverage enhancement levels; communicating with a radio access network over the first communication channel using the first coverage enhancement level; and communicating with the radio access network over the second communication channel using the second coverage enhancement level.

In such an embodiment, the first number of coverage enhancement levels may be different from the second number of coverage enhancement levels. Communicating using the first coverage enhancement level may include communicating using a first number of repetitions determined by the first coverage enhancement level, and communicating using the second coverage enhancement level may include communicating using a second number of repetitions determined by the second coverage enhancement level. The number of repetitions associated with the first coverage enhancement level is determined by signaling from the radio access network.

Communicating using the first coverage enhancement level may include communicating using a first power boosting level determined by the first coverage enhancement level, and communicating using the second coverage enhancement level may include communicating using a second power boosting level determined by the second coverage enhancement level.

The first communication channel may be a physical random access channel (PRACH) and the second communication channel may be a shared channel. The shared channel may be a physical downlink shared channel (PDSCH). The shared channel may be a physical uplink shared channel (PUSCH).

Communicating over the PRACH may include transmitting a PRACH preamble with a number of repetitions determined by the first coverage enhancement level. The second number of coverage enhancement levels may be determined based at least in part on the type of traffic carried in the second communication channel.

The second communication channel may be a physical downlink shared channel (PDSCH), and the second number of coverage enhancement levels may be determined based at least in part on whether the PDSCH is carrying unicast traffic or broadcast traffic.

In an embodiment, a wireless transmit-receive unit (WTRU) includes a transceiver operative to perform a set of functions including the functions of selecting a first coverage enhancement level for a first communication channel from a first number of coverage enhancement levels; selecting a second coverage enhancement level for a second communication channel from a second number of coverage enhancement levels; communicating with a radio access network over the first communication channel using the first coverage enhancement level; and communicating with the radio access network over the second communication channel using the second coverage enhancement level.

In such an embodiment, the first number of coverage enhancement levels may be different from the second number of coverage enhancement levels.

The function of communicating using the first coverage enhancement level may include the function of communicating using a first number of repetitions determined by the first coverage enhancement level; and the function of communicating using the second coverage enhancement level may include the function of communicating using a second number of repetitions determined by the second coverage enhancement level.

The number of repetitions associated with the first coverage enhancement level may be determined by signaling from the radio access network.

The function of communicating using the first coverage enhancement level may include the function of communicating using a first power boosting level determined by the first coverage enhancement level, and the function of communicating using the second coverage enhancement level may include the function of communicating using a second power boosting level determined by the second coverage enhancement level.

The first communication channel may be a physical random access channel (PRACH), and the second communication channel may be a shared channel. The shared channel may be a physical downlink shared channel (PDSCH). The shared channel may be a physical uplink shared channel (PDSCH). Communicating over the PRACH may include transmitting a PRACH preamble with a number of repetitions determined by the first coverage enhancement level.

The second number of coverage enhancement levels may be determined based at least in part on the type of traffic carried in the second communication channel. The second communication channel may be a physical downlink shared channel (PDSCH), and the second number of coverage enhancement levels may be determined based at least in part on whether the PDSCH is carrying unicast traffic or broadcast traffic.

In an embodiment, a method performed at a wireless transmit-receive unit (WTRU) includes determining whether the WTRU is in a coverage enhancement mode; and after a determination that the WTRU is in a coverage enhancement mode: receiving with repetitions from a radio access network a first downlink physical channel within a first downlink time window; and transmitting with repetitions to the radio access network a first uplink physical channel within a first uplink time window.

In such an embodiment, the first downlink physical channel may be a physical downlink control channel ((E)PDCCH). The first downlink physical channel is a physical downlink shared channel (PDSCH). The first uplink physical channel may be a physical uplink shared channel (PUSCH). The first uplink physical channel may be a physical uplink control channel (PUCCH).

The first downlink time window may overlap at least in part with the first uplink time window.

There may be at least one subframe in which at least a portion of the receiving and at least a portion of the transmitting are both performed in said subframe.

The method may further include receiving with repetitions from the radio access network a second downlink physical channel within a second downlink time window. The second downlink time window may overlap at least in part with the first downlink time window.

The first downlink physical channel may be a physical downlink control channel ((E)PDCCH), and the second downlink physical channel may be a physical downlink shared channel (PDSCH).

The method may further include sending with repetitions to the radio access network a second uplink physical channel within a second uplink time window.

The second uplink time window may overlap at least in part with the first uplink time window.

The first uplink physical channel may be a physical uplink control channel (PUCCH), and the second uplink physical channel may be a physical uplink shared channel (PUSCH).

In the exemplary method, the first downlink physical channel may be a physical downlink control channel ((E)PDCCH) having an end subframe; and the first uplink physical channel may be a physical uplink shared channel (PUSCH). In such an embodiment, the method may further include receiving with repetitions from the radio access network a physical downlink shared channel within a second downlink time window, wherein the second downlink time window begins at a downlink offset after the end subframe; and the first uplink time window begins at an uplink offset after the end subframe.

In an embodiment, a wireless transmit-receive unit (WTRU) includes a transceiver operative to perform a set of functions including the functions of determining whether the WTRU is in a coverage enhancement mode; and after a determination that the WTRU is in a coverage enhancement mode: receiving with repetitions from a radio access network a first downlink physical channel within a first downlink time window; and transmitting with repetitions to the radio access network a first uplink physical channel within a first uplink time window.

In such an embodiment, the first downlink physical channel may be a physical downlink control channel ((E)PDCCH). The first downlink physical channel may be a physical downlink shared channel (PDSCH). The first uplink physical channel may be a physical uplink shared channel (PUSCH). The first uplink physical channel may be a physical uplink control channel (PUCCH).

The first downlink time window may overlap at least in part with the first uplink time window. There may be at least one subframe in which at least a portion of the receiving and at least a portion of the transmitting are both performed in said subframe.

The transceiver may be further operative to receive with repetitions from the radio access network a second downlink physical channel within a second downlink time window. The second downlink time window may overlap at least in part with the first downlink time window. The first downlink physical channel may be a physical downlink control channel ((E)PDCCH) and the second downlink physical channel may be a physical downlink shared channel (PDSCH).

The transceiver may further be operative to send with repetitions to the radio access network a second uplink physical channel within a second uplink time window. The second uplink time window overlaps at least in part with the first uplink time window. The first uplink physical channel may be a physical uplink control channel (PUCCH), and the second uplink physical channel may be a physical uplink shared channel (PUSCH).

In an embodiment, a method performed at a wireless transmit-receive unit (WTRU) includes determining whether the WTRU is in a coverage enhancement mode; and after a determination that the WTRU is in a coverage enhancement mode: receiving with repetitions from a radio access network a first downlink physical channel within a first downlink time window; determining, based at least in part on the first downlink physical channel, a second downlink time window and a first uplink time window; receiving with repetitions from the radio access network a second downlink physical channel within the second downlink time window; and transmitting with repetitions to the radio access network a first uplink physical channel within the first uplink time window.

In such an embodiment, the first downlink physical channel may be an (E)PDCCH, the second downlink physical channel may be a PDSCH, and the first uplink physical channel may be a PUSCH. Determining the second downlink time window and the first uplink time window may include defining the second downlink time window as beginning at a downlink offset with respect to the first downlink time window; and defining the second uplink time window as beginning at an uplink offset with respect to the first downlink time window.

The downlink offset and uplink offset may be predefined. The downlink offset and uplink offset may be configured by higher-layer signaling. The uplink offset may be dependent on the length of the second downlink time window. At least one of the downlink offset and uplink offset may be configured by a downlink control information (DCI) message. The downlink offset and uplink offset may depend at least in part on whether the WTRU supports full-duplex communication.

In an embodiment, a wireless transmit-receive unit (WTRU) includes a transceiver operative to perform a set of functions including the functions of receiving with repetitions from a radio access network a first downlink physical channel within a first downlink time window; determining, based at least in part on the first downlink physical channel, a second downlink time window and a first uplink time window; receiving with repetitions from the radio access network a second downlink physical channel within the second downlink time window; and transmitting with repetitions to the radio access network a first uplink physical channel within the first uplink time window.

The first downlink physical channel may be an (E)PDCCH, the second downlink physical channel may be a PDSCH, and the first uplink physical channel may be a PUSCH. The function of determining the second downlink time window and the first uplink time window may include the functions of defining the second downlink time window as beginning at a downlink offset with respect to the first downlink time window; and defining the second uplink time window as beginning at an uplink offset with respect to the first downlink time window.

The downlink offset and uplink offset may be predefined. The downlink offset and uplink offset may be configured by higher-layer signaling. The uplink offset may be dependent on the length of the second downlink time window. At least one of the downlink offset and uplink offset may be configured by a downlink control information (DCI) message.

The downlink offset and uplink offset may depend at least in part on whether the WTRU supports full-duplex communication.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

We claim:

1. A method performed at a wireless transmit and receive unit (WTRU), the method comprising:
    determining a number of repetitions for an uplink signal, wherein the uplink signal is used for transmission of a physical random access channel (PRACH) preamble, and wherein the number of repetitions is a number of PRACH preamble repetitions in a single PRACH preamble transmission attempt;
    deriving an uplink transmission power for the uplink signal used for the transmission of the PRACH preamble, wherein deriving the uplink transmission power for the uplink signal includes using a power control formula that applies a power offset determined as a function of the number of repetitions, the power offset being applied by subtracting an offset parameter of ten times the base-ten logarithm of the number of repetitions and expressed as: 10*log 10 (the number of repetitions); and
    transmitting the uplink signal with repetitions, using the determined number of repetitions and the derived uplink transmission power.

2. The method of claim 1, wherein the determination of the number of repetitions is based on a downlink measurement.

3. The method of claim 2, wherein the determination of the number of repetitions is performed by selecting a given number of repetitions from a set of repetition levels.

4. The method of claim 3, wherein the set of repetition levels is configured by an enhanced Node-B (eNB).

5. The method of claim 1, wherein the determination of the number of repetitions is performed by selecting a given number of repetitions from a set of repetition levels.

6. The method of claim 5, wherein the set of repetition levels is configured by an enhanced Node-B (eNB).

7. The method of claim 1, wherein the determination of the number of repetitions is performed based on information received from an enhanced Node-B (eNB).

8. The method of claim 1, wherein the determination of the number of repetitions is performed based on information received in a downlink control indicator (DCI).

9. The method of claim 1, wherein the uplink signal is transmitted repetitively over multiple subframes.

10. The method of claim 9, wherein a number of the multiple subframes corresponds to the determined number of repetitions.

11. The method of claim 1, wherein:
    the WTRU is a WTRU in a coverage enhancement (CE) mode, and
    the number of repetitions is determined in accordance with a CE level.

12. The method of claim 1, wherein the offset parameter is further scaled and expressed as: a scale factor multiplied by 10*log 10 (the number of repetitions).

13. A method performed at a wireless transmit and receive unit (WTRU), the method comprising:
    determining a number of repetitions for an uplink signal, wherein the uplink signal is used for transmission of a physical random access channel (PRACH) preamble, and wherein the number of repetitions is a number of PRACH preamble repetitions in a single PRACH preamble transmission attempt;
    deriving an uplink transmission power for the uplink signal used for the transmission of the PRACH preamble, wherein deriving the uplink transmission power for the uplink signal includes:
        determining a target received power, wherein the target received power is a preamble received target power for random access (RA); and
        deriving the uplink transmission power based on applying a power offset, determined as a function of the number of repetitions, to the target received power, the power offset being applied by subtracting an offset parameter from the target received power, the offset parameter being ten times the base-ten logarithm of the number of repetitions and expressed as: 10*log 10 (the number of repetitions); and
    transmitting the uplink signal with repetitions, using the determined number of repetitions and the derived uplink transmission power.

14. The method of claim 13, wherein the preamble received target power is determined based on information received from an enhanced Node-B (eNB).

15. The method of claim 13, wherein the offset parameter is further scaled and expressed as: a scale factor multiplied by 10*log 10 (the number of repetitions).

16. A wireless transmit and receive unit (WTRU), comprising:
    a processor; and
    a memory configured to store a plurality of instructions that, when executed by the processor, cause the processor to perform function including:
        determining a number of repetitions for an uplink signal, wherein the uplink signal is used for transmission of a physical random access channel (PRACH) preamble, and wherein the number of repetitions is a number of PRACH preamble repetitions in a single PRACH preamble transmission attempt;
        deriving an uplink transmission power for the uplink signal used for the transmission of the PRACH preamble, wherein deriving the uplink transmission power for the uplink signal includes using a power control formula that applies a power offset determined as a function of the number of repetitions, the power offset being applied by subtracting an offset parameter of ten times the base-ten logarithm of the number of repetitions and expressed as: 10*log 10 (the number of repetitions); and transmitting the uplink signal with repetitions, using the determined number of repetitions and the derived uplink transmission power.

17. The WTRU of claim 16, wherein transmitting the uplink signal with repetitions includes transmitting the uplink signal repetitively over multiple subframes.

18. The WTRU of claim 17, wherein a number of the multiple subframes corresponds to the determined number of repetitions.

19. The WTRU of claim 16, wherein:
   the WTRU is a WTRU in a coverage enhancement (CE) mode, and
   the number of repetitions is determined in accordance with a CE level.

20. The WTRU of claim 16, wherein the offset parameter is further scaled and expressed as: a scale factor multiplied by 10*log 10 (the number of repetitions).

* * * * *

UNITED STATES PATENT AND TRADEMARK OFFICE
CERTIFICATE OF CORRECTION

PATENT NO. : 11,019,623 B2
APPLICATION NO. : 16/132306
DATED : May 25, 2021
INVENTOR(S) : Moon-il Lee et al.

It is certified that error appears in the above-identified patent and that said Letters Patent is hereby corrected as shown below:

In the Specification

At Column 18, Line 47, delete "transmission" and insert --transmission.--

At Column 29, Line 19, delete "RampingStep" and insert --RampingStep.--

At Column 34, Line 18, delete "pathoss" and insert --pathloss--

At Column 34, Line 30, delete "pathoss" and insert --pathloss--

At Column 42, Line 31, delete "$n_{PUCCH,k}^{(1,\tilde{p}_0)}$" and insert --$n_{PUCCH,k}^{(1,\tilde{p}_0)}$--

At Column 47, Line 2, delete "$P_{PUCCH}(i)$" and insert --$P_{PUCCH}(i)$--

At Column 53, Lines 43-44, delete "the a" and insert --a--

At Column 67, Line 22, delete "WTRU, WTRU," and insert --WTRU,--

Signed and Sealed this
Thirteenth Day of June, 2023

Katherine Kelly Vidal
*Director of the United States Patent and Trademark Office*